(12) United States Patent
Ono et al.

(10) Patent No.: US 7,228,075 B2
(45) Date of Patent: Jun. 5, 2007

(54) WAVELENGTH MULTIPLEXING APPARATUS AND SIGNAL CONVERSION APPARATUS

(75) Inventors: Takeshi Ono, Kawasaki (JP); Kazuhiro Kunimatsu, Kawasaki (JP); Hiroya Egoshi, Kawasaki (JP); Tadashi Soga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 987 days.

(21) Appl. No.: 10/036,538

(22) Filed: Jan. 7, 2002

(65) Prior Publication Data
US 2002/0168137 A1 Nov. 14, 2002

(30) Foreign Application Priority Data
May 14, 2001 (JP) ............................... 2001-143903

(51) Int. Cl.
H04B 10/00 (2006.01)
H04B 10/06 (2006.01)
H04J 14/02 (2006.01)

(52) U.S. Cl. ......................... 398/154; 398/79; 398/202
(58) Field of Classification Search .................. 398/79, 398/154, 155, 202
See application file for complete search history.

(56) References Cited

U.S. PATENT DOCUMENTS 5,657,153 A * 8/1997 Endriz et al. ............. 359/341.1

6,741,812 B2 * 5/2004 Wolf ........................... 398/79

FOREIGN PATENT DOCUMENTS

| JP | 58-200642 | 11/1983 |
| JP | 4-250728 | 9/1992 |
| JP | 2000-321171 | 11/2000 |
| JP | 2001-069082 | 3/2001 |

* cited by examiner

*Primary Examiner*—Jason Chan
*Assistant Examiner*—Nathan Curs
(74) *Attorney, Agent, or Firm*—Staas & Halsey LLP

(57) ABSTRACT

The present invention relates to a wavelength multiplexing apparatus for multiplexing and/or demultiplexing a plurality of optical signals in the wavelength region and a signal conversion apparatus for interfacing a transmission line corresponding to any of the optical signals with the wavelength multiplexing apparatus. By using these apparatus according to the invention, the signal to be a reference for synchronization between the wavelength multiplexing apparatus and the signal conversion apparatus is reliably delivered via an existing optical transmission line therebetween, without the reduction of transmission quality and the limitation on modulation systems. Therefore, in an optical transmission system with the present invention applied thereto, it is possible to meet conditions for office establishment and arrangement of the apparatus and satisfy the demands for maintenance/operation flexibly and at a low cost. Further, service quality and reliability are maintained at high levels.

6 Claims, 35 Drawing Sheets

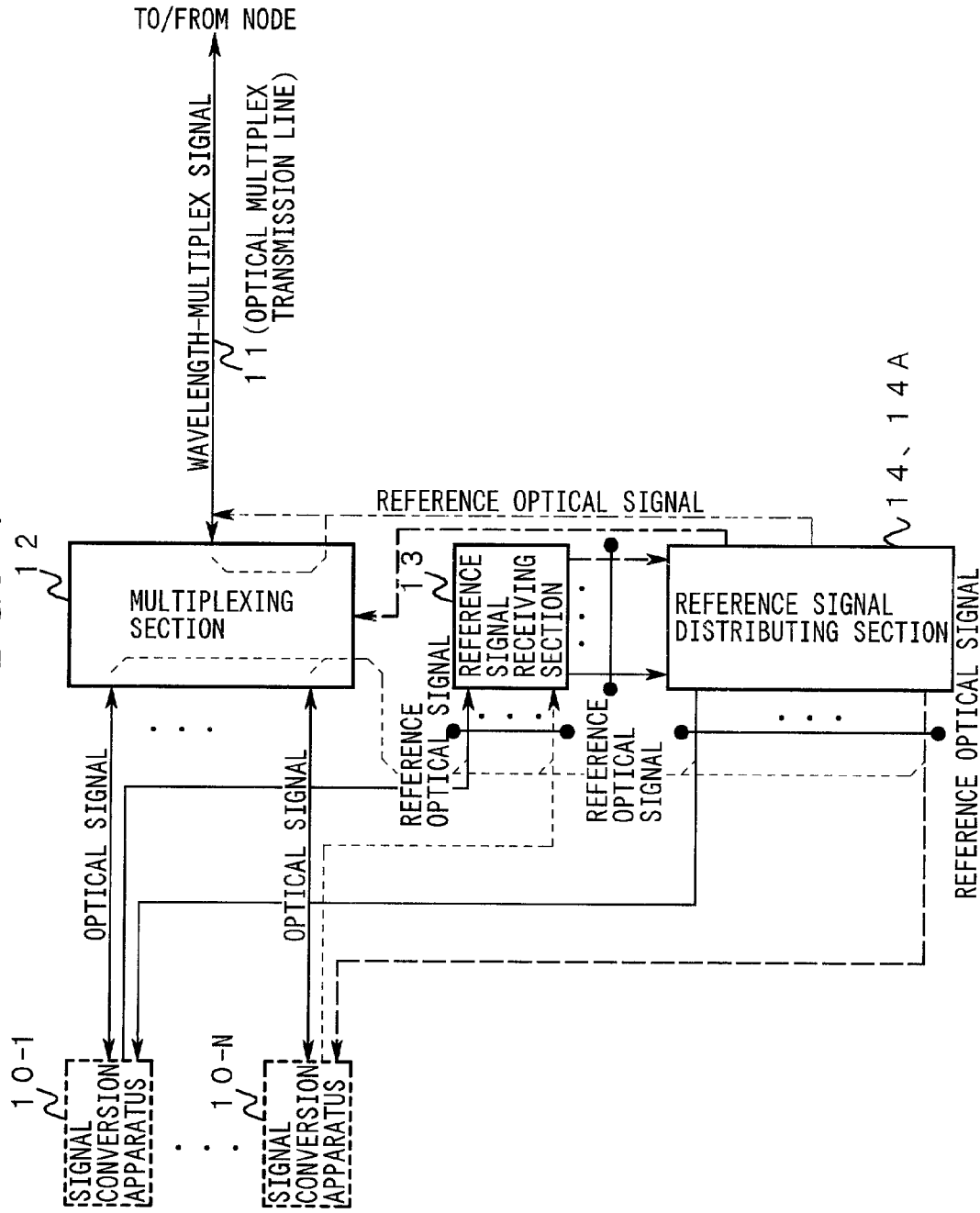

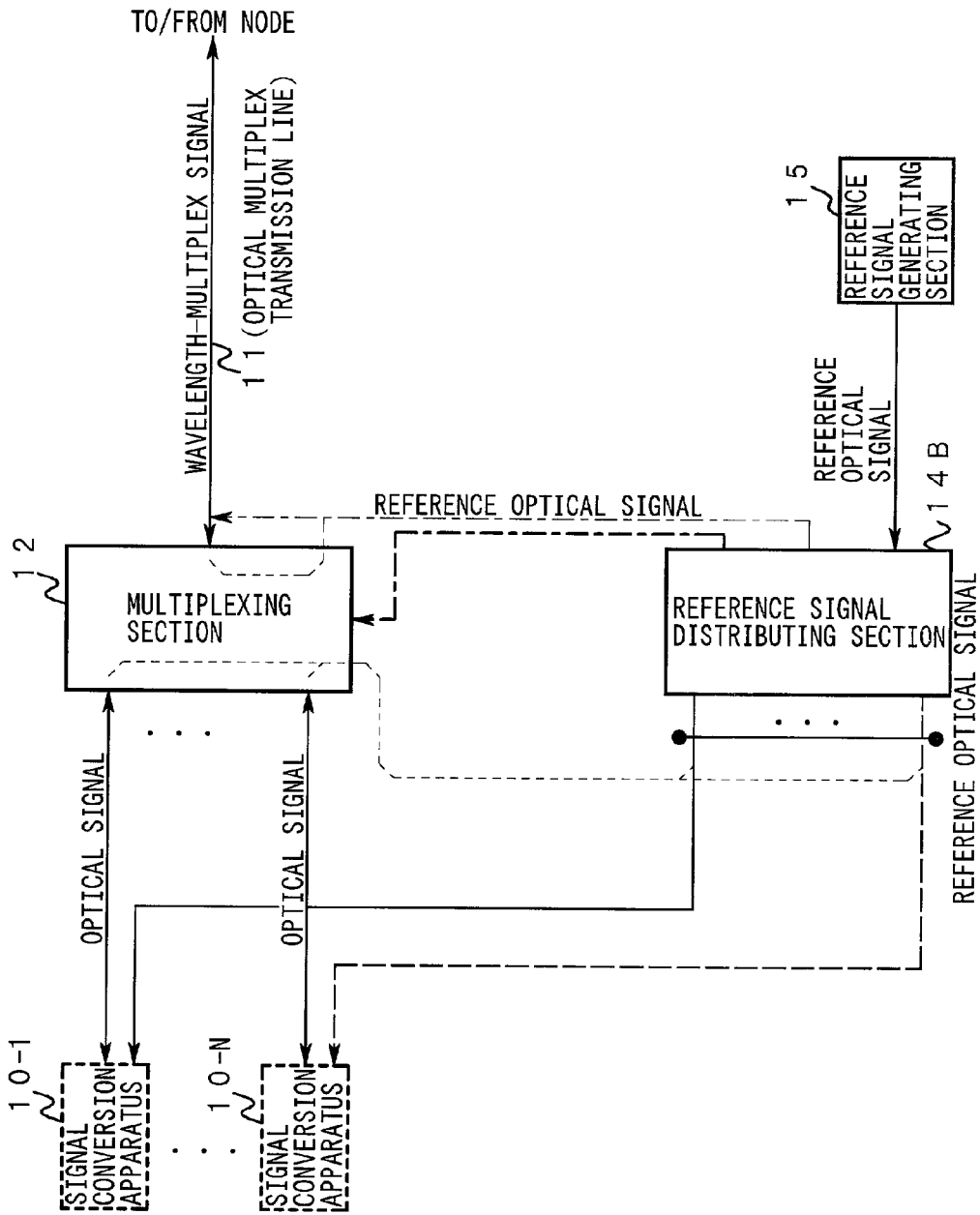

F I G. 2 5
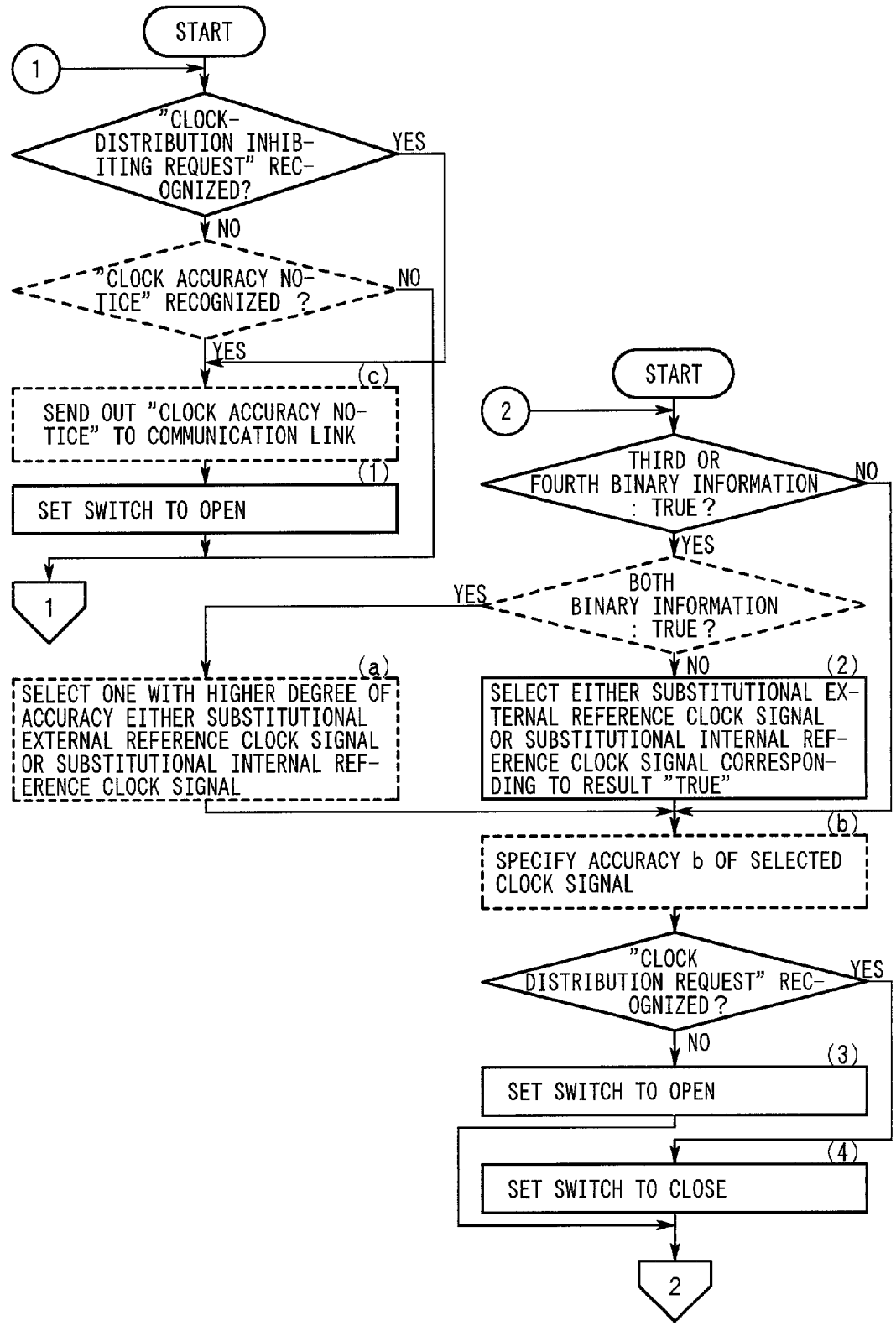

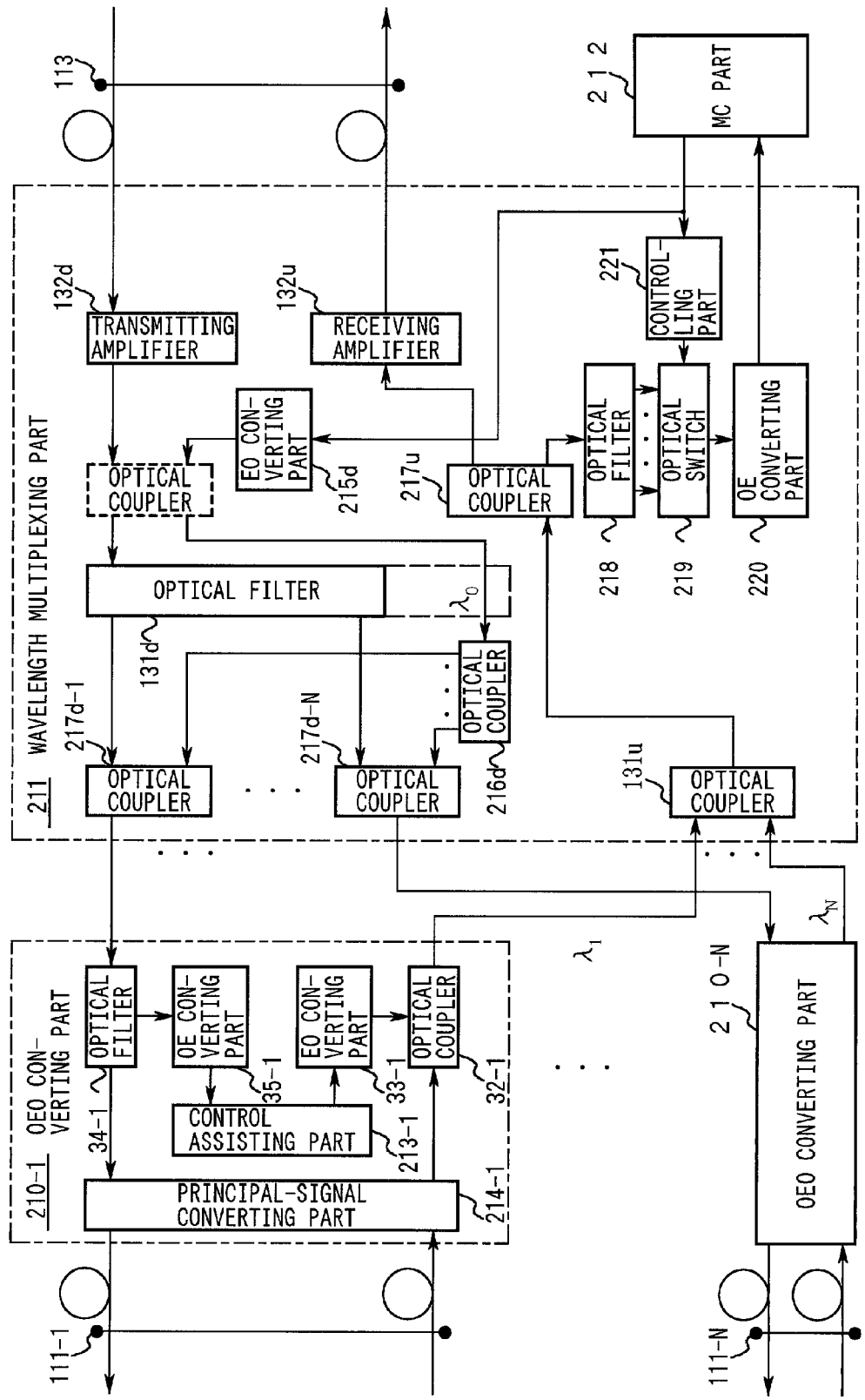
F I G. 2 7

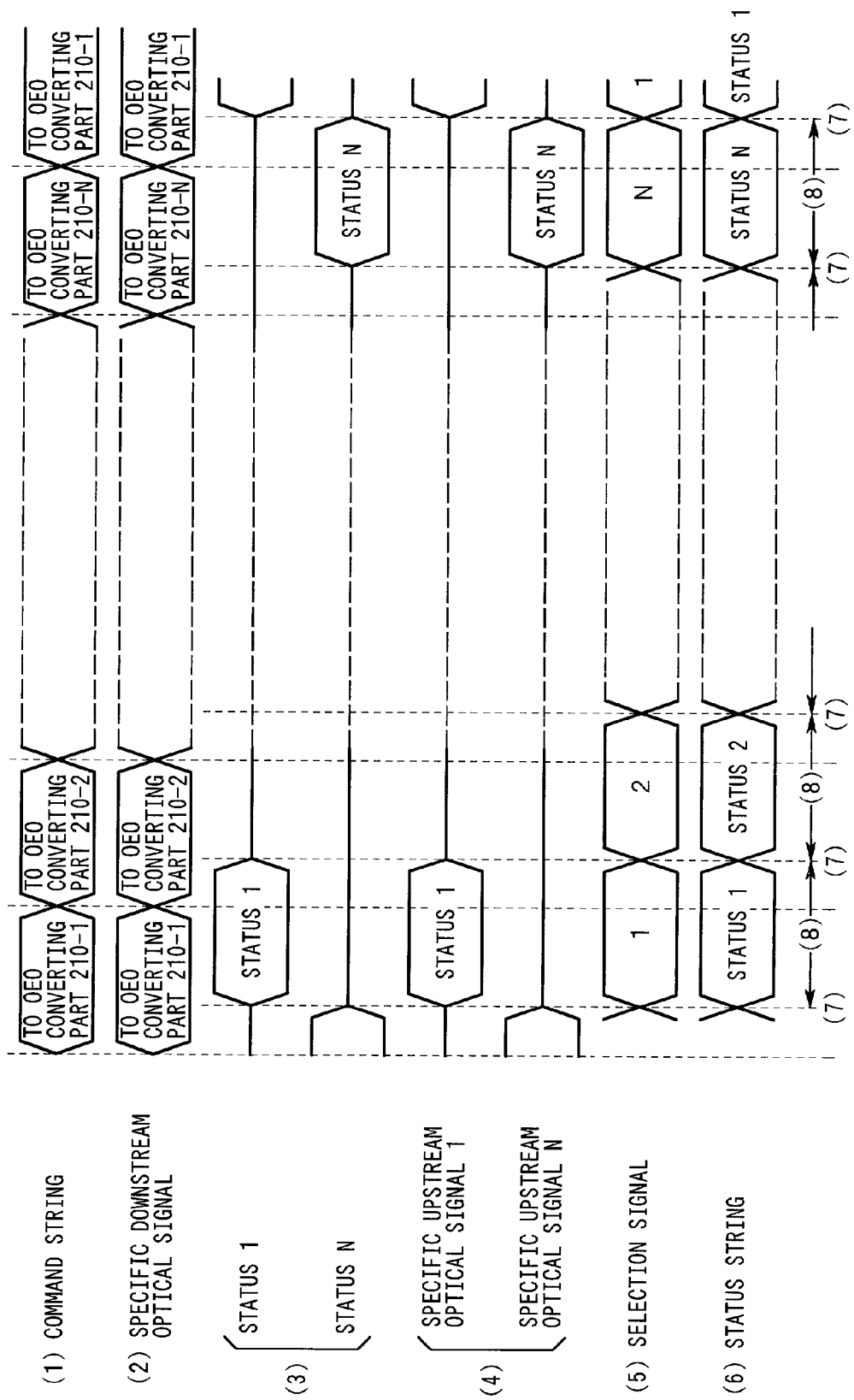

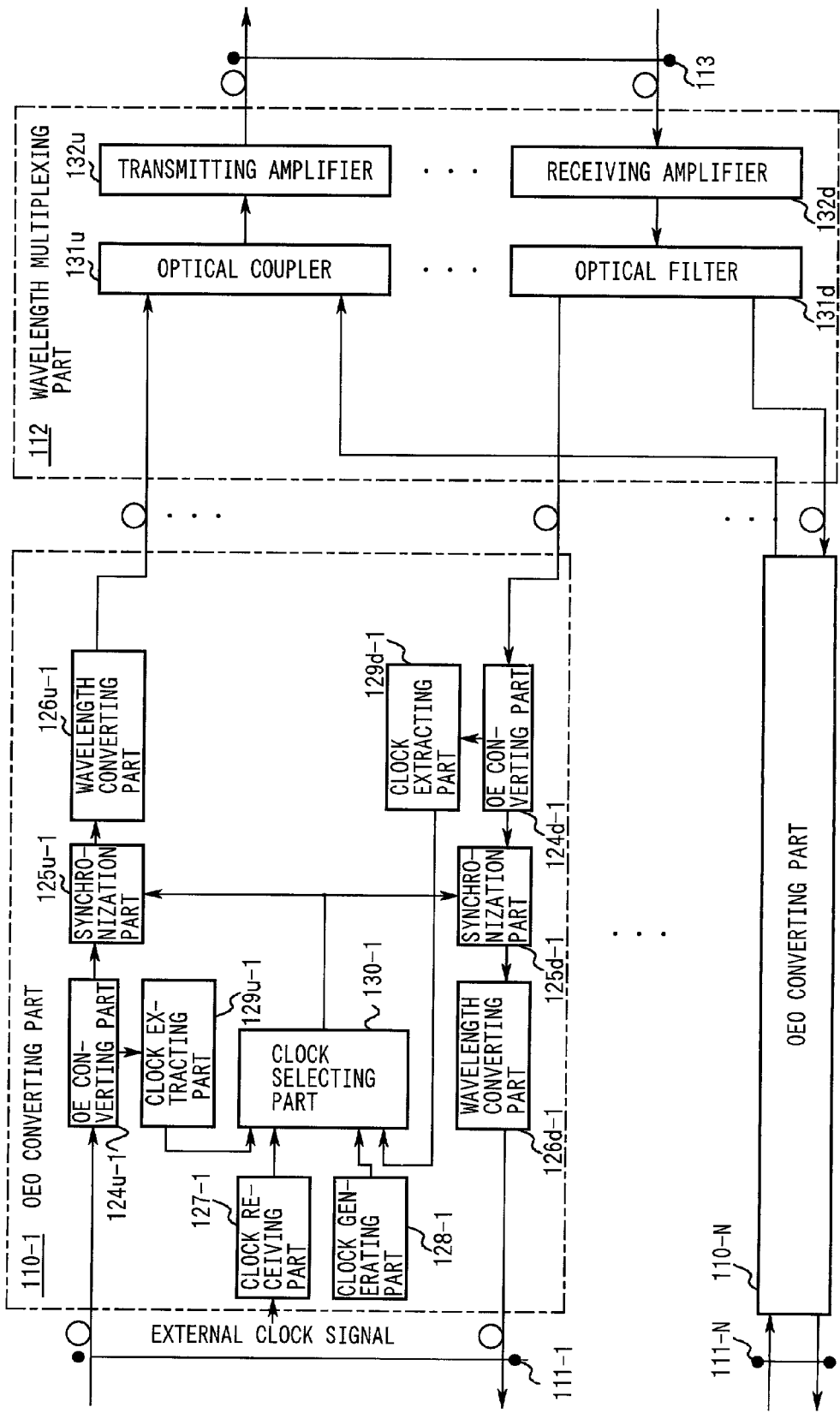

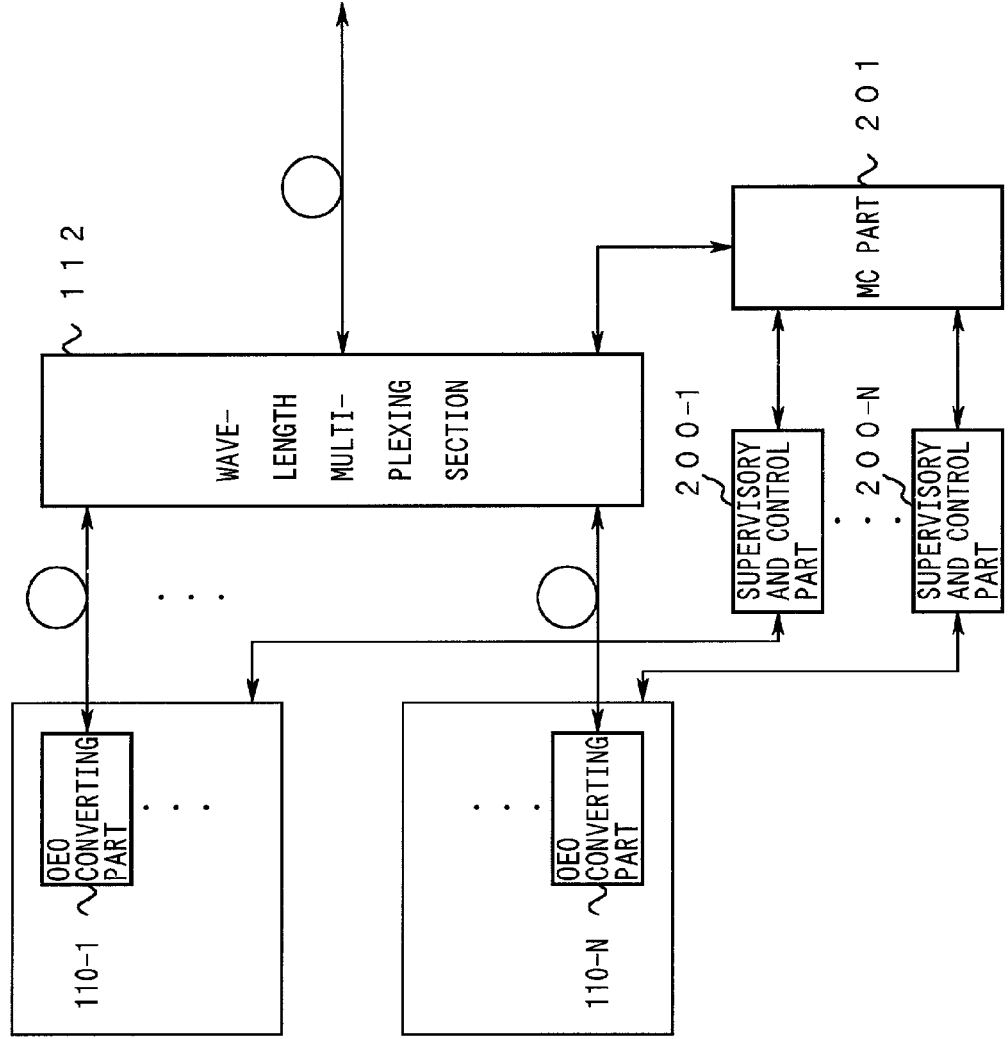

WAVELENGTH MULTIPLEXING APPARATUS AND SIGNAL CONVERSION APPARATUS

BACKGROUND OF THE INVENTION

1. Field of the Invention

The present invention relates to a wavelength multiplexing apparatus for multiplexing and/or demultiplexing a plurality of optical signals in the wavelength region and a signal conversion apparatus for interfacing a transmission line which corresponds to any of these optical signals with the wavelength multiplexing apparatus.

2. Description of the Related Art

Recently, technology for realizing optical devices such as a light source with stable wavelength and level, an optical combiner with narrow band has been progressed significantly. For this reason, wavelength division multiplexing (WDM) has been actively applied to the trunk line system and the access network.

FIG. 34 is a diagram showing a first structural example of a node adapted to the wavelength division multiplexing.

In the drawing, a common external clock signal is supplied to OEO converting parts 110-1 to 110-N. Up links of full-duplex optical transmission lines 111-1 to 111-N are connected to corresponding multiplexing inputs of a wavelength multiplexing section 112 through the OEO converting parts 110-1 to 110-N, respectively. The wavelength multiplexing section 112 includes a plurality N of demultiplexing outputs, which are connected to down links of the optical transmission lines 111-1 to 111-N through the OEO converting parts 110-1 to 110-N, respectively. A multiplexing output and a demultiplexing input of the wavelength multiplexing part 112 are connected to one end of a full-duplex optical multiplex transmission line 113 which is adapted to the wavelength division multiplexing.

The OEO converting part 110-1 is composed of the following elements:

an OE converting part 124$u$-1 and a synchronization part 125$u$-1 which are cascaded to the up link of the optical transmission line 111-1, a wavelength converting part 126$u$-1 which is arranged on a subsequent stage of the synchronization part 125$u$-1, and whose output is connected to the corresponding multiplexing input of the wavelength multiplexing part 112, an OE converting part 124$d$-1 and a synchronization part 125$d$-1 which are cascaded to the corresponding demultiplexing output of the wavelength multiplexing part 112, a wavelength converting part 126$d$-1 which is arranged on a subsequent stage of the synchronization part 125$d$-1, and whose output is connected to the down link of the optical transmission line 111-1, a clock receiving part 127-1 whose input is supplied with the aforementioned external clock signal, a clock generating part 128-1 for generating an internal clock signal which can substitute the external clock signal, clock extracting parts 129$u$-1, 129$d$-1 which are connected to monitor terminals of the OE converting parts 124$u$-1, 124$d$-1, and a clock selecting part 130-1 which is connected to outputs of the aforementioned clock receiving part 127-1, the clock generating part 128-1 and the clock extracting parts 129$u$-1, 129$d$-1, and whose output is connected to clock inputs of the synchronization parts 125$u$-1, 125$d$-1.

Incidentally, the structures of the OEO converting parts 110-2 to 110-N are the same as that of the OEO converting part 110-1 and hence, in the following explanation, the same reference numerals, added with subscripts "2" to "N" instead of "1", are given to designate the elements with the same function and structure and explanations thereof are omitted.

The wavelength multiplexing part 112 is composed of the following elements:

an optical coupler 131$u$ which is connected to outputs of the wavelength converting parts 126$u$-1 to 126$u$-N, provided in the OEO converting parts 110-1 to 110-N, via optical fibers, respectively, a transmitting amplifier 132$u$ which is arranged on a subsequent stage of the optical coupler 131$u$ and whose output is connected to an up link of the optical multiplex transmission line 113, a receiving amplifier 132$d$ which is connected to a down link of the optical multiplex transmission line 113, and an optical filter 131$d$ which is arranged on a subsequent stage of the receiving amplifier 132$d$ and whose outputs are respectively connected to inputs of the OE converting parts 124$d$-1 to 124$d$-N provided in the OEO converting parts 110-1 to 110-N.

Note that, in the following explanation, the elements which are common in the OEO converting parts 110-1 to 110-N are designated by using the subscript "c", meaning that it can correspond to any of the subscripts "1" to "N".

In the OEO converting part 110-$c$, the OE converting part 124$u$-$c$ converts an optical signal, which is supplied via the up link of the optical transmission line 111-$c$ and modulated according to transmission information, to an electrical signal (hereinafter referred to as an "upstream signal").

Moreover, a plurality N of optical signals (hereinafter referred to as "downstream optical signals"), each of which corresponds to the OEO converting parts 110-1 to 110-N (optical transmission lines 110-1 to 110-N), respectively, and whose wavelength is different from each other, are multiplexed to generate a wavelength-multiplex signal (hereinafter referred to as a "downstream optical multiplex signal"), which is supplied to the receiving amplifier 132$d$ provided in the wavelength multiplexing part 112 via the down link of the optical transmission line 113.

The optical filter 131$d$ demultiplexes the downstream optical multiplex signal, which is supplied through the receiving amplifier 132$d$, in the wavelength region, thereby supplying the corresponding downstream optical signals to the OEO converting parts 110-1 to 110-N, respectively.

In the OEO converting part 110-$c$, the OE converting part 124$d$-$c$ converts thus-distributed downstream optical signal to an electrical signal (hereinafter referred to as a "downstream signal").

The clock extracting parts 129$u$–$c$, 129$d$–$c$ generate an upstream clock signal and a downstream clock signal, each of which is synchronized to the aforementioned upstream signal and the downstream signal.

Further, the clock receiving part 127-$c$ subjects the aforementioned external clock signal to predetermined processing (such as waveform shaping).

Furthermore, the clock generating part 128-$c$ regularly generates the predetermined internal clock signal.

The clock selecting part 130-$c$ selects any clock signal (it is supposed as the "external clock signal" for simplifying the explanation and referred to as a "reference clock signal" in the following explanation) out of the aforementioned upstream clock signal, the downstream clock signal, the external clock signal and the internal clock signal, which corresponds to a maintenance and operation system, as well as office data. Incidentally, in the following explanation, it is supposed that the frequency of the reference clock signal is 1.544 MHz for simplifying the explanation.

The synchronization part 125$u$–$c$ applies re-timing to the upstream signal which is supplied from the OE converting part 124$u$–$c$, in synchronization with the reference clock signal, thereby generating a "wave-shaped upstream signal".

The wavelength converting part 126$u$–$c$ generates an optical signal with a predetermined wavelength modulated by the wave-shaped upstream signal (hereinafter referred to as an "upstream optical signal").

In the wavelength multiplexing part 112, the optical coupler 131$u$ multiplexes a plurality N of the upstream optical signals, which are generated in parallel by the OEO converting parts 110-1 to 110-N like the above, thereby generating a wavelength-multiplex signal (hereinafter referred to as an "upstream optical multiplex signal").

The transmitting amplifier 132$u$ transmits the upstream optical multiplex signal to the up link of the optical multiplex transmission line 113 with a predetermined level.

Further, in the OEO converting part 110-$c$, the synchronization part 125$d$–$c$ applies re-timing to the downstream signal which is supplied from the OE converting part 124$d$–$c$, in synchronization with the reference clock signal, thereby generating a "wave-shaped downstream signal".

The wavelength converting part 126$d$–$c$ generates an optical signal with a predetermined wavelength modulated according to the wave-shaped downstream signal and sends out the optical signal to the down link of the optical transmission line 111-$c$.

Therefore, the optical transmission lines 111-1 to 111-N and the optical multiplex transmission line 113 are synchronized with each other while flexibly corresponding to the aforementioned office data and the maintenance and operation system, and, under the synchronization, predetermined transmission information is transferred accurately and stably based on the wavelength division multiplexing.

Incidentally, the above-described conventional example is referred to as a "first conventional example" in order to discriminate it from a later-described conventional example.

FIG. 35 is a diagram showing a second structural example of a node adapted to the wavelength division multiplexing.

Differences of the structure of the drawing from that of the node shown in FIG. 34 are that a single or a plurality n ($\leq$N) of supervisory and control part(s) 200-1 to 200-$n$, each of which has a port connected to a control terminal provided respectively to a predetermined number of OEO converting parts out of the OEO converting parts 110-1 to 110-N, is/are provided thereto, and that an MC part 201 which has communication ports connected respectively to communication ports of the supervisory and control parts 200-1 to 200-N and the wavelength multiplexing part 112.

It should be noted that the basic structures of the OEO converting parts 110-1 to 110-N and the wavelength multiplexing part 112 are the same as those shown in FIG. 34, and hence illustrations thereof are omitted for simplifying the explanation.

In thus-structured node (hereinafter referred to as a "second conventional example"), the supervisory and control parts 200-1 to 200-$n$ transfer a command (showing an operation mode of the respective OEO converting parts) and a status (operation condition) in parallel, which should be delivered between the subordinate OEO converting part, out of the OEO converting parts 110-1 to 110-N, and the MC part 201.

The MC part 201 takes the initiative to perform predetermined processing of the maintenance and the operation of the aforementioned OEO converting parts 110-1 to 110-N and the wavelength multiplexing part 112, and, based on its processing procedure, exchanges the command and the status reciprocally between the OEO converting parts 110-1 to 110-N and the wavelength multiplexing part 112, through the communication ports and the supervisory and control parts 200-1 to 200-$n$.

Therefore, a load (throughput) which is necessary for delivering the command and the status reciprocally between the OEO converting parts 110-1 to 110-N and the MC part 201 is dispersed by the supervisory and control parts 200-1 to 200-$n$.

Namely, the throughput of the MC part 201 and the number of the communication ports to be provided to the MC part 201 are kept at small values, even when the number N of the OEO converting parts 110-1 to 110-N to be equipped thereto differs substantially for each node or expands substantially during the operation.

Therefore, the structure standardization and the cost reduction can be achieved with high reliability as well as flexible adaptation to various forms of maintenance and operation, and maintaining of high total reliability.

It should be mentioned that, in the above-described first conventional example, the external clock signal, which should be supplied to all of the OEO converting parts 110-1 to 110-N, has to be supplied via lines such as coaxial cables which are in advance connected to the corresponding terminals of the OEO converting parts 110-1 to 110-N. However, since the external clock signal is selected according to the office data and the forms of the maintenance and operation, it is not necessarily shared.

Moreover, a source of the external clock signal like the above and the OEO converting parts 110-1 to 110-N are not necessarily located in the same office premises or on the same floor.

For this reason, it is difficult to realize synchronization with the individual external clock signals which correspond to a combination (group) of the optical transmission lines having a predetermined property in common (for example, an operator such as a telecommunication carrier and a user), due to its cost increases and various limitations caused by construction and the like.

Moreover, complicated wiring work (including wire binding) is necessary in order to underlay the lines for supplying the external clock signal to the OEO converting parts 110-1 to 110-N. Hence, it is demanded, not only to reduce the cost, but also to flexibly correspond to the various arrangements of the OEO converting parts 110-1 to 110-N.

Further, the number of the optical signals to be multiplexed to the wavelength-multiplex signal (hereinafter referred to as the "multiplicity") has been rapidly increased as the technology progresses, and therefore, the length of the line is increasing.

Therefore, there are high possibilities that the level of electromagnetic interference (EMI) which is radiated from the line is increased, and that a substantial deviation is caused in a waveform of the external clock signal which is supplied respectively to the OEO converting parts 110-1 to 110-N.

Furthermore, in the above-described second conventional example, communication links which are formed between the OEO converting parts 110-1 to 110-N and the nodes, and the supervisory and control parts 200-1 to 200-$n$ (hereinafter referred to as "specific communication links"), communication links which are formed between the supervisory and control parts 200-1 to 200-$n$ and the MC part 201 (hereinafter referred to as "combined communication links") and a communication link which is formed between the wavelength multiplexing part 112 and the MC part 201 (hereinafter referred to as a "shared communication link") are formed as the electrical full-duplex transmission lines.

Therefore, the level of the electromagnetic interference (EMI) which is radiated from the communication lines like the above is increased as the number of the communication links increases, and causes the external clock signal to deteriorate its waveform. Also, there is a possibility that it acts as disturbance on the external apparatus and the transmission system.

Further, the aforementioned specific communication links and the combined communication links are substantially larger in number than the shared communication link, although the OEO converting parts 110-1 to 110-N may expand, and formed in a mesh-state between the OEO converting parts 110-1 to 110-N and the supervisory and control parts 200-1 to 200-n, and the supervisory control parts 200-1 to 200-n and the MC part 201.

Therefore, the complicated wiring work (including the wire binding) is necessary in order to underlay the specific communication links and the combined communication links, and hence, it is demanded, not only to reduce the cost, but also to flexibly correspond to the various arrangements of the OEO converting parts 110-1 to 110-N, similarly to the aforementioned underlaying of the lines for supplying the external clock signal to the OEO converting parts 110-1 to 110-N.

SUMMARY OF THE INVENTION

It is an object of the present invention to provide a wavelength multiplexing apparatus and a signal conversion apparatus which can satisfy, flexibly and at low cost, demands for conditions for office establishment, arrangement of the apparatus in the office premises, and maintenance/operation, and can maintain transmission quality at a high level.

It is an object of the present invention to simplify and standardize the configuration of optical transmission lines which are necessary for directly delivering a reference optical signal among a plurality of signal conversion apparatuses.

It is an object of the present invention to share existing optical transmission lines while suppressing substantial expansion of hardware.

Further, it is an object of the present invention to flexibly adapt to conditions for office establishment and system configuration, and establish synchronization, even when a reference to the synchronization cannot be obtained independently.

It is an object of the present invention to establish synchronization with the other signal conversion apparatuses according to conditions for office establishment and system configuration.

Moreover, it is an object of the present invention to highly maintain synthetic reliability without increasing the cost and decreasing reliability.

It is an object of the present invention to highly maintain the transmission quality of existing channels.

It is an object of the present invention to simplify wiring and shorten the total length substantially as compared with the conventional example.

It is an object of the present invention to reduce the cost and simplify the structure.

Furthermore, it is an object of the present invention to realize flexible adaptation to various configurations.

It is an object of the present invention to establish the synchronization with the other signal conversion apparatuses according to the conditions for the office establishment and the system configuration, even when a reference signal generating section is not provided therein.

It is an object of the present invention to secure flexible adaptability to expansion or a provision of new service.

It is an object of the present invention to share the existing optical transmission lines while suppressing the substantial expansion of the hardware.

Further, it is an object of the present invention to simplify the structure and reduce power consumption.

It is an object of the present invention to reduce the number of wavelengths and the scale of the hardware used for downloading information about maintenance and operation, even when the number of the signal conversion apparatuses is large or increases/decreases substantially.

It is an object of the present invention to transfer, in a dumb-terminal procedure, information about maintenance and operation to the signal conversion apparatus to be its destination, without employing a complex multiple access system and a random access control system.

It is an object of the present invention to avoid or regulate radiation of EMI with high accuracy.

It is an object of the present invention to realize flexible adaptation to node configurations and the various forms of maintenance and operation.

Furthermore, it is an object of the present invention to enable flexible adaptation to an increase in the number of wavelengths to be multiplexed, and to reduce the running cost and improve the synthetic reliability while satisfying various forms of structures, scales, maintenance, and operations, and conditions for office establishment of apparatuses, in the optical transmission system to which the present invention is applied.

The above objects are achieved by a wavelength multiplexing apparatus which receives a reference optical signal modulated according to a reference signal, which is outputted from a specific one of a plurality of signal conversion apparatuses, and is a reference to synchronization, and distributes the reference optical signal to all or a part of the plurality of signal conversion apparatuses.

In the wavelength multiplexing apparatus, the reference optical signals are individually distributed to the signal conversion apparatuses through existing optical links which consist of an outward route from the specific signal conversion apparatus to the wavelength multiplexing apparatus of the present invention and astero homeward routes from the wavelength multiplexing apparatus to the respective signal conversion apparatuses.

Further, the above objects are achieved by a wavelength multiplexing apparatus which receives a reference optical signal multiplexed to an optical signal transmitted from a specific signal conversion apparatus by demultiplexing or extracting the optical signal in the wavelength region.

In the above wavelength multiplexing apparatus, the reference optical signal are delivered with reliability to a reference signal receiving section since the existing optical transmission line between the specific signal conversion apparatus and the wavelength multiplexing apparatus of the present invention is shared.

Moreover, the above objects are achieved by a wavelength multiplexing apparatus in which the reference optical signals are supplied from a plurality of the specific signal conversion apparatuses, and one of the reference optical signals is subjected to distribution.

In the above wavelength multiplexing apparatus, redundancy in signal sources of the reference optical signal is produced, the reference optical signal being to be distributed to a predetermined signal conversion apparatus and nodes connected through an optical multiplex transmission line, which makes it possible to select the signal source suitable for office establishment and system configuration.

Furthermore, the above objects are achieved by a wavelength multiplexing apparatus which receives reference optical signals individually supplied from the plurality of specific signal conversion apparatuses, and have a correspondence in advance with all or a part of the signal conversion apparatuses and the optical multiplex transmission line, and distributes the received reference optical signals to the corresponding destinations.

The above wavelength multiplexing apparatus can be synchronized with the other signal conversion apparatuses under the condition for the office establishment and the system configuration, without having a section for generating the reference signal.

Further, the above objects are achieved by a wavelength multiplexing apparatus which includes a section for generating reference signals, and distributes the reference optical signal to all or a part of the plurality of signal conversion apparatus.

In the above wavelength multiplexing apparatus, the reference optical signal are individually distributed to the signal conversion apparatuses through the existing optical links, even when none of the signal conversion apparatus supplies the reference optical signals.

Moreover, the above objects are achieved by a wavelength multiplexing apparatus which includes an optical amplifier for optically amplifying a wavelength-multiplex signal transferred through an optical multiplex transmission line and all or a part of optical signals demultiplexed from the wavelength-multiplex signal, and modulates pumping light used for the amplification according to the reference optical signal to be distributed, thereby distributing the reference optical signal.

In the above wavelength multiplexing apparatus, the reference optical signals are distributed in parallel through the existing optical transmission lines which are individually formed therefrom to the signal conversion apparatuses to be distributed the reference optical signal and are used for transmitting the aforementioned optical signal to the signal conversion apparatus.

Furthermore, the above objects are achieved by a wavelength multiplexing apparatus in which the reference optical signal is supplied via a specific channel used for transferring information about maintenance or operation.

In the above wavelength multiplexing apparatus, any of the existing channels which are formed therefrom to the signal conversion apparatus of the present invention or the nodes connected through the optical multiplex transmission line, and the wavelength multiplexing apparatus can be used as the specific channel.

Further, the above objects are achieved by a wavelength multiplexing apparatus which modulates a wavelength-multiplex signal to be demultiplexed based on wavelength division multiplexing, according to information about maintenance and/or operation.

In the above wavelength multiplexing apparatus, the information about the maintenance and the operation is distributed in parallel to the signal conversion apparatus through the optical transmission lines formed therefrom to the respective signal conversion apparatuses.

Moreover, the above objects are achieved by a wavelength multiplexing apparatus which modulates the intensity of pumping light used for amplification of the wavelength-multiplex signal, according to information about maintenance and/or operation.

In the above wavelength multiplexing apparatus, the pumping light can be easily modulated by varying power used for driving its pumping light source, or an optical gain (attenuation amount) of the optical transmission line through which the pumping light propagates.

Furthermore, the above objects are achieved by a wavelength multiplexing apparatus which modulates a specific optical signal whose wavelength is different from those of optical signals multiplexed to the wavelength-multiplex signal.

In the above wavelength multiplexing apparatus, the information about the maintenance and the operation is distributed in parallel to the signal conversion apparatuses via a channel formed by the specific optical signal whose wavelength is different from those of the optical signals to be distributed individually to the signal conversion apparatuses.

Further, the above objects are achieved by a wavelength multiplexing apparatus in which the specific optical signals are allocated to a single or a plurality (a part) of the specific signal conversion apparatuses.

In the above wavelength multiplexing apparatus, the information about the maintenance and/or the operation of a plurality of the signal conversion apparatuses, is downloaded in parallel via the common channel which is formed by the aforementioned specific optical signal.

Moreover, the above objects are achieved by a wavelength multiplexing apparatus in which the specific optical signals are individually allocated to each signal conversion apparatus.

In the above wavelength multiplexing apparatus, the information to be transferred to the respective signal conversion apparatuses is transmitted via the channels which are individually formed in parallel therefrom to the signal conversion apparatuses, based on the wavelength division multiplexing.

Furthermore, the above objects are achieved by a wavelength multiplexing apparatus which is supplied with pumping light modulated according to information about maintenance and/or operation of the signal conversion apparatus, and amplifies a wavelength-multiplex signal to be demultiplexed based on the wavelength-division multiplexing.

In the above wavelength multiplexing apparatus of the present invention, the information is downloaded to the signal conversion apparatuses without any electrical processing for the download.

Further, the above objects are achieved by a wavelength multiplexing apparatus which is supplied with a specific optical signal modulated according to information about maintenance and/or operation of the signal conversion apparatus and having a different wavelength from those of optical signals multiplexed to the wavelength-multiplex signal, and which distributes the specific optical signal to the signal conversion apparatus based on the wavelength division multiplexing.

In the above wavelength multiplexing apparatus, the information is downloaded to the signal conversion apparatus via the channel which is different from other channels formed by the individual optical signals multiplexed to the wavelength-multiplex signal, without any electrical processing.

Moreover, the above objects are achieved by a wavelength multiplexing apparatus which reconstructs information about maintenance and/or operation by demodulating the wavelength-multiplex signal which is generated based on the wavelength division multiplexing, and delivers the information to a terminal used for the maintenance or the operation.

In the above wavelength multiplexing apparatus, the information, when the signal conversion apparatuses are its transmitting ends or destinations, is transferred to the terminal via the channel which is different from other channels formed by the respective optical signals multiplexed to the wavelength-multiplex signal, without any electrical processing.

Furthermore, the above objects are achieved by a wavelength multiplexing apparatus which demodulates the wavelength-multiplex signal, which is generated by multiplexing the optical signals used for the original transmission and the specific optical signal having a different wavelength from those of the optical signals, based on the wavelength division multiplexing, to reconstruct the information about maintenance and/or operation, and delivers the information to the terminal used for the maintenance or the operation.

In the above wavelength multiplexing apparatus, the information, when the signal conversion apparatuses are its transmitting ends or destinations, is transferred to the terminal via the channel which is different from other channels individually formed by the optical signals multiplexed to the wavelength-multiplex signal, without any electrical processing.

Further, the above objects are achieved by a signal conversion apparatus which synchronizes with the reference optical signal supplied from the wavelength multiplexing apparatus and modulated according to the reference signal which is a reference to the synchronization.

The above signal conversion apparatus can flexibly adapt to condition for the office establishment and the system configuration, and establish the aforementioned synchronization, even when the reference cannot be independently obtained.

Moreover, the above objects are achieved by a signal conversion apparatus which is supplied with a reference optical signal by demultiplexing or extracting, in the wavelength region, the reference optical signal from a specific optical signal which is demultiplexed from the wavelength-multiplex signal and wavelength-multiplexed to the reference signal by the wavelength multiplexing apparatus.

In the above signal conversion apparatus, the reference optical signal is delivered through the existing optical transmission line which is formed therefrom to the wavelength multiplexing apparatus without placing any limitation on the modulation system, as long as it can be multiplexed to the aforementioned specific optical signal.

Furthermore, the above objects are achieved by a signal conversion apparatus supplied with the reference optical signal via a specific channel which is used for transmitting the information about maintenance or operation of the optical transmission system including the optical multiplex transmission line.

In the above signal conversion apparatus, any of the existing channels which are formed between the wavelength multiplexing apparatus of the present invention, and the nodes connected through the optical multiplex transmission line or the signal conversion apparatus can be used as the specific channels.

Further, the above objects are achieved by a signal conversion apparatus which supplies the reference optical signal to the wavelength multiplexing apparatus.

In the above signal conversion apparatus, the reference optical signal is a reference to the synchronization of the other signal conversion apparatuses to which the reference optical signal is distributed through the wavelength multiplexing apparatus.

Moreover, the above objects are achieved by a signal conversion apparatus which transmits the reference optical signal with a different wavelength from that of the optical signal, as a specific optical signal which is multiplexed to the optical signal, to the wavelength multiplexing apparatus.

In the above signal conversion apparatus, the reference optical signal is delivered with reliability to the wavelength multiplexing apparatus through the existing optical transmission line without placing any limitation on the modulation system, as long as it can be multiplexed to the aforementioned specific optical signal.

Furthermore, the above objects are achieved by a signal conversion apparatus which includes the optical amplifier for optically amplifying the optical signal to be sent out to the wavelength multiplexing apparatus, and modulates the pumping light which is used for the optical amplification by the reference optical signal, thereby sending out the reference optical signal.

In the above signal conversion apparatus, the reference optical signals are distributed in parallel through the existing optical transmission lines which are respectively formed therefrom to the wavelength multiplexing apparatus, and are used for transmitting the optical signal to the wavelength multiplexing apparatus.

Further, the above objects are achieved by a signal conversion apparatus which modulates the optical signal to be multiplexed to the wavelength-multiplex signal, according to the information about maintenance and/or operation.

In the above signal conversion apparatus, the information about maintenance and operation is transmitted to the wavelength multiplexing apparatus through the optical transmission line formed therefrom to the wavelength multiplexing apparatus which carries out the multiplexing and demultiplexing suitable for the optical multiplex transmission line, Moreover, the above objects are achieved by a signal conversion apparatus which modulates the intensity of the pumping light which is used for the amplification of the optical signal to be multiplexed to the wavelength-multiplex signal, according to the information about maintenance and/or operation.

In the above signal conversion apparatus, the pumping light is modulated by varying the power used for driving the pumping light source, or the optical gain (attenuation amount) of the optical transmission line through which the pumping light propagates.

Furthermore, the above objects are achieved by a signal conversion apparatus which modulates the specific optical signal whose wavelength is different from those of the optical signals multiplexed to the wavelength-multiplex signal, according to the information about the maintenance and/or the operation, and distributes, to the wavelength multiplexing apparatus, the optical signals and the specific optical signal by multiplexing both of the signals based on the wavelength division multiplexing.

In the above signal conversion apparatus, the information about maintenance and operation is transferred to the wavelength multiplexing apparatus or the terminal used for the maintenance and the operation, via the channel formed by the specific optical signal which is multiplexed by the wavelength multiplexing apparatus and whose wavelength is different from those of the optical signals to be transmitted to the adjacent node through the optical multiplex transmission line.

Further, the above objects are achieved by a signal conversion apparatus which reconstructs the information by demodulating the optical signal which is demultiplexed by the wavelength multiplexing apparatus and is modulated according to the information about maintenance and/or operation, and delivers the information to the predetermined terminal.

In the above signal conversion apparatus, the information about the maintenance and the operation is an operand of a predetermined processing to be performed by the terminal connected to the signal conversion apparatus.

Moreover, the above objects are achieved by a signal conversion apparatus in which an optical signal, which is a subject of demodulation and has a different wavelength from those of the optical signals used for the original transmission, is the special optical signal multiplexed to the optical signal in the wavelength region.

In the above signal conversion apparatus, the information about maintenance and operation is the operand of the predetermined processing to be performed by the terminal connected to the signal conversion apparatus.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 is a block diagram showing a first principle of a wavelength multiplexing apparatus according to the present invention;

FIG. 2 is a block diagram showing a second principle of the wavelength multiplexing apparatus according to the present invention;

FIG. 25 is an operation flowchart of a controlling part 103$u$ in the sixth and the seventh embodiments of the present invention;

FIG. 27 is a diagram showing an eighth embodiment of the present invention;

FIG. 28 is an operation time chart of the eighth embodiment of the present invention;

FIG. 34 is a diagram showing a first structural example of a node which is adapted to wavelength division multiplexing, and FIG. 35 is a diagram showing a second structural example of the node which is adapted to the wavelength division multiplexing.

DESCRIPTION OF THE PREFERRED EMBODIMENTS

Figure 3:
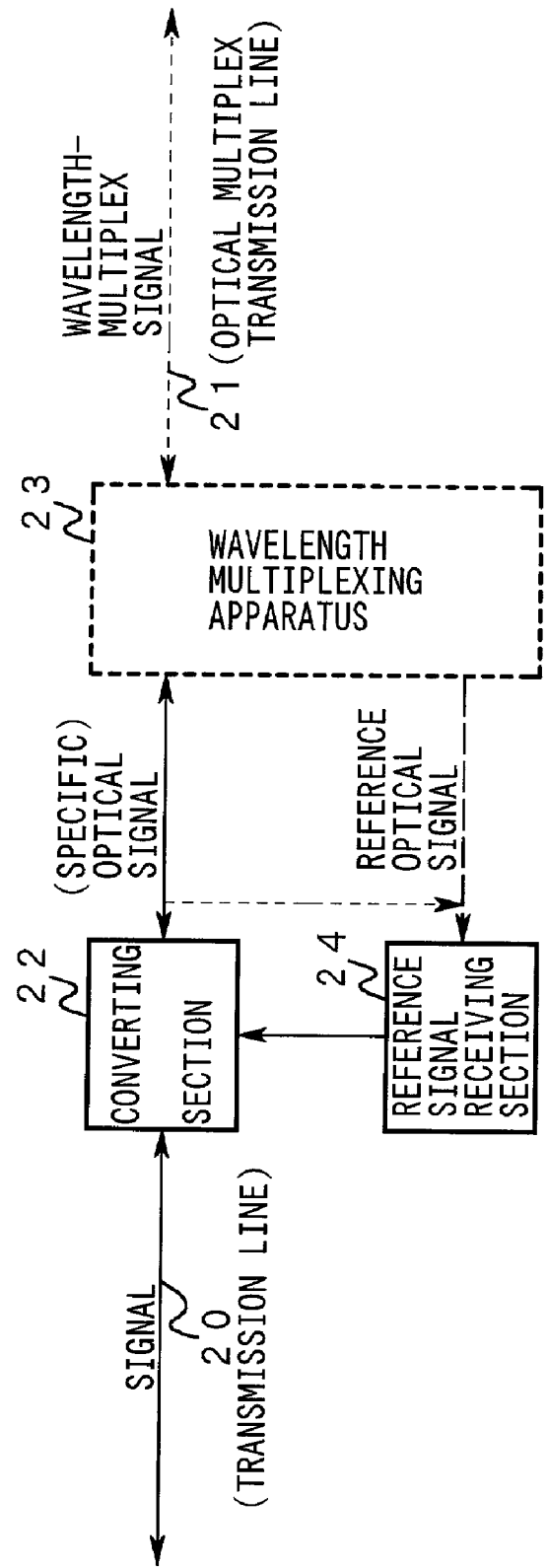
FIG. 3 is a block diagram showing a third principle of the wavelength multiplexing apparatus according to the present invention.

First, the principle of a wavelength multiplexing apparatus according to the present invention will be explained with reference to FIG. 1.

FIG. 1 shows a first principle of the wavelength multiplexing apparatus according to the present invention.

The wavelength multiplexing apparatus as shown in FIG. 1 is composed of a multiplexing section 12 which is connected to signal conversion apparatuses 10-1 to 10-N and an optical multiplex transmission line 11, a reference signal receiving section 13 and reference signal distributing sections 14, 14A.

The first principle of the wavelength multiplexing apparatus according to the present invention is as follows.

The multiplexing section 12 multiplexes and/or demultiplexes optical signals with different wavelengths to/from a wavelength-multiplex signal transferred through the optical multiplex transmission line 11. The optical signals are individually sent or received by the plurality of the signal conversion apparatuses 10-1 to 10-N. The reference signal receiving section 13 receives a reference optical signal modulated according to a reference signal which is outputted from a specific signal conversion apparatus among the plurality of the signal conversion apparatuses 10-1 to 10-N, and is a reference for synchronization of all or a part of the signal conversion apparatuses 10-1 to 10-N. The reference signal distributing section 14 distributes the reference optical signal to all or a part of the plurality of the signal conversion apparatuses 10-1 to 10-N.

Namely, the reference optical signal is distributed to the signal conversion apparatuses 10-1 to 10-N through an outward route from the specific signal conversion apparatus to the reference signal receiving section 13 and through astero homeward routes from the reference signal distributing section 14 to the respective signal conversion apparatuses.

This makes it possible to simplify and standardize the structure of optical transmission lines which are necessary for directly delivering the reference optical signal among the signal conversion apparatuses. The second principle of the wavelength multiplexing apparatus according to the present invention is as follows.

The multiplexing section 12 multiplexes and/or demultiplexes the optical signals with the different wavelengths to/from the wavelength-multiplex signal transmitted through the optical multiplex transmission line 11. The optical signals are individually sent or received by the plurality of the signal conversion apparatuses 10-1 to 10-N. A reference signal generating section 15 generates the reference optical signal modulated according to the reference signal which is a reference for the synchronization of the signal conversion apparatuses 10-1 to 10-N. A reference signal distributing section 14B distributes the reference optical signal which is generated by the reference signal generating section 15 to all or a part of the plurality of the signal conversion apparatuses 10-1 to 10-N.

Namely, the reference optical signal is distributed to the signal conversion apparatuses 10-1 to 10-N through the astero homeward routes from the reference signal distributing section 14 to the signal conversion apparatuses, even when none of the signal conversion apparatuses 10-1 to 10-N supplies the reference optical signal.

This makes it possible to simplify and standardize the structure of optical transmission lines which are necessary for directly delivering the reference optical signal among the signal conversion apparatuses.

FIG. 2 shows a second principle of the wavelength multiplexing apparatus according to the present invention.

The wavelength multiplexing apparatus as shown in FIG. 2 is composed of the multiplexing section 12 which is connected to the signal conversion apparatuses 10-1 to 10-N and the optical multiplex transmission line 11, the reference signal distributing section 14B and the reference signal generating section 15.

The third principle of the wavelength multiplexing apparatus according to the present invention is as follows.

An optical amplifier provided in the multiplexing section 12, optically amplifies the wavelength-multiplex signal which is transmitted through the optical multiplex transmission line 11 and all or a part of optical signals which are demultiplexed from the wavelength-multiplex signal. The reference signal distributing section 14 modulates pumping light which is used for the optical amplification by the reference optical signal which is received by the reference signal receiving section 13, thereby distributing the reference optical signal.

Namely, the reference optical signals are distributed in parallel through existing optical transmission lines which are formed from the wavelength multiplexing apparatus to the signal conversion apparatuses to which the reference optical signal should be distributed and are used for transmitting the optical signal to the signal conversion apparatuses.

Therefore, the existing optical transmission lines can be shared while suppressing substantial expansion of hardware, as long as the aforementioned optical amplifier is existing and the reference optical signals can be regenerated by the individual signal conversion apparatuses.

The fourth principle of the wavelength multiplexing apparatus according to the present invention is as follows.

The optical amplifier provided in the multiplexing section 12, optically amplifies the wavelength-multiplex signal which is transmitted through the optical multiplex transmission line 11 and all or a part of the optical signals which are demultiplexed from the wavelength-multiplex signal. The reference signal distributing section 14B modulates the pumping light which is used for the optical amplification according to the reference optical signal which is generated by the reference signal generating section 15, thereby distributing the reference optical signal.

Namely, the reference optical signals are distributed in parallel through the existing optical transmission lines which are formed from the wavelength multiplexing apparatus to the signal conversion apparatuses to which the reference optical signals should be distributed and are used for transmitting the aforementioned optical signal to the signal conversion apparatuses.

Therefore, the existing optical transmission lines can be shared while suppressing substantial expansion of the hardware, as long as the aforementioned optical amplifier is existing and the reference optical signals can be regenerated by the respective signal conversion apparatuses.

Figure 5:
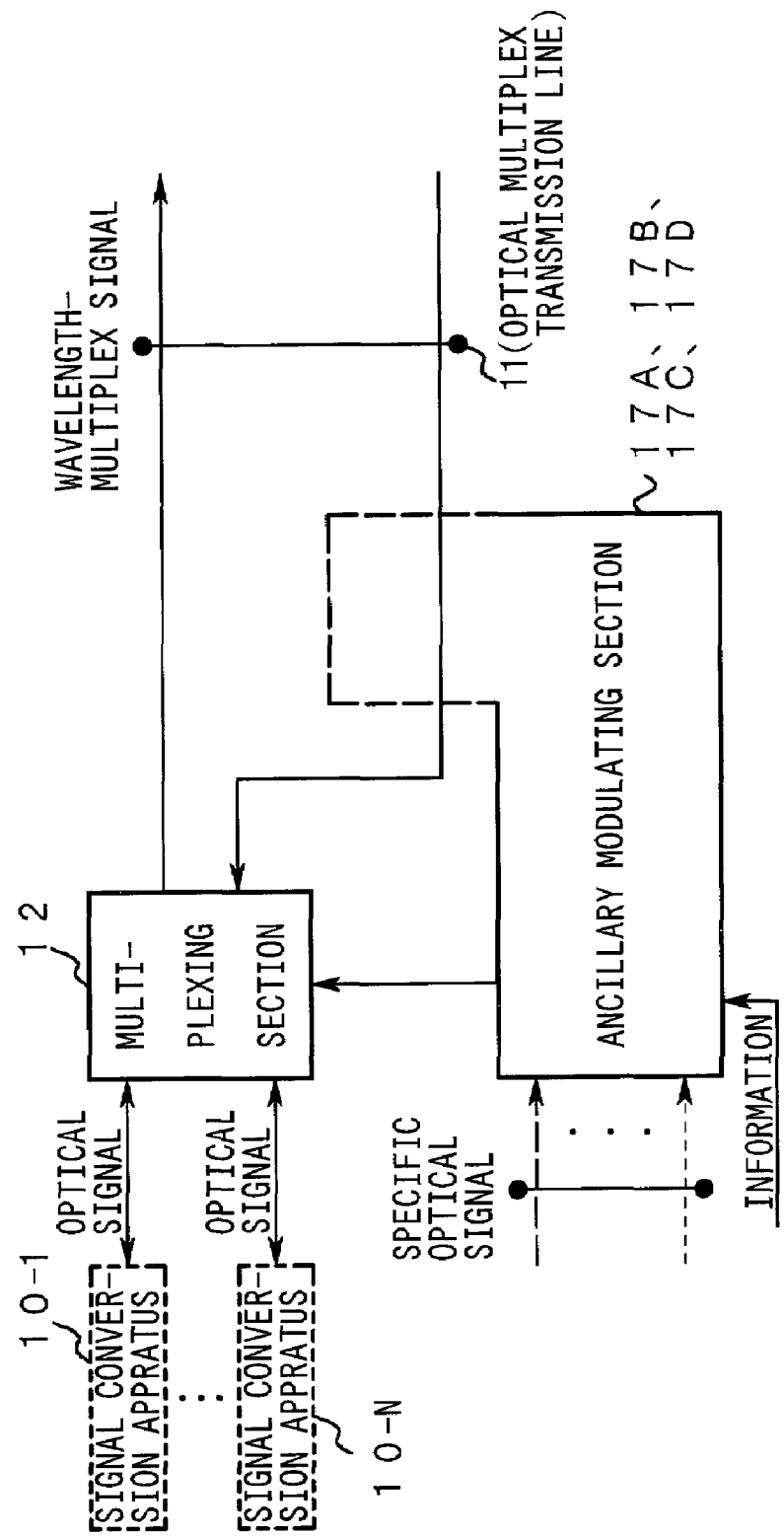
FIG. 5 is a block diagram showing a fifth principle of the wavelength multiplexing apparatus according to the present invention.

FIG. 5 shows a third principle of the wavelength multiplexing apparatus according to the present invention.

The wavelength multiplexing apparatus as shown in FIG. 3 is composed of the multiplexing section 12 which is connected to the signal conversion apparatuses 10-1 to 10-N and the optical multiplex transmission line 11 and the ancillary modulating sections 17A, 17B, 17C, 17D.

The fifth principle of the wavelength multiplexing apparatus according to the present invention is as follows.

The multiplexing section 12 multiplexes and/or demultiplexes the optical signals with different wavelengths to/from the wavelength-multiplex signal which is transferred through the optical multiplex transmission line 11. The optical signals are transmitted or received by the plurality of the signal conversion apparatuses 10-1 to 10-N. The ancillary modulating section 17A modulates the wavelength-multiplex signal to be demultiplexed by the multiplexing section 12, according to the information about the maintenance and/or the operation of the signal conversion apparatuses 10-1 to 10-N.

Namely, the information is distributed in parallel to the signal conversion apparatuses 10-1 to 10-N through the optical transmission lines which are formed between the wavelength multiplexing apparatus and the signal conversion apparatuses 10-1 to 10-N.

This makes it possible to simplify the wiring and substantially shorten the total length as compared with the conventional example in which the transmission lines for transmitting such information are individually underlaid between the signal source of the information and the signal conversion apparatuses 10-1 to 10-N.

The sixth principle of the wavelength multiplexing apparatus according to the present invention is as follows.

The ancillary modulating section 17A modulates the intensity of the pumping light which is used for the amplification of the wavelength-multiplex signal, according to the information about the maintenance and/or the operation, thereby modulating the wavelength-multiplex signal.

The pumping light is easily modulated by varying power used for driving a pumping light source, or an optical gain (attenuation amount) of the optical transmission line through which the pumping light propagates.

Therefore, the structure is simplified and power consumption is reduced as compared with the case where hardware dedicated for the modulation needs to be provided.

The seventh principle of the wavelength multiplexing apparatus according to the present invention is as follows.

The multiplexing section 12 multiplexes and/or demultiplexes the optical signals with different wavelengths, to/from the wavelength-multiplex signal transferred through the optical multiplex transmission line 11. The optical signals are individually sent or received by the plurality of the signal conversion apparatuses 10-1 to 10-N. The ancillary modulating section 17B modulates a specific optical signal with a different wavelength from those of the optical signals multiplexed to the above wavelength-multiplex signal, according to information about maintenance and/or operation of the signal conversion apparatuses 10-1 to 10-N. The multiplexing section 12 distributes the specific optical signal which is modulated by the ancillary modulating section 17B to the signal conversion apparatuses 10-1 to 10-N.

Namely, the information is distributed in parallel to the signal conversion apparatuses 10-1 to 10-N via a channel formed by the specific optical signal whose wavelength is different from those of the optical signals to be distributed to the signal conversion apparatuses 10-1 to 10-N.

Therefore, the transmission quality in the existing channels is highly maintained as long as the optical signals which are individually distributed to the signal conversion apparatuses 10-1 to 10-N and the specific optical signal is securely demultiplexed in the wavelength region.

The eighth principle of the wavelength multiplexing apparatus according to the present invention is as follows.

A specific signal conversion apparatus wavelength-multiplexes the reference optical signal to an optical signal to be transmitted by itself. The reference signal receiving section 13 demultiplexes or extracts the reference optical signal from the optical signal in the wavelength region, thereby receiving the reference optical signal.

Namely, the reference optical signal is delivered with reliability to the reference signal receiving section 13 while the existing optical transmission line between the specific signal conversion apparatus and the reference signal receiving section 13 (wavelength multiplexing apparatus according to the present invention) is shared.

Therefore, the cost reduction along with the structure simplification can be achieved.

The ninth principle of the wavelength multiplexing apparatus according to the present invention is as follows.

The reference signal receiving section 13 receives the reference optical signals which are individually supplied from a plurality of specific signal conversion apparatuses, among the plurality of the signal conversion apparatuses 10-1 to 10-N. The reference signal distributing sections 14, 14A distribute any of the reference optical signals.

Namely, redundancy of signal sources of the reference optical signal, which should be distributed to the predetermined signal conversion apparatus and nodes connected through the optical multiplex transmission line 11, is realized, which makes it possible to select the signal source suitable for the conditions for office establishment and system configuration.

This realizes flexible adaptability to various structures.

The tenth principle of the wavelength multiplexing apparatus according to the present invention is as follows.

The reference signal receiving section 13 receives the reference optical signals which are individually supplied from the plurality of the specific signal conversion apparatuses and have a correspondence in advance to all or a part of the signal conversion apparatuses 10-1 to 10-N and the optical multiplex transmission line 11. The reference signal distributing sections 14, 14A distribute the received reference optical signals to the signal conversion apparatuses corresponding to the reference optical signals or the optical multiplex transmission line 11.

Therefore, the wavelength multiplexing apparatus according to the present invention can be synchronized with the other signal conversion apparatus which is specified by the condition for the office establishment and the system configuration, without having a section for generating the reference signal.

The eleventh principle of the wavelength multiplexing apparatus according to the present invention is as follows.

The multiplexing section 12 multiplexes and/or demultiplexes the optical signals with different wavelengths to/from the wavelength-multiplex signal which is transmitted through the optical multiplex transmission line 11. The optical signals are individually transmitted or received by the plurality of the signal conversion apparatuses 10-1 to 10-N. The ancillary modulating section 17C modulates the specific optical signal whose wavelength is different from those of the optical signals multiplexed to the wavelength-multiplex signal, according to the respective information about the maintenance and/or the operation of a part of the signal conversion apparatuses 10-1 to 10-N. The multiplexing section 12 distributes the specific optical signal modulated by the ancillary modulating section 17C to the part of the signal conversion apparatuses 10-1 to 10-N.

Namely, the information about the maintenance and/or the operation of any plurality of the signal conversion apparatuses is downloaded in parallel via the common channel which is formed by the specific optical signal.

Therefore, the number of wavelengths and the scale of the hardware which are used for downloading the information can be reduced even when the number N of the signal conversion apparatuses is large or increases/decreases substantially.

The twelfth principle of the wavelength multiplexing apparatus according to the present invention is as follows.

The multiplexing section 12 multiplexes and/or demultiplexes the optical signals with different wavelengths to/from the wavelength-multiplex signal which is transmitted through the optical multiplex transmission line 11. The optical signals are individually transmitted or received by the plurality of the signal conversion apparatuses 10-1 to 10-N. The ancillary modulating section 17D modulates a plurality N of specific optical signals whose wavelengths are different from those of the optical signals multiplexed to the wavelength-multiplex signal, according to the individual information about the maintenance and/or the operation of the signal conversion apparatuses 10-1 to 10-N. The multiplexing section 12 individually distributes the plurality N of specific optical signals which are modulated by the ancillary modulating section 17D to the signal conversion apparatuses 10-1 to 10-N.

Namely, the information to be transferred respectively to the signal conversion apparatuses 10-1 to 10-N is transmitted via the channels which are individually formed from the wavelength multiplexing apparatus to the signal conversion apparatuses 10-1 to 10-N in parallel, based on wavelength division multiplexing.

Therefore, the information can be transmitted, in a dumb-terminal procedure, even when there is no signal conversion apparatuses 10-1 to 10-N to be destinations thereof, without employing a complex multiple access system and a random access control system.

Figure 6:
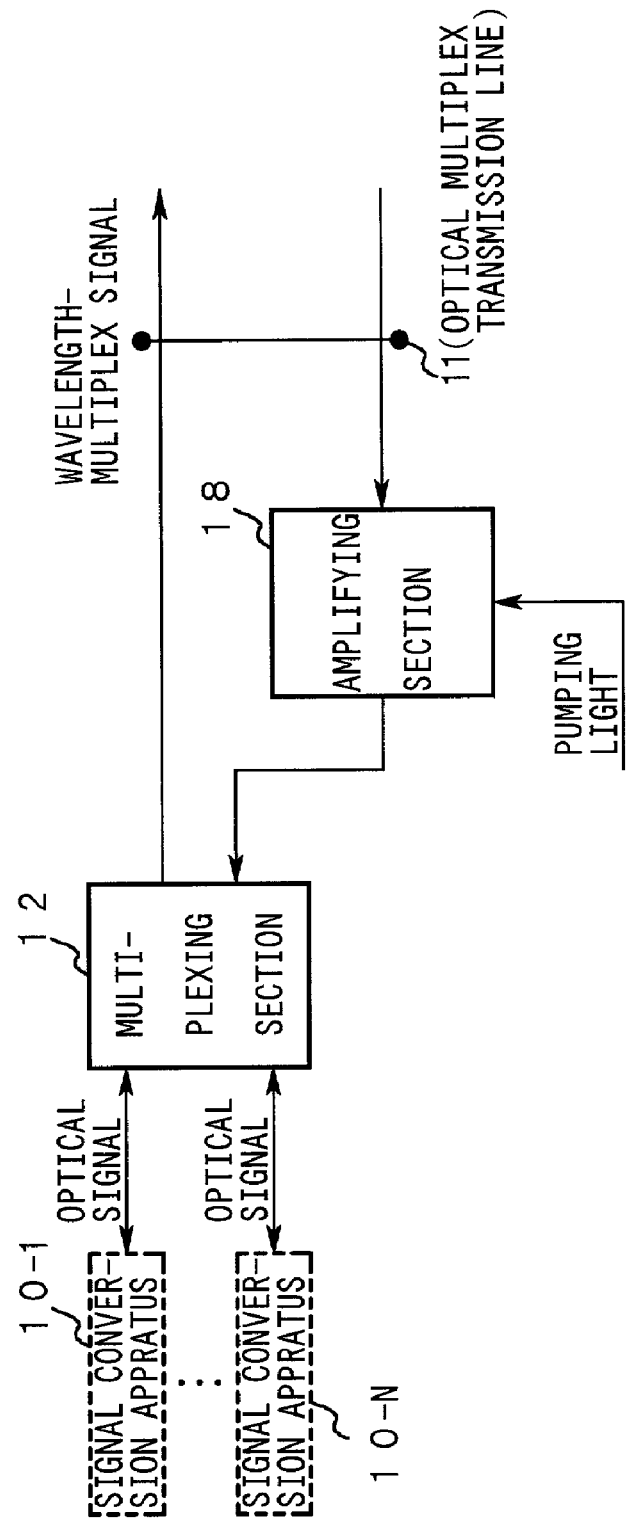
FIG. 6 is a block diagram showing a sixth principle of the wavelength multiplexing apparatus according to the present invention.

FIG. 6 shows a fourth principle of the wavelength multiplexing apparatus according to the present invention.

The wavelength multiplexing apparatus as shown in FIG. 6 is composed of the multiplexing section 12 which is connected to the signal conversion apparatuses 10-1 to 10-N and the optical multiplex transmission line 11, and an amplifying section 18 which is inserted in an incoming line corresponding to a down link of the optical multiplex transmission line 11.

The thirteenth principle of the wavelength multiplexing apparatus according to the present invention is as follows.

The multiplexing section 12 multiplexes and/or demultiplexes the optical signals with different wavelengths to/from the wavelength-multiplex signal which is transmitted through the optical multiplex transmission line 11. The optical signals are individually transmitted or received by the plurality of the signal conversion apparatuses 10-1 to 10-N. The amplifying section 18 amplifies the wavelength-multiplex signal to be demultiplexed by the multiplexing section 12, according to pumping light which is modulated according to the information about the maintenance and/or the operation of the signal conversion apparatuses 10-1 to 10-N.

Namely, the information is downloaded to the signal conversion apparatuses 10-1 to 10-N without any electrical processing for the download performed in the wavelength multiplexing apparatus according to the present invention.

Therefore, it is possible to avoid or regulate radiation of EMI due to the electrical processing with high reliability.

Figure 7:
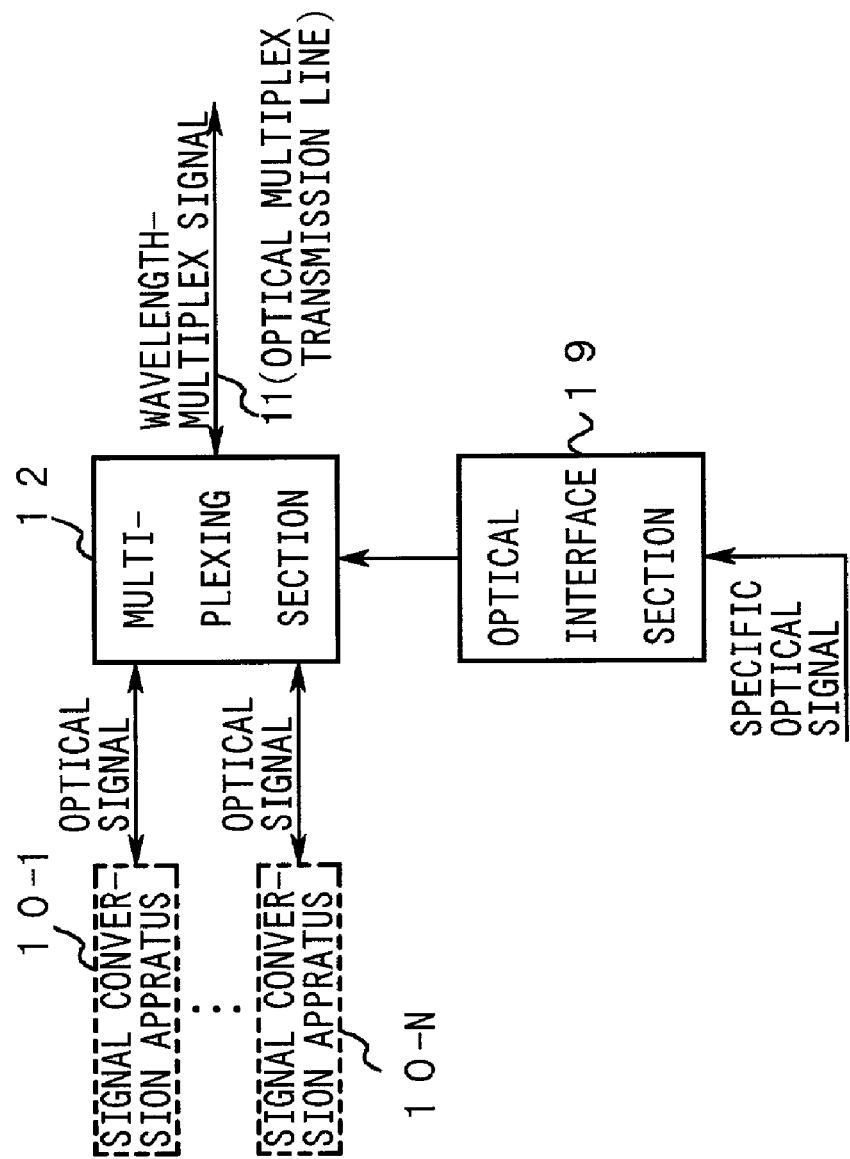
FIG. 7 is a block diagram showing a first principle of a signal conversion apparatus according to the present invention.

FIG. 7 is a block diagram showing a fifth principle of the wavelength multiplexing apparatus according to the present invention.

The wavelength multiplexing apparatus as shown in FIG. 7 is composed of the multiplexing section 12 which is connected to the signal conversion apparatuses 10-1 to 10-N and the optical multiplex transmission line 11 and an optical interface section 19.

The fourteenth principle of the wavelength multiplexing apparatus according to the present invention is as follows.

The multiplexing section 12 multiplexes and/or demultiplexes the optical signals with different wavelengths to/from the wavelength-multiplex signal which is transmitted through the optical multiplex transmission line 11. The optical signals are individually transmitted or received by the plurality of the signal conversion apparatuses 10-1 to 10-N. The optical interface section 19 supplies, to the multiplexing section 12, the specific optical signal which is modulated according to the information about the maintenance and/or the operation of the signal conversion apparatuses 10-1 to 10-N. The specific optical signal has a different wavelength from those of the optical signals multiplexed to the wavelength-multiplex signal. The multiplexing section 12 distributes the specific optical signal to any of the signal conversion apparatuses 10-1 to 10-N based on the wavelength division multiplexing.

Namely, the information is downloaded to the signal conversion apparatuses 10-1 to 10-N via the channel which is different from other channels formed by the respective optical signals multiplexed to the wavelength-multiplex signal, without any electrical processing for the download performed in the wavelength multiplexing apparatus according to the present invention.

This makes it possible to avoid or regulate the radiation of EMI due to the electrical processing with high reliability.

Figure 8:
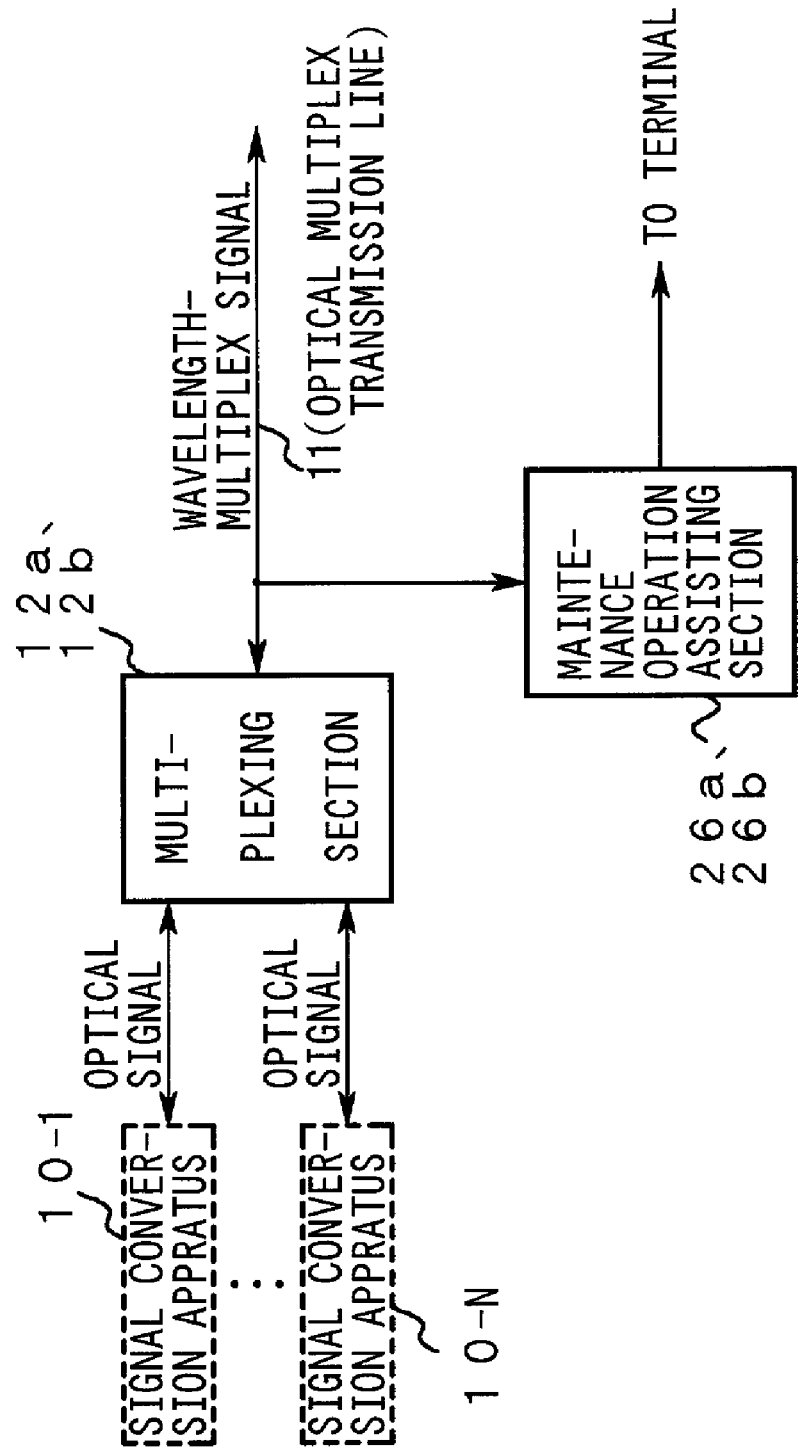
FIG. 8 is a block diagram showing a second principle of the signal conversion apparatus according to the present invention.

FIG. 8 shows a sixth principle of the wavelength multiplexing apparatus according to the present invention.

The wavelength multiplexing apparatus as shown in FIG. 8 is composed of the multiplexing section 12 which is connected to the signal conversion apparatuses 10-1 to 10-N and the optical multiplex transmission line 11 and maintenance operation assisting sections 26a, 26b.

The fifteenth principle of the wavelength multiplexing apparatus according to the present invention is as follows.

A multiplexing section 12 multiplexes and/or demultiplexes optical signals with different wavelengths to/from the wavelength-multiplex signal which is transmitted through the optical multiplex transmission line 11. The optical signals are transmitted or received by the plurality of the signal conversion apparatuses 10-1 to 10-N and are modulated according to the information about maintenance and/or operation of the signal conversion apparatuses 10-1 to 10-N. The maintenance operation assisting section 26a demodulates the wavelength-multiplex signal, which is generated during the course of multiplexing by the multiplexing section 12a, to reconstruct the information about maintenance and/or operation, and delivers the information to a terminal used for the maintenance or the operation.

Namely, the information, whose transmitting ends or destinations are the signal conversion apparatuses 10-1 to 10-N, is transmitted to the terminal via the channel which is different from other channels formed by the respective optical signals multiplexed to the wavelength-multiplex signal, without any electrical processing performed in the wavelength multiplexing apparatus according to the present invention.

Therefore, the radiation of the EMI caused by the electrical processing is avoided or regulated with high reliability, and the transmission quality and the reliability are highly maintained.

The sixteenth principle of the wavelength multiplexing apparatus according to the present invention is as follows.

A multiplexing section 12b multiplexes and/or demultiplexes optical signals with different wavelengths and specific optical signals to/from the wavelength-multiplex signal which is transmitted through the optical multiplex transmission line 11. The optical signals are individually transmitted or received by the plurality of the signal conversion apparatuses 10-1 to 10-N and the specific optical signals are individually transmitted by all or a part of the signal conversion apparatuses 10-1 to 10-N and modulated according to information about maintenance and/or operation. The maintenance operation assisting section 26b demodulates the wavelength-multiplex signal, which is generated during the course of multiplexing by the multiplexing section 12b, to reconstruct the information about maintenance and/or operation, and delivers the information to the terminal used for the maintenance or the operation.

Namely, the information, whose transmitting ends or destinations are the signal conversion apparatuses 10-1 to 10-N, is transmitted to the terminal via the channel which is different from other channels formed by the respective optical signals multiplexed to the wavelength-multiplex signal, without any electrical processing performed in the wavelength multiplexing apparatus according to the present invention.

Therefore, the radiation of the EMI which is caused by the electrical processing is avoided or regulated with high reliability, and the transmission quality and the reliability are highly maintained.

FIG. 3 shows a first principle of the signal conversion apparatus according to the present invention.

The signal conversion apparatus as shown in FIG. 3 is composed of the converting section 22 which is connected to the transmission line 20 and is connected to the optical multiplex transmission line 21 through a wavelength multiplexing apparatus 23, and a reference signal receiving section 24.

The first principle of the signal conversion apparatus according to the present invention is as follows.

The converting section 22 perform bidirectional or unidirectional conversion between a signal transferred through the transmission line 20, and an optical signal multiplexed to the wavelength-multiplex signal transferred through the optical multiplex transmission line 21 or an optical signal to be multiplexed thereto. The reference signal receiving section 24 receives the reference optical signal which is supplied from the wavelength multiplexing apparatus 23 and modulated according to the reference signal to be a reference to the synchronization with the transmission line 20. The converting section 22 synchronizes with the reference optical signal which is received by the reference signal receiving section 24.

The above reference optical signal is generated by the wavelength multiplexing apparatus 23, or distributed from the other signal conversion apparatuses through the wavelength multiplexing apparatus 23.

Therefore, it is possible to flexibly adapt to the condition for the office establishment and the system configuration and to establish the above synchronization, even when the reference to the synchronization cannot be obtained independently.

Figure 4:
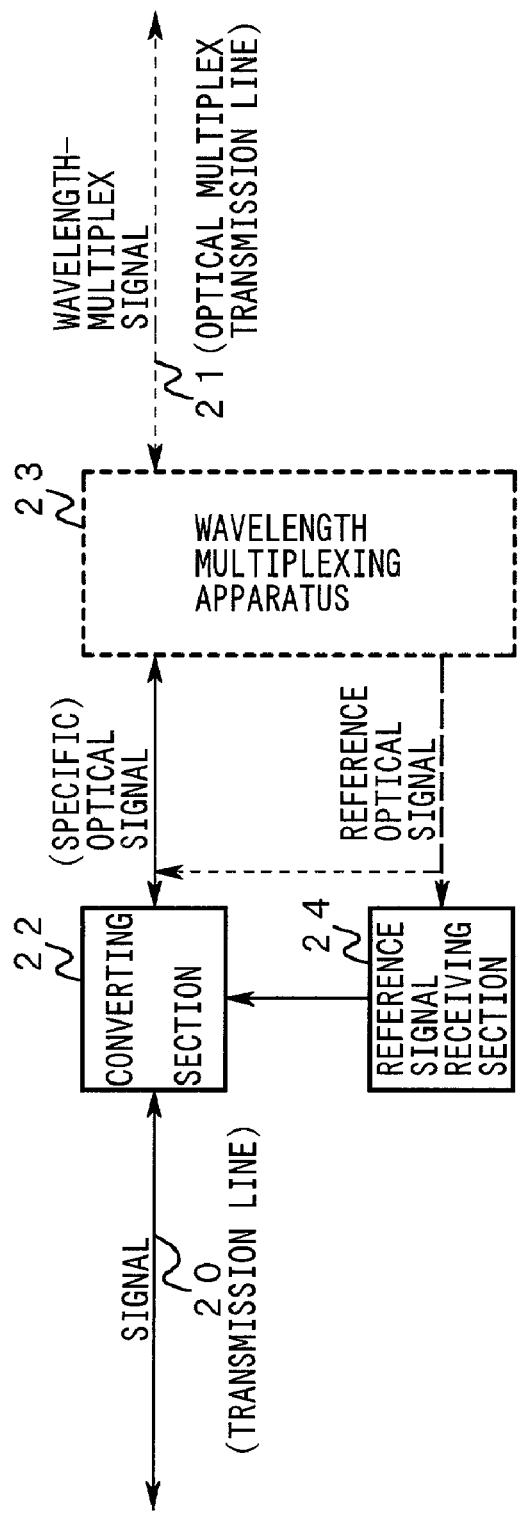
FIG. 4 is a block diagram showing a fourth principle of the wavelength multiplexing apparatus according to the present invention.

FIG. 4 shows a second principle of the signal conversion apparatus according to the present invention.

The signal conversion apparatus as shown in FIG. 4 is composed of the converting section 22 which is connected to the transmission line 20 and is connected to the optical multiplex transmission line 21 through the wavelength multiplexing apparatus 23, and a reference signal transmitting section 25.

The second principle of the signal conversion apparatus according to the present invention is as follows.

The converting section 22 performs bidirectional or unidirectional conversion between a signal transferred through the transmission line 20, and an optical signal multiplexed to the wavelength-multiplex signal transferred through the optical multiplex transmission line 21 or an optical signal to be multiplexed thereto. The reference signal transmitting section 25 transmits the reference optical signal which is modulated according to the reference signal to be a reference to synchronization with the transmission line 20 by the wavelength multiplexing apparatus 23 for multiplexing and/or demultiplexing the optical signals to/from the wavelength-multiplex signal.

The reference optical signal is a reference to the synchronization of the other signal conversion apparatuses to which the reference optical signal is distributed through the wavelength multiplexing apparatus 23.

Therefore, the signal conversion apparatus according to the present invention can be synchronized with the other signal conversion apparatuses which meets the condition for the office establishment and the system configuration.

The third principle of the signal conversion apparatus according to the present invention is as follows.

The wavelength of the reference optical signal is different from that of the optical signal. The reference signal transmitting section 25 transmits the reference optical signal to the wavelength multiplexing apparatus 23 as a specific optical signal which is multiplexed to the optical signal.

The reference optical signal is delivered with reliability to the wavelength multiplexing apparatus 23 through the existing optical transmission line which is formed from the signal conversion apparatus to the wavelength multiplexing apparatus 23 without any limitation on the modulation system, as long as it can be multiplexed to the aforementioned specific optical signal.

Therefore, the synthetic reliability is highly maintained without increasing the cost and decreasing the reliability.

The fourth principle of the signal conversion apparatus according to the present invention is as follows.

The reference optical signal is multiplexed by the wavelength multiplexing apparatus 23 to the specific optical signal which is demultiplexed from the wavelength-multiplex signal by the wavelength multiplexing apparatus 23. The reference signal receiving section 24 demultiplexes or extracts the reference optical signal in the wavelength region to receive it.

The reference optical signal is delivered through the existing optical transmission line which is formed from the signal conversion apparatus to the wavelength multiplexing apparatus 23 without any limitation on the modulation system, as long as it can be multiplexed to the specific optical signal.

Therefore, the synthetic reliability is highly maintained without increasing the cost and decreasing the reliability.

The fifth principle of the signal conversion apparatus according to the present invention is as follows.

The reference optical signal is supplied via a specific channel which is used for transmitting information about maintenance or operation of the optical transmission system including the optical multiplex transmission line 21.

The channel is the existing channel which is formed between the wavelength multiplexing apparatus of the present invention, and the nodes connected through the optical multiplex transmission line 21 or the signal conversion apparatuses 10-1 to 10-N.

Therefore, the reference optical signal is transmitted or distributed without occupying a surplus transmission band, and it is secured to flexibly adapt to expansion or a provision of new service without reducing the transmission quality.

The sixth principle of the signal conversion apparatus according to the present invention is as follows.

The converting section 22 includes the optical amplifier for optically amplifying the optical signal to be transmitted to the wavelength multiplexing apparatus 23. The reference signal transmitting section 25 transmits the reference optical signal by modulating the pumping light used for the optical amplification by the reference optical signal.

The reference optical signal is distributed in parallel through the existing optical transmission lines which are formed between the signal conversion apparatuses and the wavelength multiplexing apparatus 23, and used for transmitting the optical signal to the wavelength multiplexing apparatus 23.

Therefore, the existing optical transmission line can be shared while substantial expansion of the hardware is suppressed, as long as the optical amplifier is existing and the reference optical signal can be regenerated by the wavelength multiplexing apparatus 23.

The seventh principle of the signal conversion apparatus according to the present invention is as follows.

The reference optical signal is supplied via the specific channel which is used for transmitting the information about the maintenance or the operation of the optical transmission system including the optical multiplex transmission line 21.

The above channel is the existing channel which is formed between the signal conversion apparatus of the present invention or the nodes connected through the optical multiplex transmission line 21, and the wavelength multiplexing apparatus 23.

Therefore, the reference optical signal is transmitted or distributed without occupying the surplus transmission band, and it is secured to flexibly adapt to the expansion or the provision of the new service without reducing the transmission quality.

Figure 9:
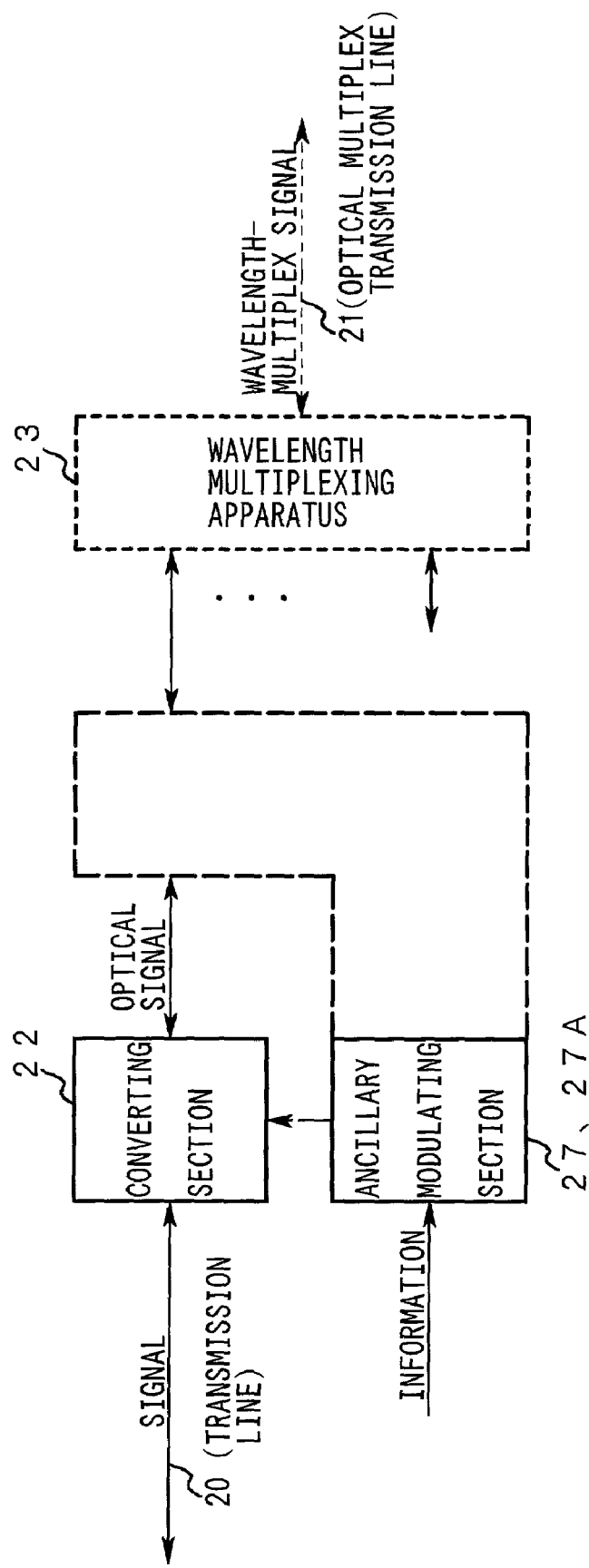
FIG. 9 is a block diagram showing a third principle of the signal conversion apparatus according to the present invention.

FIG. 9 shows a third principle of the signal conversion apparatus according to the present invention.

The signal conversion apparatus as shown in FIG. 9 is composed of the converting section 22 which is connected to the transmission line 20 and is connected to the optical multiplex transmission line 21 through the wavelength multiplexing apparatus 23, and ancillary modulating sections 27, 27A.

The eighth principle of the signal conversion apparatus according to the present invention is as follows.

A converting section 22 performs bidirectional or unidirectional conversion between a signal transferred through a transmission line 20, and an optical signal multiplexed to the wavelength-multiplex signal transferred through an optical multiplex transmission line 21 or an optical signal to be multiplexed thereto. An ancillary modulating section 27 modulates the optical signal to be multiplexed to the aforementioned wavelength-multiplex signal, according to the information about the maintenance and/or the operation.

The information is transmitted to the wavelength multiplexing apparatus through the optical transmission lines formed between the converting section 22 and the wavelength multiplexing apparatus which carries out the multiplexing and demultiplexing suitable for the optical multiplex transmission line 21.

Therefore, wiring is simplified and the total length is shortened substantially as compared with the conventional example in which the transmission lines for transmitting such information are individually underlaid between the plurality of the signal conversion apparatus of the present invention and the devices such as the terminals to be destinations of the information transmitted from the signal conversion apparatuses.

The ninth principle of the signal conversion apparatus according to the present invention is as follows.

The ancillary modulating section 27 modulates the intensity of the pumping light which is used for the amplification of the optical signal to be multiplexed to the wavelength-multiplex signal, according to the information about the maintenance and/or the operation, thereby modulating the optical signal.

The pumping light is modulated by varying power used for driving the pumping light source, or the optical gain (attenuation amount) of the optical transmission line through which the pumping light propagates.

Therefore, the structure is simplified and power consumption is reduced as compared with the case where hardware dedicated for the modulation needs to be provided.

The tenth principle of the signal conversion apparatus according to the present invention is as follows.

The converting section 22 performs bidirectional or unidirectional conversion between the signals transferred through the transmission line 20, and the optical signals which are multiplexed to the wavelength-multiplex signal transferred through the optical multiplex transmission line 21 or the optical signals to be multiplexed. The ancillary modulating section 27A modulates the specific optical signal whose wavelength is different from those of the optical signals multiplexed to the aforementioned wavelength-multiplex signal, according to the information about the maintenance and/or the operation. Based on the wavelength division multiplexing, the converting section 22 distributes the optical signal to be multiplexed to the wavelength-multiplex signal and the specific optical signal modulated by the ancillary modulating section 27A, to a wavelength multiplexing apparatus 29 for multiplexing and/or demultiplexing the wavelength-multiplex signal transferred through the optical multiplex transmission line 21.

Namely, the information is transferred to the wavelength multiplexing apparatus 29 or the terminal used for the maintenance and the operation, via the channel formed by the specific optical signal which is multiplexed by the wavelength multiplexing apparatus 29 and whose wavelength is different from those of the optical signals to be transmitted to the adjacent node through the optical multiplex transmission line.

Therefore, the transmission quality of the existing channels which are formed by the optical signals other than the specific optical signal is maintained at high level.

Figure 10:
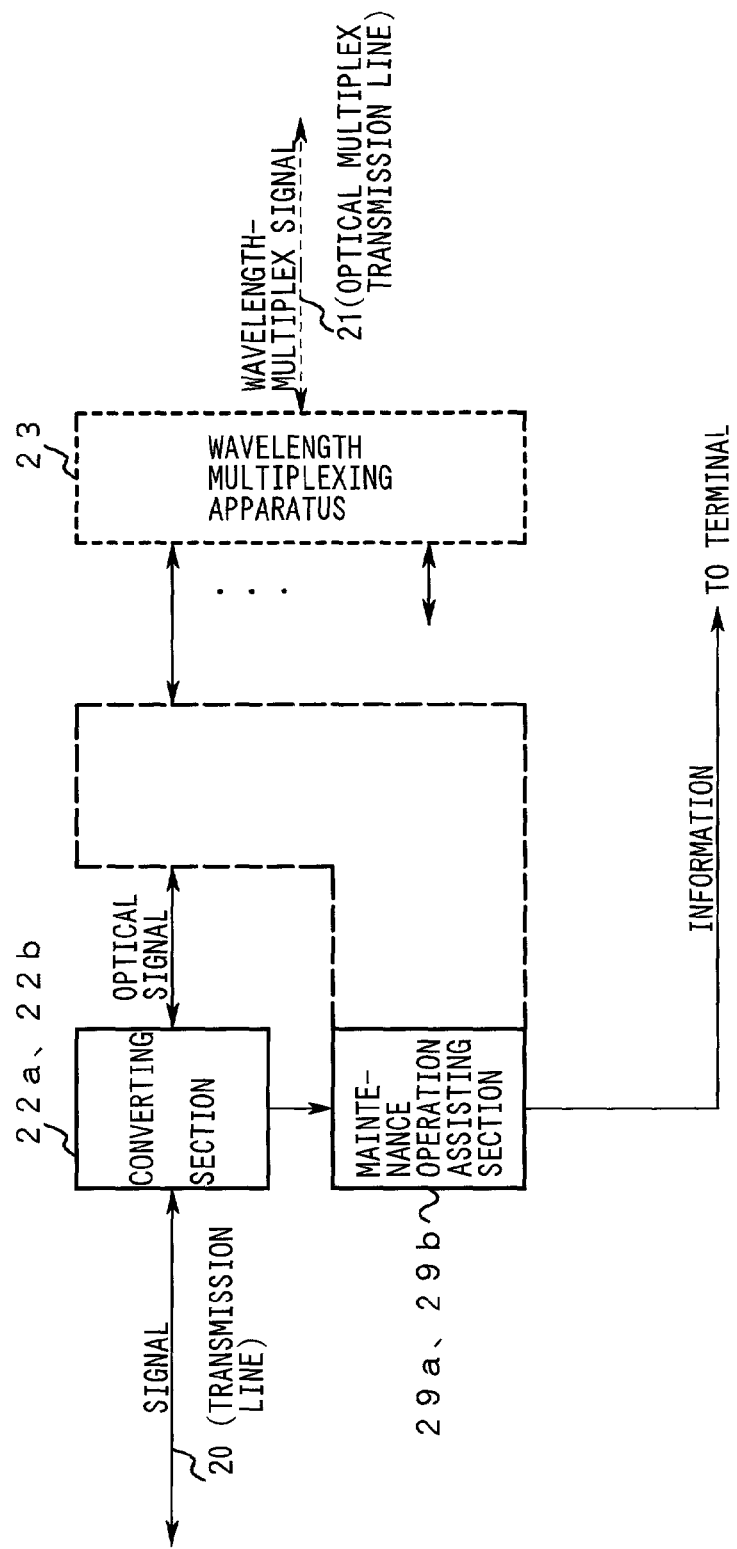
FIG. 10 is a block diagram showing a fourth principle of the signal conversion apparatus according to the present invention.

FIG. 10 shows a fourth principle of the signal conversion apparatus according to the present invention.

The signal conversion apparatus as shown in FIG. 10 is composed of converting sections 22a, 22b which are connected to the transmission line 20 and are connected to the optical multiplex transmission line 21 through the wavelength multiplexing apparatus, and maintenance operation assisting sections 29a, 29b.

The eleventh principle of the signal conversion apparatus according to the present invention is as follows.

The converting section 22a performs bidirectional or unidirectional conversion between the signal transferred through the transmission line 20, and the optical signal which is demultiplexed from the wavelength-multiplex signal transferred through the optical multiplex transmission line 21 and is modulated according to the information about the maintenance and/or the operation, or the optical signal to be multiplexed to the wavelength-multiplex signal. The maintenance operation assisting section 29a demodulates the optical signal which is generated during the conversion by the converting section 22a and is modulated according to the information about the maintenance and/or the operation to reconstruct the information, and delivers the information to the terminal used for the maintenance or the operation.

Namely, the information about the maintenance and the operation of the signal conversion apparatus becomes an operand of predetermined processing to be performed by the terminal connected to the signal conversion apparatus.

Therefore, it is possible to flexibly adapt to the node configuration and the various forms of the maintenance and operation.

The twelfth principle of the signal conversion apparatus according to the present invention is as follows.

The converting section 22b performs bidirectional or unidirectional conversion between the signal transferred through the transmission line 20, and the optical signal which is demultiplexed from the wavelength-multiplex signal transferred through the optical multiplex transmission line 21 and the special optical signal which is modulated according to the information about the maintenance and/or the operation, or the optical signal to be multiplexed to the wavelength-multiplex signal. The maintenance operation assisting section 29b demodulates the optical signal which is generated during the conversion by the converting section 22b and is modulated according to the information about the maintenance and/or the operation to reconstruct the information, and delivers the information to the terminal used for the maintenance or the operation.

Namely, the information about the maintenance and the operation of the signal conversion apparatus according to the present invention becomes the operand of the predetermined processing to be performed by the terminal connected to the signal conversion apparatus.

Therefore, it is possible to flexibly adapt to the node configuration and the various forms of the maintenance and operation.

Hereinafter, the embodiments of the present invention will be explained in detail with reference to the drawings.

Figure 11:
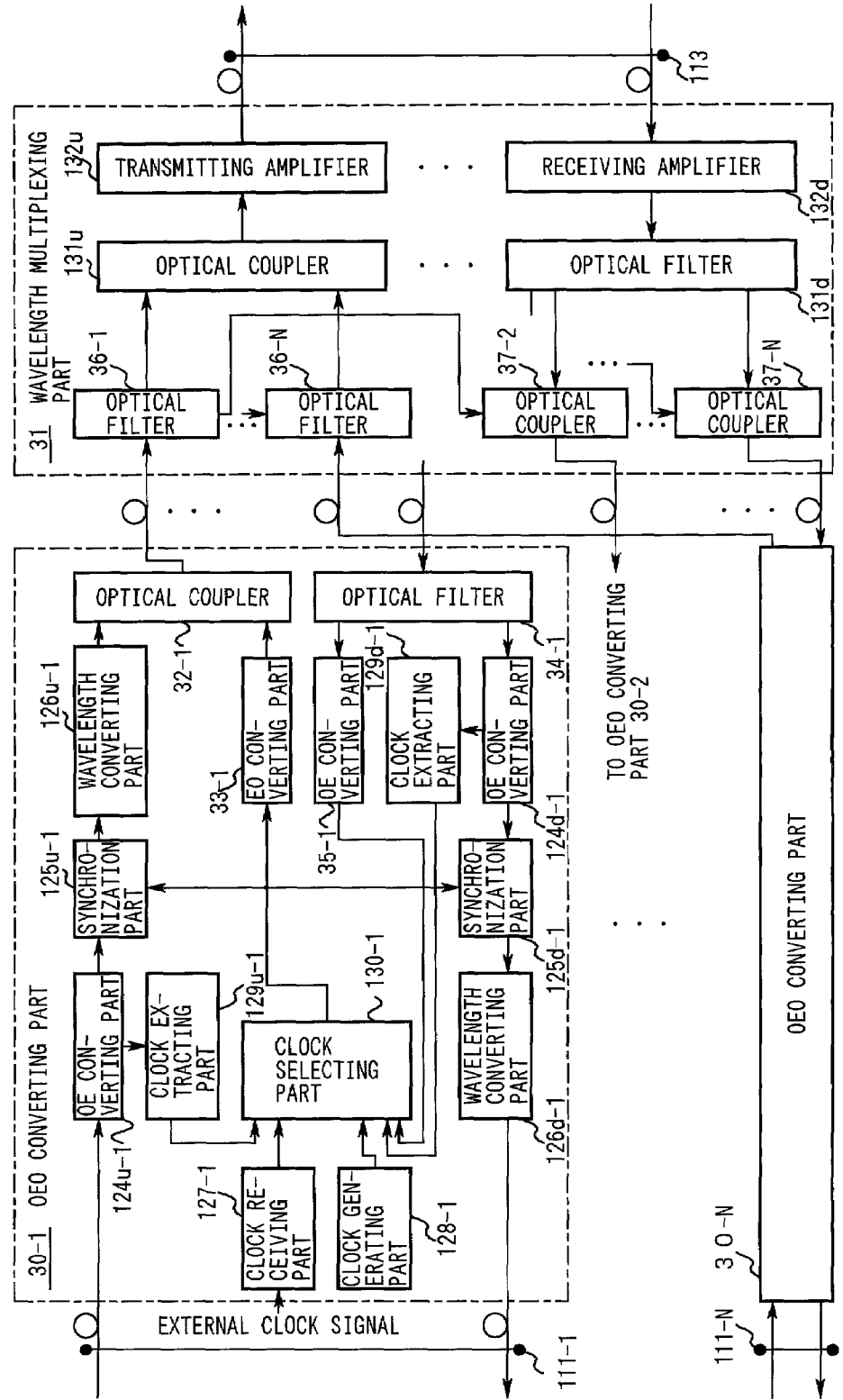
FIG. 11 is a diagram showing a first embodiment of the present invention.

FIG. 11 is a diagram showing a first embodiment of the present invention.

This embodiment is characterized in that OEO converting parts 30-1 to 30-N are provided thereto instead of the OEO converting parts 110-1 to 110-N, a wavelength multiplexing part 31 is provided thereto instead of the wavelength multiplexing part 112, and an external clock signal is supplied only to the OEO converting part 30-1.

The structure of the OEO converting part 30-1 is different from that of the OEO converting part 110-1 in that the following elements are added thereto:

an optical coupler 32-1 one of whose inputs is connected to an output of a wavelength converting part 126u-1 and whose output is connected to a corresponding multiplexing input of the wavelength multiplexing part 31, an EO converting part 33-1 whose input is connected to an output of a clock selecting part 130-1 and whose output is connected to the other input of the optical coupler 32-1, an optical filter 34-1 whose input is connected to a corresponding demultiplexing output of the wavelength multiplexing part 31 and one of whose outputs is connected to an input of an OE converting part 124-d, and an OE converting part 35-1 whose input is connected to the other output of the optical filter 34-1 and whose output is connected to a corresponding input of the clock selecting part 130-1.

Incidentally, the structures of OEO converting parts 30-2 to 30-N are the same as that of the OEO converting part 30-1 and hence, in the following explanation, the same reference numerals, added with subscripts "2" to "N", are given to designate the corresponding elements and explanations thereof are omitted.

Major differences between the structure of the wavelength multiplexing part 31 and that of the wavelength multiplexing part 112 are as follows:

Optical filters 36-1 to 36-N are provided thereto, whose inputs are respectively connected to first to Nth multiplexing inputs of the wavelength multiplexing part 31, and one of whose outputs are respectively connected to corresponding inputs of an optical coupler 131u.

Optical couplers 37-1 to 37-N are provided thereto, one of whose inputs are respectively connected to first to Nth outputs of an optical filter 131d, and whose outputs are respectively connected to first to Nth demultiplexing outputs of the wavelength multiplexing part 31.

The other outputs of the optical filters 36-1 to 36-(N−1) are respectively connected to the other inputs of the optical couplers 37-2 to 37-N.

Hereinafter, the operation of this embodiment will be explained.

In the following explanation, the elements which are common in the OEO converting parts 30-1 to 30-N are designated by using the subscript "c", which can correspond to any of the subscripts "1" to "N".

In the OEO converting part 30-c, an optical signal is generated by the wavelength converting part 126u–c, and it is sent out to the wavelength multiplexing part 31 through the optical coupler 32-c.

Incidentally, the operations of the OE converting part 124u–c, the synchronization part 125u–c, the wavelength converting part 126u–c and the clock extracting part 129u–c are the same as those of the conventional example, and hence explanations thereof are omitted.

In the wavelength multiplexing part 31, the optical filter 36-c extracts the upstream optical signal in the wavelength region and supplies it to the optical coupler 131u.

Incidentally, the operations of the optical coupler 131u and a transmitting amplifier 132u are the same as those of the conventional example, and hence explanations thereof are omitted.

Further, in the OEO converting part 30-1, the clock selecting part 130 selects, for example, the external clock signal which is supplied through a clock receiving part 127-1.

The EO converting part 33-1 converts thus-selected clock signal to an optical signal whose wavelength is different from wavelengths of any of the aforementioned upstream optical signal and downstream optical signal (hereinafter referred to as an "optical clock signal").

The optical coupler 32-1 multiplexes the upstream optical signal and the optical clock signal to generate an upstream optical multiplex signal, and sends out the upstream optical multiplex signal to the wavelength multiplexing part 31.

In the wavelength multiplexing part 31, the optical filter 36-1 demultiplexes the upstream optical signal and the optical clock signal in the wavelength region, which are multiplexed to the upstream optical multiplex signal.

The optical coupler 37-2 multiplexes the downstream optical signal which is outputted from the optical filter 131d and the optical clock signal which is demultiplexed by the optical filter 36-1, as described above, to generate a downstream optical multiplex signal, and sends out the downstream optical multiplex signal to an OEO converting part 30-2.

Incidentally, the operations of a receiving amplifier 132d and the optical filter 131d are the same as those of the conventional example, and hence explanations thereof are omitted.

In the OEO converting part 30-2, an optical filter 34-2 demultiplexes the downstream optical signal and the optical clock signal in the wavelength region, which are multiplexed to the downstream optical multiplex signal, and supplies these to OE converting parts 124-d, 35-2, respectively.

Incidentally, the operations of the OE converting part 124d–c, a synchronization part 125-d, the wavelength converting part 126d–c and the clock extracting part 129d–c are the same as those of the conventional example, and hence explanations thereof are omitted.

The OE converting part 35-2 allows the optical clock signal to be subjected to an optical-to-electrical conversion to generate a "regenerated clock signal".

A clock selecting part 130-2 supplies the regenerated clock signal as a reference clock to synchronization parts 125u-2, 125d-2, based on the setting which is given in advance according to, for example, the maintenance and operation system.

Moreover, an EO converting part 33-2 converts the reference clock signal to an optical clock signal whose wavelength is different from wavelengths of any of the aforementioned upstream optical signal and downstream optical signal.

An optical coupler 32-2 multiplexes the upstream optical signal and the optical clock signal to generate an upstream optical multiplex signal, and sends out the upstream optical multiplex signal to the wavelength multiplexing part 31.

In the wavelength multiplexing part 31, an optical filter 36-(k–1) and an optical coupler 37-k, whose subscript "k" corresponds to any of the values from "3" to "N", cooperate with each other similarly to the optical filter 36-1 and the optical coupler 37-2 as described above, thereby distributing in sequence the optical clock signal which is included in the upstream optical multiplex signal to an OEO converting part 30-k.

Namely, the reference clock signal which is selected inside the OEO converting part 30-1 is distributed in sequence to the OEO converting parts 30-1 to 30-N through existing optical transmission lines which are formed between the OEO converting parts 30-1 to 30-N and the optical multiplexing part 31.

Therefore, not only the structure of the lines, which is necessary for distributing the reference clock signal, is simplified and standardized, but also the EMI level is reduced, the cost is reduced and the reliability is increased, regardless of the number N of the OEO converting parts 30-1 to 30-N, the arrangements of the OEO converting parts 30-1 to 30-N and the optical multiplexing part 31, the attributes (group and the like) of optical transmission lines 111-1 to 111-N, and the multiplicity (number of wavelengths) of the wavelength-multiplex signal to be transmitted through an optical multiplex transmission line 113.

In this embodiment, each of the EO converting parts 33-2 to 33-(N–1), which are provided in the OEO converting parts 30-2 to 30-(N–1) respectively, distributes the clock signal which is supplied from the OEO converting parts 30-1 to 30-(N–2) through the optical multiplexing part 31 to the OEO converting parts 30-3 to 30-N, as the optical clock signal.

Figure 12:
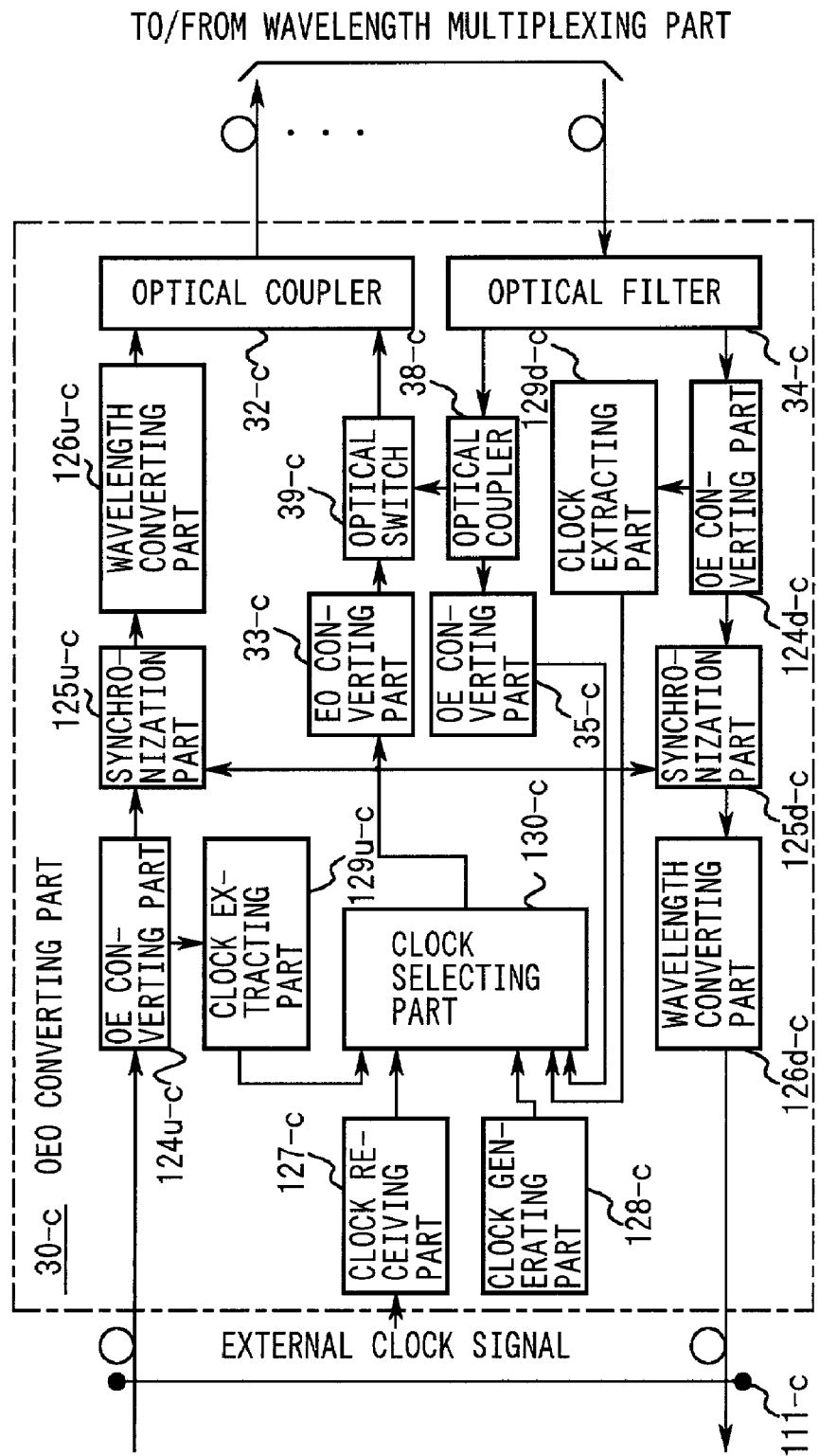
FIG. 12 is a diagram (1) showing another structure of the first embodiment of the present invention.

However, the present invention is not limited to the above structure, and, for example, an optical coupler 38-c and an optical switch 39-c as follows may be provided as shown in FIG. 12, and an optical clock signal generated by the EO converting part 33-c may be supplied, according to the reference clock signal supplied from the clock selecting part 130-c, to the optical coupler 32-c through the optical switch 39-c, instead of the "optical clock signal distributed from the OEO converting part 30-(c–1) through the optical multiplexing part 31", thereby flexibly corresponding to predetermined plural groups.

The optical coupler 38-c which forms an optical branch path in an inter-stage of the optical filter 34-c and the OE converting part 124d–c

The optical switch 39-c arranged in an inter-stage of the OE converting part 33-c and the optical coupler 32-c, forming optical paths which can be switched manually between the output of the EO converting part 33-c or an output of the optical coupler 38-c and the optical coupler 32-c

Moreover, in this embodiment, the reference clock signal which is selected by the clock selecting part 130-c is subjected to an electrical-to-optical conversion by the EO converting part 33-c, and multiplexed to the upstream optical signal by the optical coupler 32-c to be sent out to the wavelength multiplexing part 31.

Figure 13:
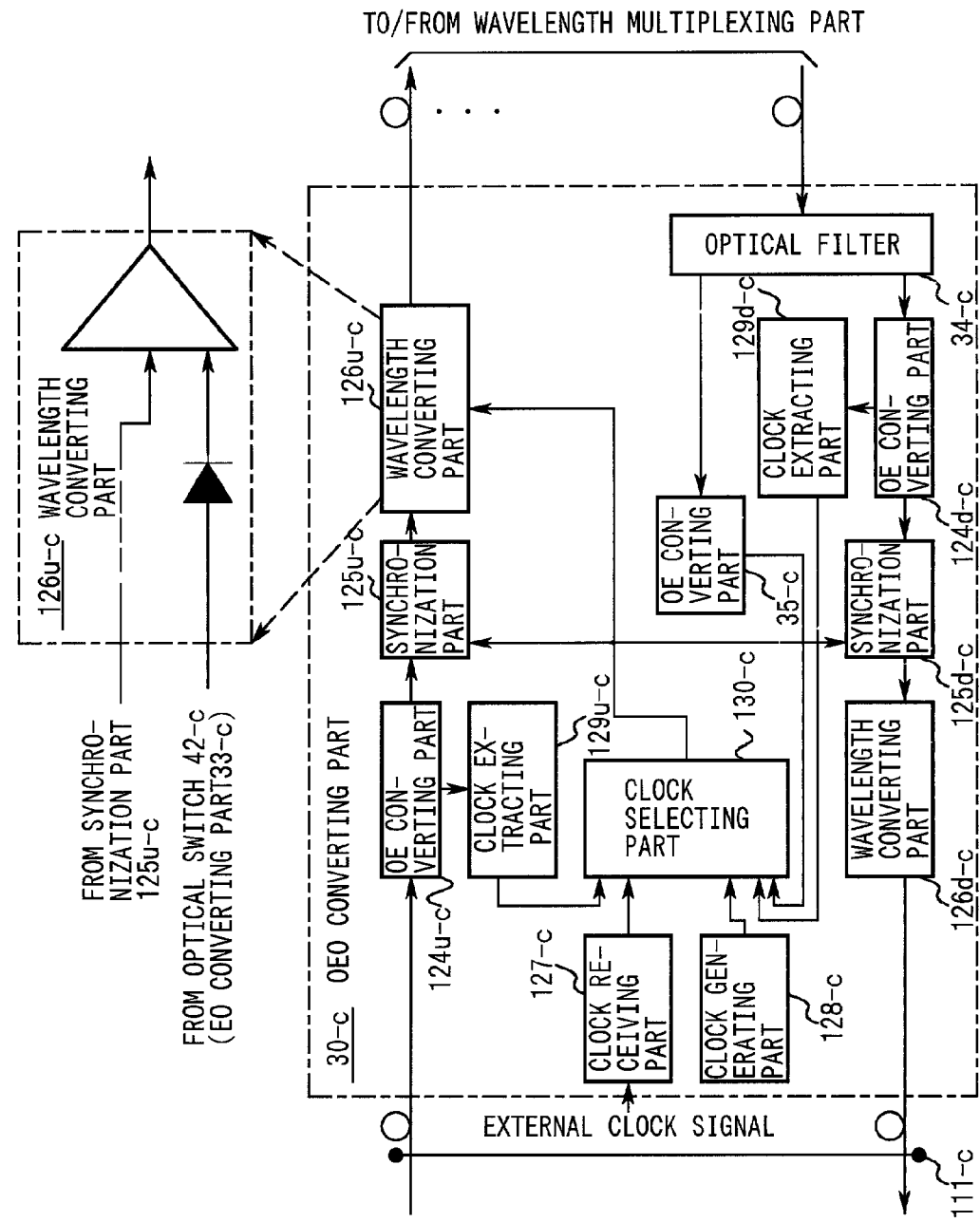
FIG. 13 is a diagram (2) showing still another structure of the first embodiment of the present invention.

However, the present invention is not limited to the above structure, and the following structure as shown in FIG. 13 may be applied thereto, whereby the upstream optical signal may be subjected to an intensity modulation according to the reference clock signal. Incidentally, an element, which is to be provided in the wavelength multiplexing part 31 instead of the splitter 36-c in order to extract the reference clock signal from the above intensity-modulated upstream optical signal, can be realized by applying various publicly-known technology, and hence its explanation is omitted.

The EO converting part 33-c and the optical coupler 32-c are not provided thereto.

An operating point of an LED for supplying pumping light to an optical amplifier provided in the wavelength converting part 126u–c is slightly varied according to the reference clock signal.

Figure 14:
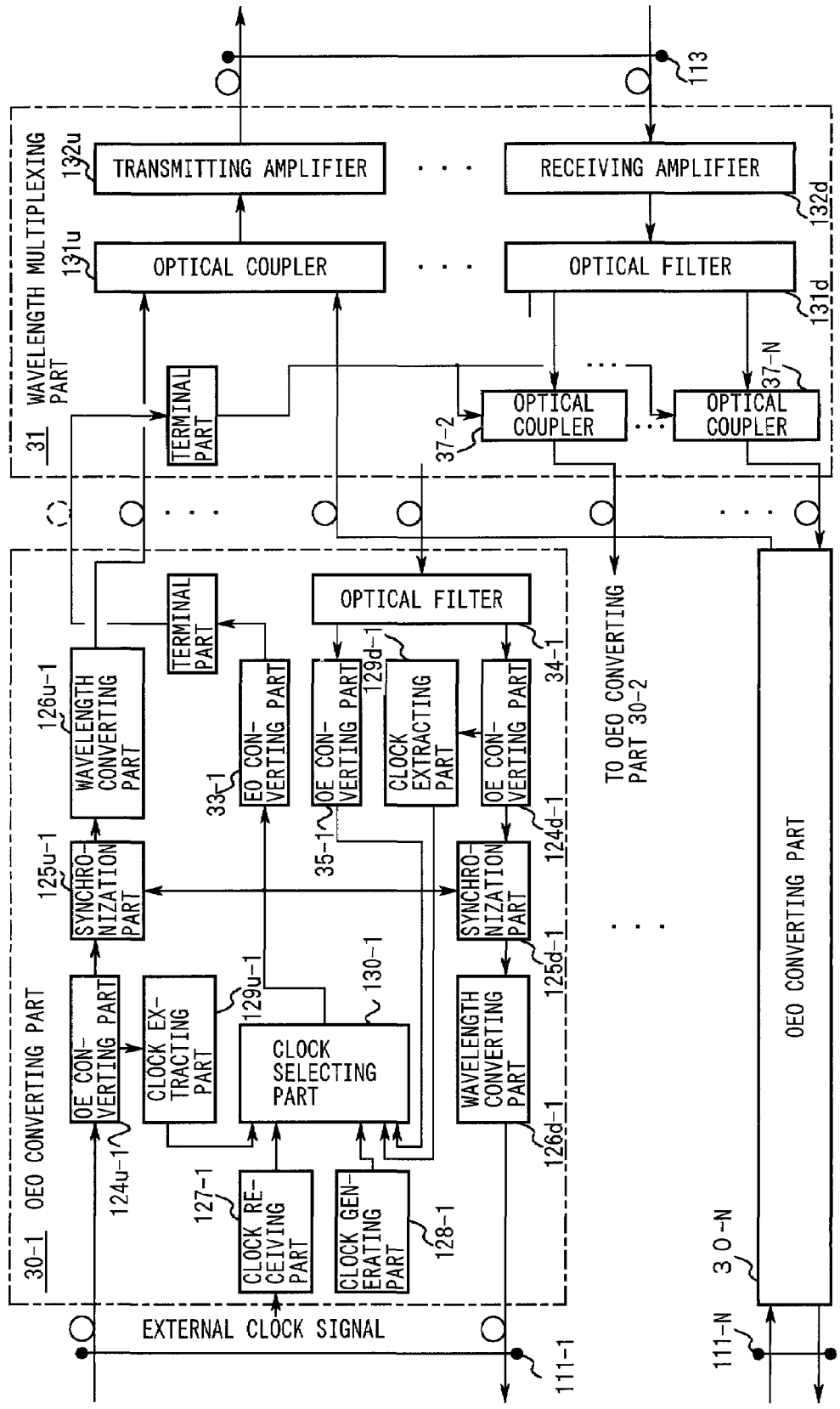
FIG. 14 is a diagram (3) showing yet another structure of the first embodiment of the present invention.

Furthermore, in a specific OEO converting part of the OEO converting parts 30-1 to 30-N, in which a link used only for the maintenance and the operation is underlaid (which may be an OSC: Optical Supervisory Channel) between the specific OEO part and the wavelength multiplexing part 31 as shown in FIG. 14, the aforementioned reference clock signal or the optical clock signal may be delivered through terminal parts which are respectively arranged at both ends of the link (the specific OEO converting part and the wavelength multiplexing part 31), without being multiplexed to the upstream optical signal.

Moreover, in this embodiment, the external clock signal, which is supplied from the outside to the OEO converting part 30-1 and is fed through the clock receiving part 127-1 and the clock selecting part 130-1, is distributed in sequence as the reference clock signal to the OEO converting parts 30-2 to 30-N.

However, the reference clock signal may be, for example, a clock signal which is generated by a clock generating part 128-1 or a clock signal which is extracted by either of the clock extracting parts 129u-1, 129d-1.

Figure 15:
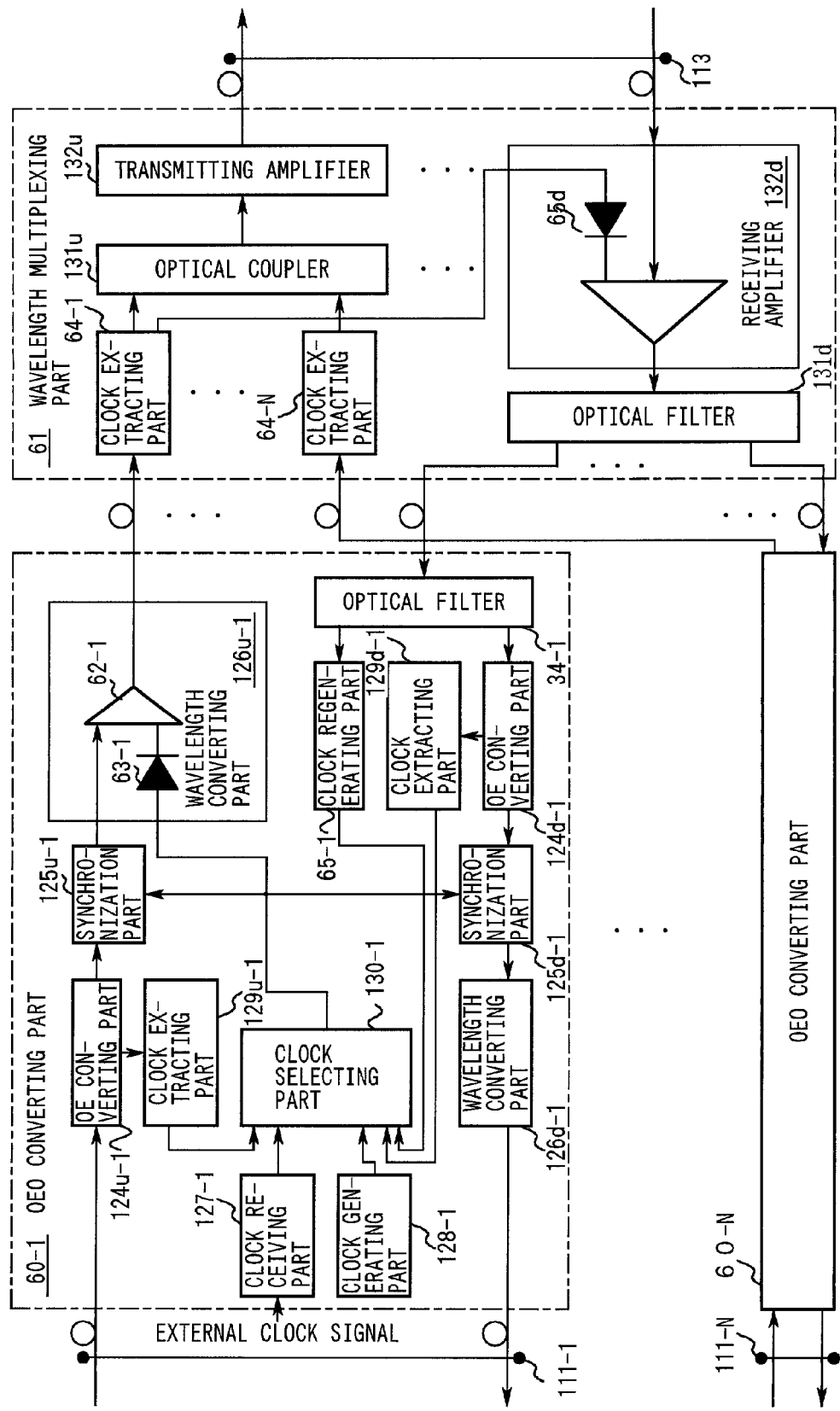
FIG. 15 is a diagram showing a second embodiment of the present invention.

FIG. 15 is a diagram showing a second embodiment of the present invention.

The structure of this embodiment is characterized in that an OEO converting part 60-1 is provided instead of the OEO converting part 30-1 and a wavelength multiplexing part 61 is provided instead of the wavelength multiplexing part 31.

The following are structural differences between the OEO converting part 60-1 and the OEO converting part 30-1.

The optical coupler 32-1 and the EO converting part 33-1 are not provided thereto.

An output of a wavelength converting part 126u-1 is connected to a corresponding input of the wavelength multiplexing part 61.

An optical amplifier 62-1 is provided in the wavelength converting part 126u-1.

An output of a clock selecting part 130-1 is connected to a bias circuit of an LED 63-1 which supplies pumping light to the optical amplifier 62-1.

An optical coupler 34A-1 is provided instead of the optical filter 34-1.

A clock regenerating part 65-1 is provided instead of the OE converting part 35-1.

The structure of the wavelength multiplexing part 61 is different from that of the wavelength multiplexing part 31 as follows:

The optical couplers 37-1 to 37-N are not provided thereto.

First to Nth outputs of an optical filter 131d are connected to corresponding inputs of OEO converting parts 60-1 to 60-N.

Clock extracting parts 64-1 to 64-N are provided instead of the optical filters 36-1 to 36-N.

A clock output of any of the clock extracting parts 64-1 to 64-N (supposing that it is designated as "64-1" for simplifying the explanation) is connected to a bias circuit of an LED 67 which supplies pumping light to a receiving amplifier 132d.

Figure 16:
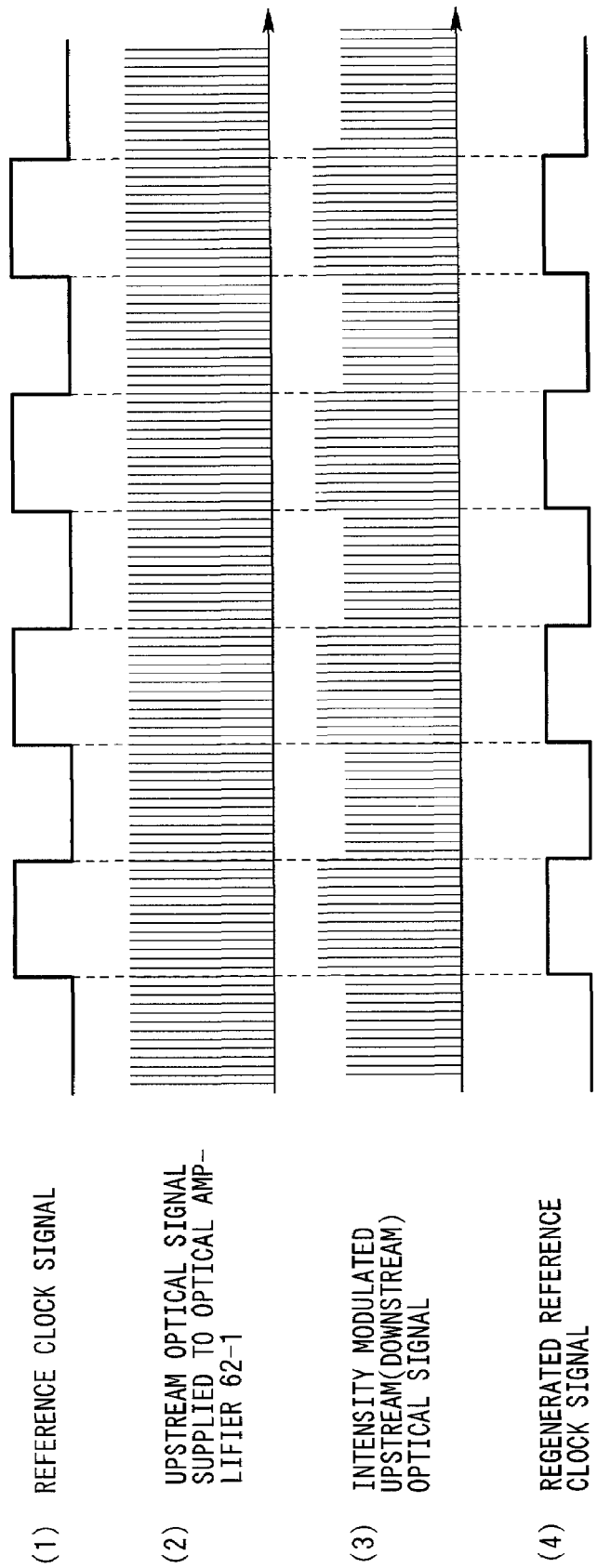
FIG. 16 is an operation time chart of the second embodiment of the present invention.

FIG. 16 is an operation time chart of the second embodiment of the present invention.

Hereinafter, the operation of this embodiment will be explained with reference to FIG. 15 and FIG. 16.

In the OEO converting part 60-1, the LED 63-1 increases/decreases the intensity of the pumping light according to an instantaneous value of a reference clock signal (FIG. 16(1)) which is supplied from the clock selecting part 130-1.

Therefore, an upstream optical signal (FIG. 16(2)) which is outputted from the wavelength converting part 126u-1 and supplied to the wavelength multiplexing part 61 is subjected to the intensity modulation according to the reference clock signal (FIG. 16(3)).

In the wavelength multiplexing part 61, the clock extracting part 64-1 supplies the upstream optical signal to an optical coupler 131u to demodulate it, thereby regenerating the reference clock signal (FIG. 16(4)).

The LED 67 increases/decreases the intensity of the pumping light to be supplied to a receiving amplifier 132d, according to an instantaneous value of thus-regenerated reference clock signal.

Therefore, in the receiving amplifier 132d, respective downstream optical signals which are supplied via a down link of an optical multiplex transmission line 113 and multiplexed are subjected to the intensity modulation in parallel according to the reference clock signal.

Namely, the downstream optical signals which are supplied in parallel to the OEO converting parts 60-1 to 60-N through the optical coupler 131d are simultaneously subjected to the intensity modulation according to the reference clock signal in the wavelength multiplexing part 61.

In the OEO converting parts 60-2 to 60-N, optical couplers 34A-2 to 34A-N supply the downstream optical signals, supplied from the wavelength multiplexing part 61, to OE converting parts 124d-2 to 124d-N and clock regenerating parts 65-2 to 65-N in parallel.

The clock regenerating parts 65-2 to 65-N demodulate the downstream optical signal, regenerate the reference clock signal, and supply the reference clock signal to clock selecting parts 130-2 to 130-N.

Thus, in this embodiment, the reference clock signal is simultaneously distributed to the OEO converting parts 60-2 to 60-N without complicating the structure of the hardware.

Therefore, it is possible to maintain the synchronization accurately and stably between OEO converting parts 60-1 to 60-N, regardless of the number N of the OEO converting parts 60-1 to 60-N.

Figure 17:
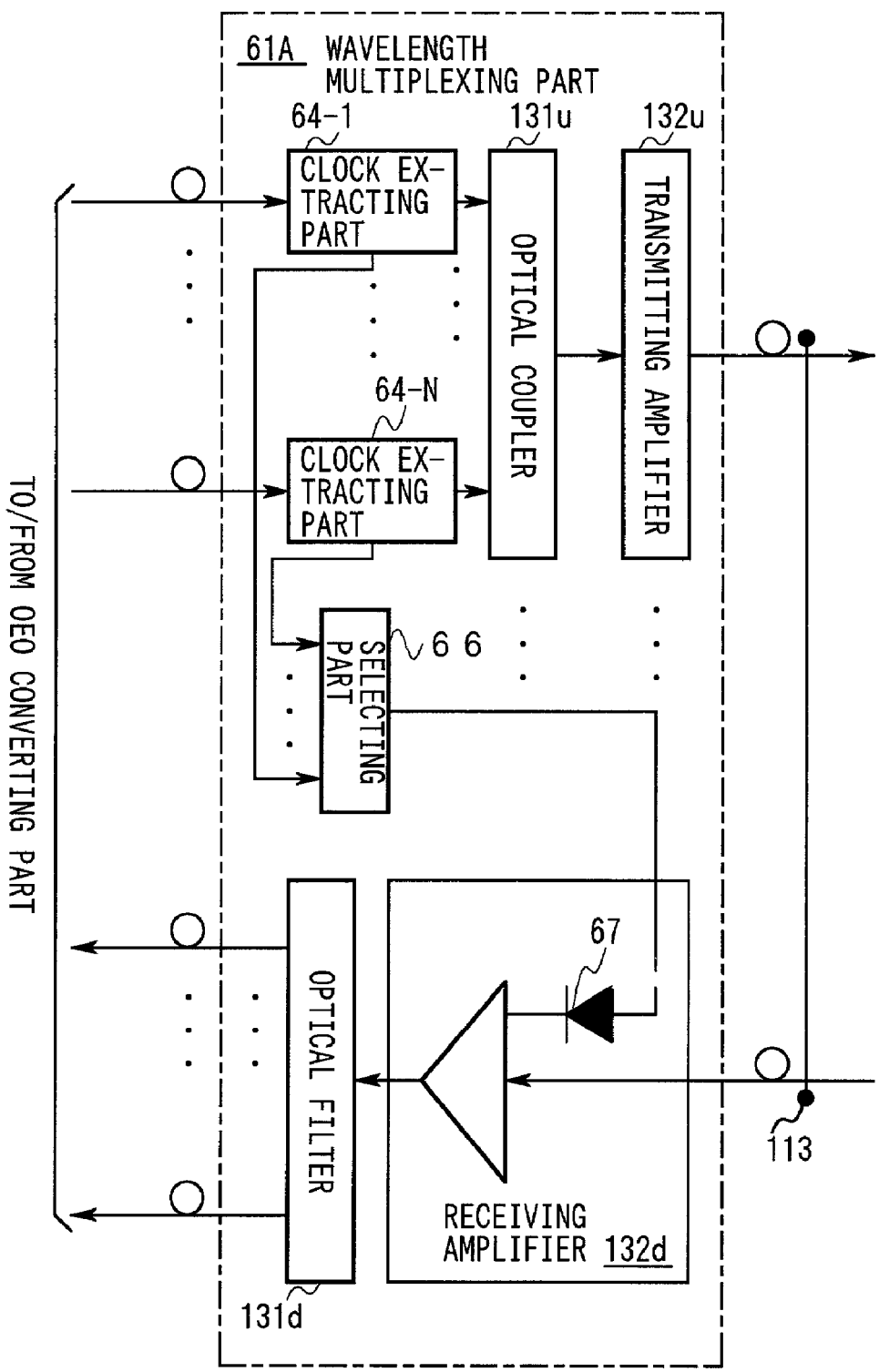
FIG. 17 is a diagram showing a third embodiment of the present invention.

FIG. 17 is a diagram showing a third embodiment of the present invention.

This embodiment is characterized in that a wavelength multiplexing part 61A is provided instead of the wavelength multiplexing part 61.

The structure of the wavelength multiplexing part 61A is different from that of the wavelength multiplexing part 61 as follows:

A selecting part 66 whose inputs are connected to clock terminals of all or a part of clock extracting parts 64-1 to 64-N (supposing that the inputs are connected to all of them for simplifying the explanation) is provided thereto.

An output of the selecting part 66, instead of the clock output of the clock extracting part 64-1, is connected to a bias circuit of an LED 67.

Hereinafter, the operation of this embodiment will be explained.

In this embodiment, not only an OEO converting part 60-1, but also OEO converting parts 60-2 to 60-3 respectively supply an upstream optical signal in parallel, whose intensity is modulated according to the reference clock signal, to the wavelength multiplexing part 61A.

In the wavelength multiplexing part 61A, the clock extracting parts 64-1 to 64-N demodulate the upstream optical signals to regenerate the reference clock signal, respectively.

The selecting part 66 selects a single reference clock signal, out of the reference clock signals, which is uniquely determined according to office data which meets the condition for office establishment and/or redundant system configurations of the OEO converting parts 60-1 to 60-N, and supplies the reference clock signal to the bias circuit of the LED 67.

Namely, a source of the reference clock signal to be distributed simultaneously to the OEO converting parts 60-1 to 60-N is set in any one of the OEO converting parts which flexibly meets the conditions for the office data and the system configuration.

As a result, it is possible to flexibly correspond to the maintenance and operation systems and to highly maintain the service quality and the reliability, as compared with the case in which the source is limited to the single OEO converting part selected in advance.

Incidentally, in this embodiment, the reference clock signal which is selected by the selecting part 66 is distributed simultaneously to all of the OEO converting parts 60-1 to 60-N.

Figure 18:
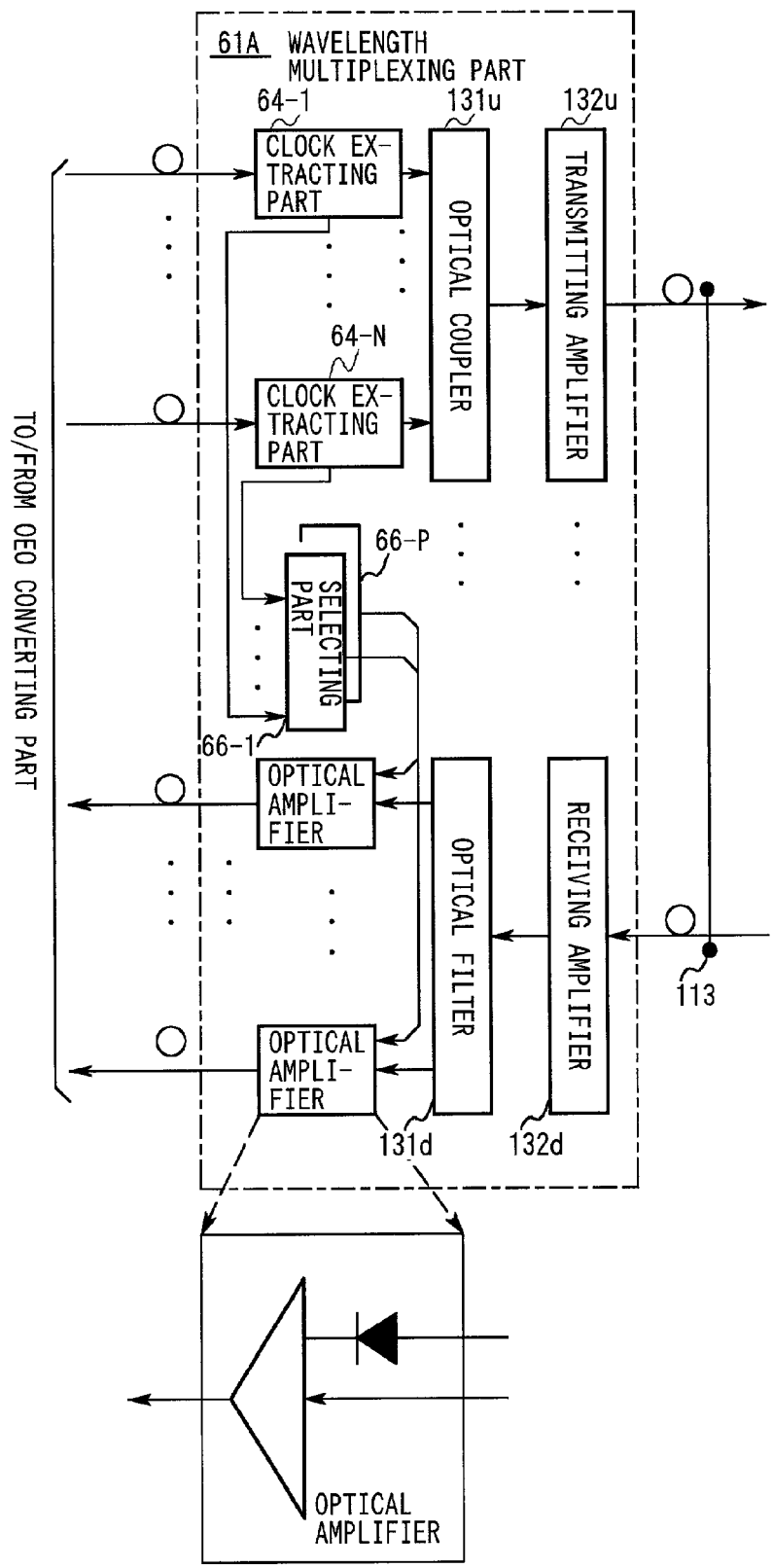
FIG. 18 is a diagram (1) showing another structure of the third embodiment of the present invention.

However, the present invention is not limited to the above structure. For example, the following structure as shown in FIG. 18 may be applied thereto in order to distribute the reference clock signals which are unique to each of the groups to which a single or a plurality of the OEO converting part(s) belong(s).

A single or a plurality of selecting part(s) 66-1 to 66-P corresponding to each group is/are provided as the selecting part 66.

LEDs for supplying pumping light are provided in optical amplifiers each of which is respectively arranged at an output terminal of the optical filter 131d or on its subsequent stage.

A corresponding output of the selecting parts 66-1 to 66-P is connected to a single or a plurality of the LED(s) belonging to the respective groups, out of the LEDs.

Moreover, in this embodiment, the selecting part 66 (66-1 to 66-P) selects any of the plurality of the reference clock signals which are supplied as electrical signals.

Figure 19:
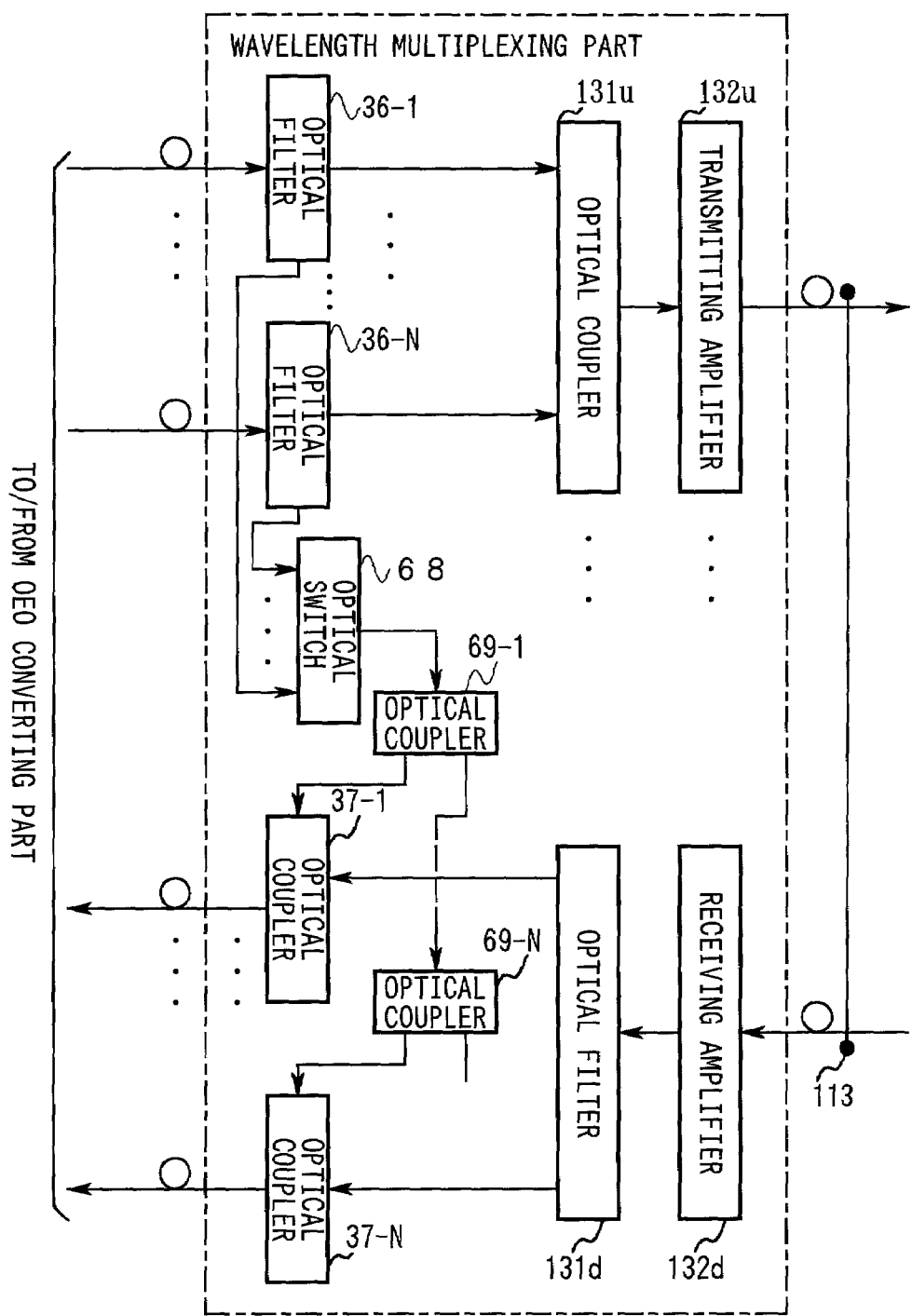
FIG. 19 is a diagram (2) showing still another structure of the third embodiment of the present invention.
Figure 20:
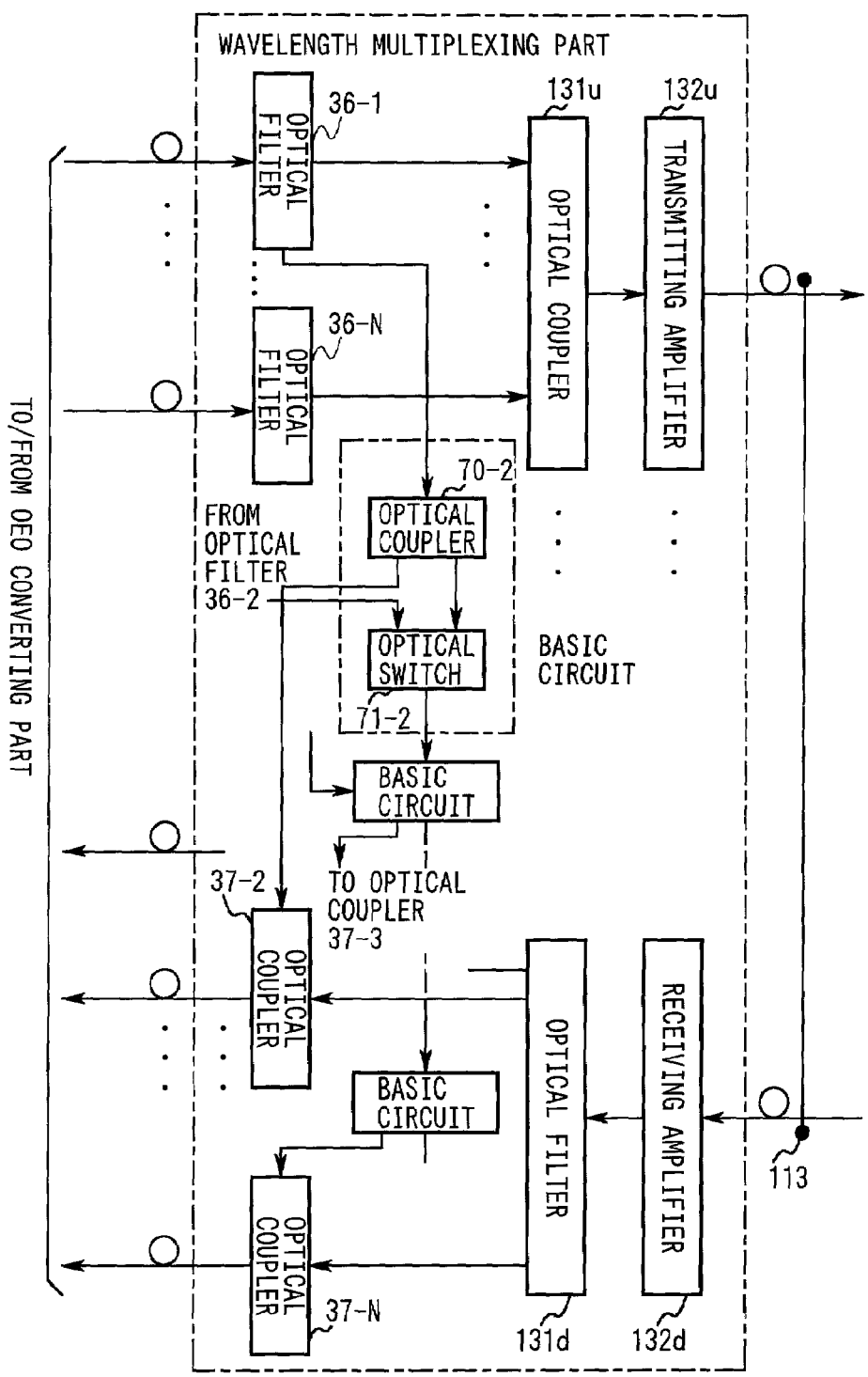
FIG. 20 is a diagram (3) showing yet another structure of the third embodiment of the present invention.

However, the present invention is not limited to the above structure, and when the present invention is applied to the wavelength multiplexing part 31 shown in FIG. 11, for example, an optical switch 68 may be provided thereto instead of the selecting part 66. As shown in FIG. 19, inputs of the optical switch 68 are connected to corresponding outputs of optical filters 36-1 to 36-N, and its output is connected to corresponding inputs of optical couplers 37-1 to 37-N through optical couplers 69-1 to 69-N.

Further, in this embodiment, the reference clock signal to be distributed to the OEO converting parts 60-1 to 60-N is selected by the single selecting part 66 (optical switch 68) or the plurality of the selecting parts 66-1 to 66-N corresponding to the respective groups.

However, the present invention is not limited to the above structure. When, for example, all of the OEO converting parts which belong to the same group are arranged as a group in the order of the subscript n (=1 to N) which is added to the numeral "60", basic circuits, each of which is composed of a following optical coupler and an optical switch, may be cascaded in the ascending order of the subscript n, in order to standardize the structure.

An optical coupler 70-$n$ for dividing an optical clock signal into two, which is supplied from an optical switch 69-$(n-1)$ (or an OEO converting part 60-$(n-1)$) preceding in the ascending order of the subscript n An optical switch 70-$n$ for selecting one of the outputs of the optical coupler 70-$n$ or an output of an optical filter 36-$(n-1)$ preceding in the ascending order of the subscript n (optical clock signal supplied from the OEO converting part 60-$(n-1)$)

Incidentally, the optical coupler and the optical switch which correspond to the source of the optical clock signal to be distributed, such as the optical coupler 70-1 and the optical switch 70-1, are not necessarily provided thereto.

Figure 21:
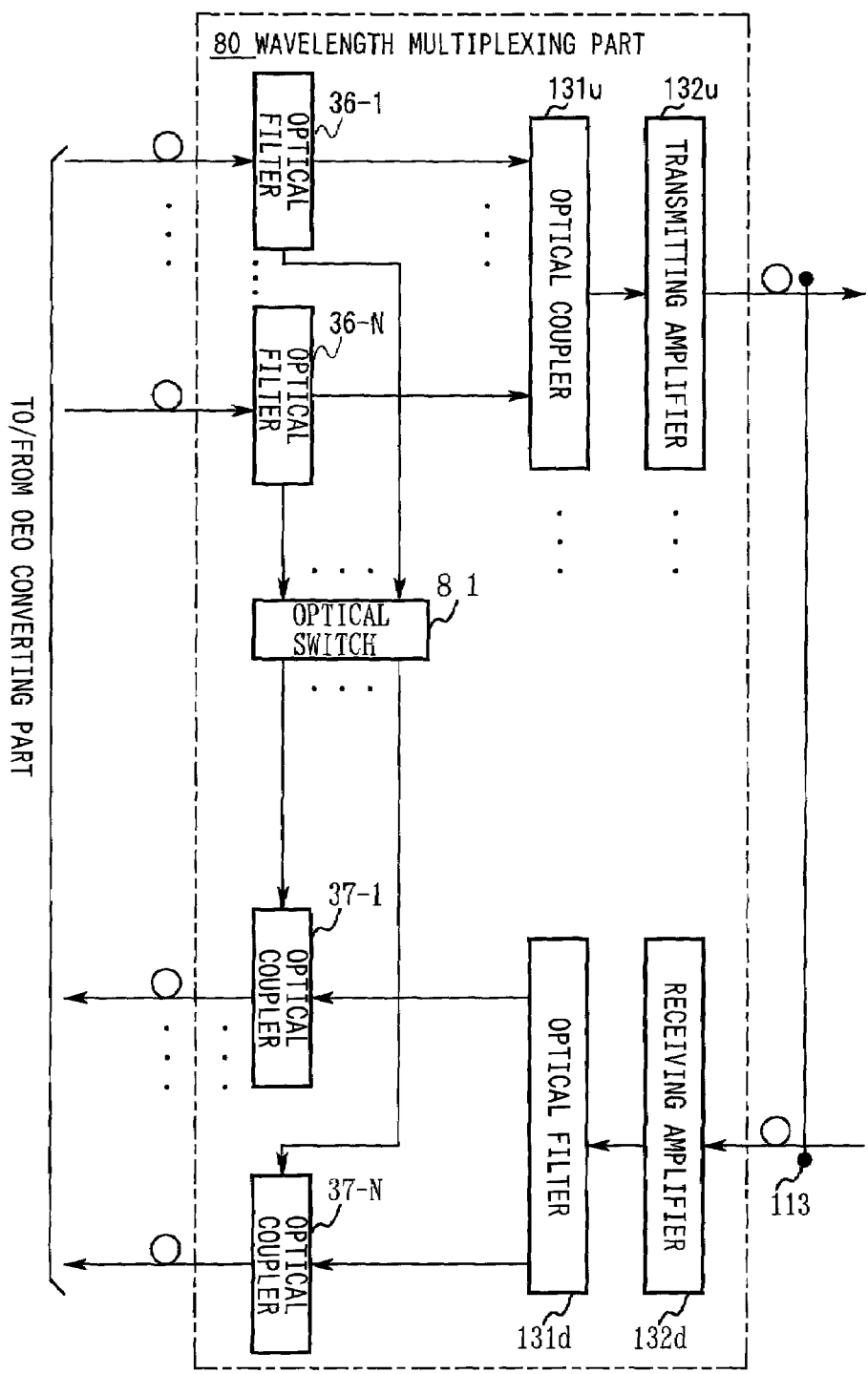
FIG. 21 is a diagram showing a fourth embodiment of the present invention.

FIG. 21 is a diagram showing a fourth embodiment of the present invention.

This embodiment is characterized in that the structure of a wavelength multiplexing part 80 is provided instead of the wavelength multiplexing part 31.

The structure of the wavelength multiplexing part 80 is different from that of the wavelength multiplexing part 31 in that an optical switch 81 is provided thereto, whose input ports are connected to the other outputs of optical filters 36-1 to 36-N and whose output ports are connected to the other inputs of optical couplers 37-1 to 37-N.

Hereinafter, the operation of this embodiment will be explained.

The optical switch 81 is structured as an N by N matrix shaped space switch in the optical region.

Further, a cross point to be formed in the space switch is appropriately set in advance based on the office data such as the condition for office establishment and the system configuration.

Namely, combinations of the OEO converting part which should be the source of the reference clock signal and the OEO converting part to which the reference clock signal should be distributed are set while corresponding flexibly to the various office data and the system configurations.

Therefore, according to this embodiment, the structure can be standardized with higher accuracy without increasing the cost and decreasing the reliability, as compared with the first and the second embodiments.

Figure 22:
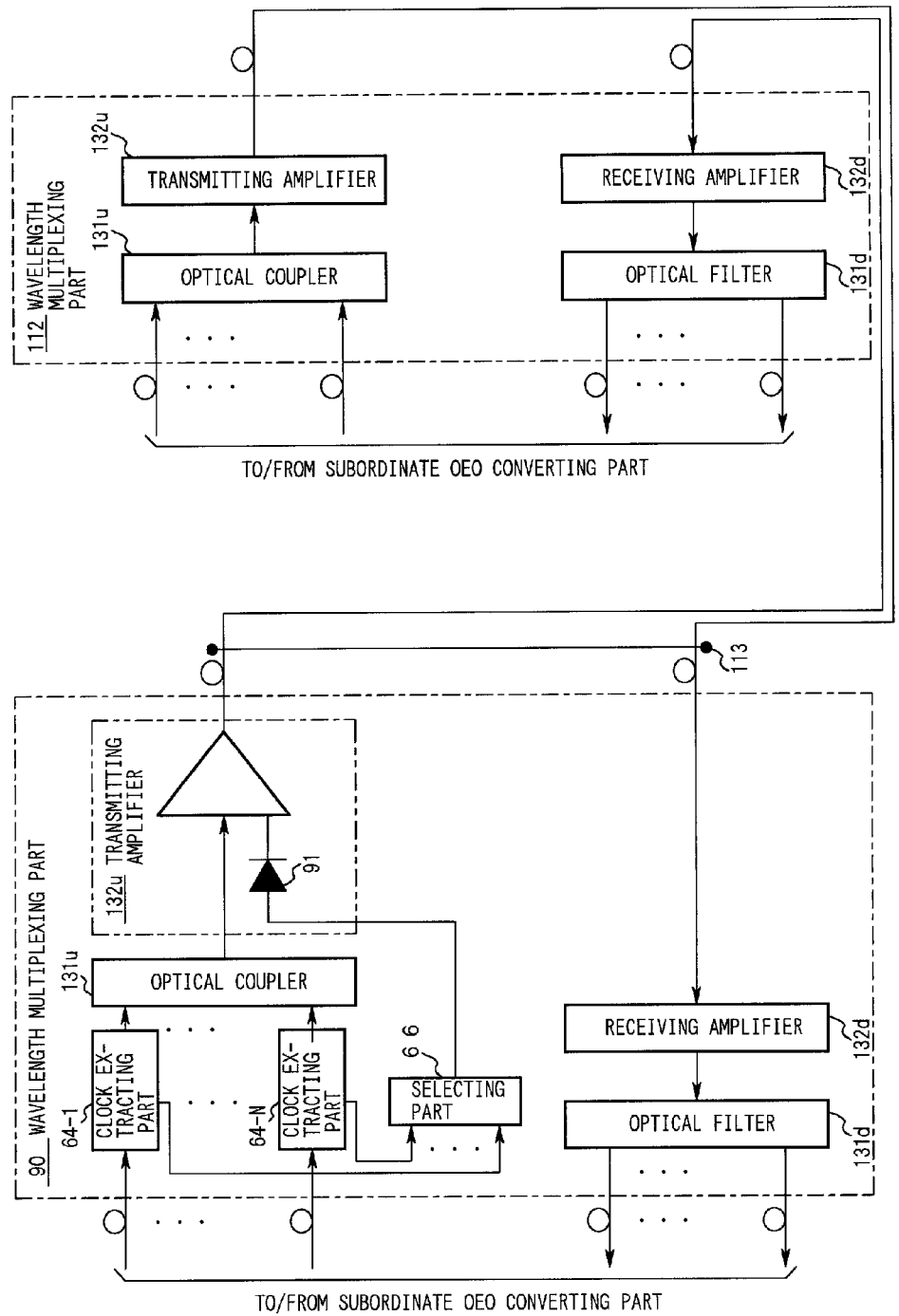
FIG. 22 is a diagram showing a fifth embodiment of the present invention.

FIG. 22 is a diagram showing a fifth embodiment of the present invention.

This embodiment is characterized in that a wavelength multiplexing part 90 connected to a wavelength multiplexing part 12 through an optical multiplex transmission line 113 is provided thereto.

The structure of the wavelength multiplexing part 90 is mainly different from that of the wavelength multiplexing part 61A shown in FIG. 17 as follows:

A transmitting amplifier 132$u$ includes an LED 91 for supplying pumping light to the transmitting amplifier 132$u$.

An output of a selecting part 66 is connected to a bias circuit of the LED 91.

Hereinafter, the operation of this embodiment will be explained.

In the wavelength multiplexing part 90, the transmitting amplifier 132$u$ modulates the intensity of an upstream optical signal to be transmitted to the wavelength multiplexing part 112 through the optical multiplex transmission line 113, according to an instantaneous value of a reference clock signal which is selected by the selecting part 66.

The respective optical signals which are multiplexed to the upstream optical signal like the above are demultiplexed by the wavelength multiplexing part 112 in the wavelength region, and are distributed in parallel to OEO converting parts 60-1 to 60-N corresponding to respective wavelengths.

Similarly to the OEO converting part 60-2 in the above-described second embodiment, the OEO converting part 60-$c$ demodulates the optical signal and regenerates the reference clock signal, thereby synchronizing with the reference clock signal.

Namely, even when the OEO converting part 60-$c$ does not have the function of distributing the reference clock signal supplied from the subordinate OEO converting part to the other OEO converting parts, similarly to the wavelength multiplexing part 112 shown in FIG. 34, it is achievable to distribute the reference clock signal to the OEO converting parts.

Therefore, according to this embodiment, it is possible to utilize the existing wavelength multiplexing part effectively and to reduce the cost of constructing an optical transmission system.

Figure 23:
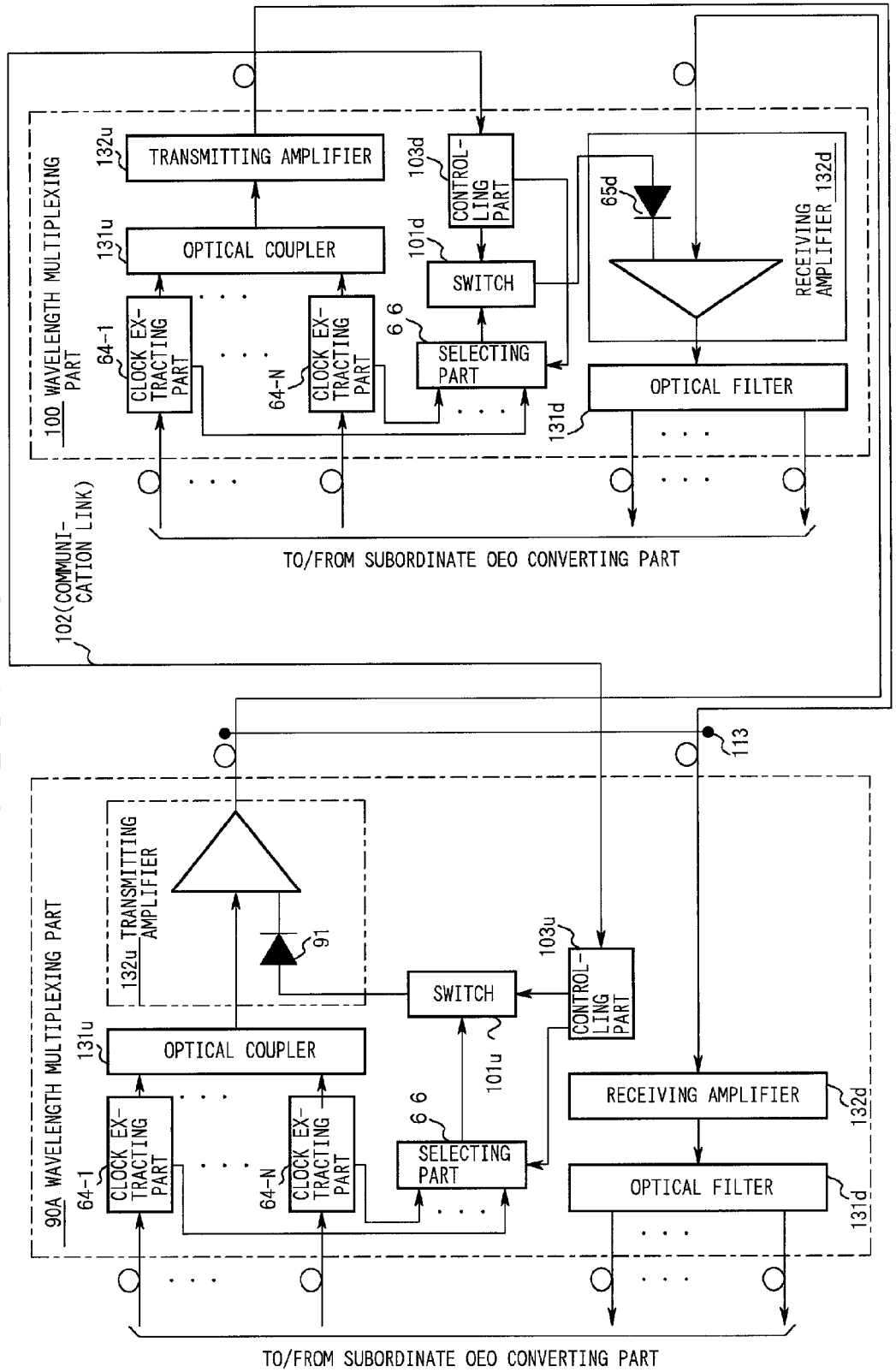
FIG. 23 is a diagram showing sixth and seventh embodiments of the present invention.

FIG. 23 is a diagram showing sixth and seventh embodiments of the present invention.

These embodiments are characterized in that a wavelength multiplexing part 90A is provided thereto instead of the wavelength multiplexing part 90, and a wavelength multiplexing part 100 is provided thereto instead of the wavelength multiplexing part 112.

The structure of the wavelength multiplexing part 90A is different from that of the wavelength multiplexing part 90 as follows:

A switch 101$u$ is provided between an output of a selecting part 66 and a bias circuit of an LED 91.

A controlling part 103$u$ with its outputs connected to the controlling terminals of the switch 101$u$ and the selecting part 66, and which is connected to one end of a communication link 102 underlaid between the wavelength multiplexing parts 90A and 100.

The structure of the wavelength multiplexing part 100 is different from that of the wavelength multiplexing part 61A shown in FIG. 17 as follows:

A switch 101$d$ is provided between an output of a selecting part 66 and a bias circuit of an LED 67.

A controlling part 103$d$ with its outputs are connected to the controlling terminals of the switch 101$d$ and the selecting part 66, and which is connected to the other end of the aforementioned communication link 102.

Figure 24:
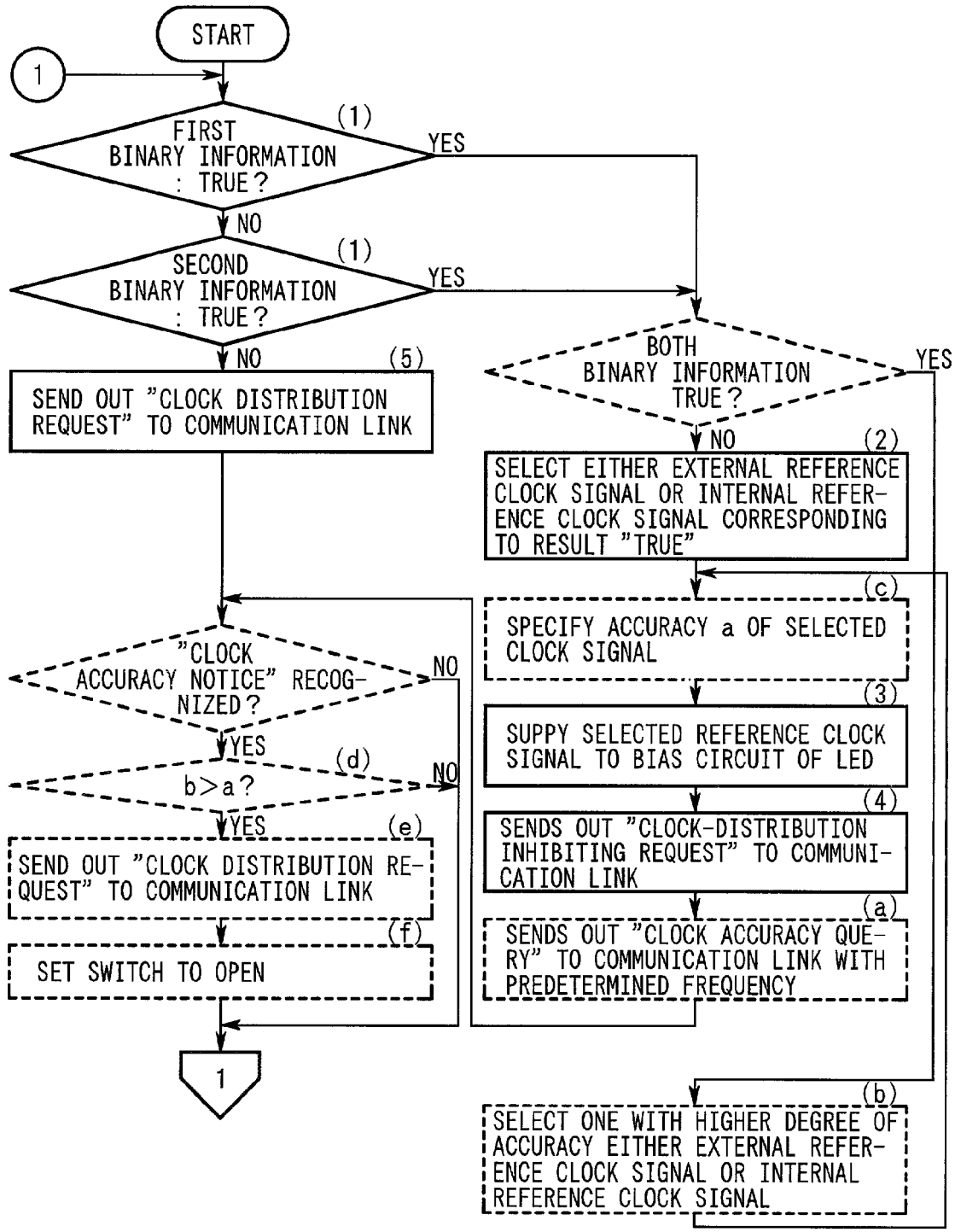
FIG. 24 is an operation flowchart of a controlling part 103$d$ in the sixth and the seventh embodiments of the present invention.

FIG. 24 is an operation flowchart of the controlling part 103$d$ in the sixth and the seventh embodiments of the present invention.

FIG. 25 is an operation flowchart of the controlling part 103u in the sixth and the seventh embodiments of the present invention.

Hereinafter, the operation of the sixth embodiment of the present invention will be explained with reference to FIG. 23 to FIG. 25.

The controlling part 103d which is provided in the wavelength multiplexing part 100 has the following information as office data in advance:

"first binary information" about whether or not a reference clock signal (hereinafter referred to as an "external reference clock signal") is supplied from any of the OEO converting parts through the selecting part 66, "second binary information" about whether or not an internal reference clock signal, instead of the external reference clock signal, is generated inside the wavelength multiplexing part 100 and supplied through the selecting part 66, accuracy E of the external reference clock signal, and accuracy I of the internal reference clock signal.

Further, the controlling part 103u which is provided in the wavelength multiplexing part 90A has the following information as office data in advance:

"third binary information" about whether or not some reference clock signal (hereinafter referred to as a "substitutional external reference clock signal") should be distributed to the wavelength multiplexing part 100 from the subordinate OEO converting part through the selecting part 66, "fourth binary information" about whether or not a substitutional internal reference clock signal, instead of the substitutional external reference clock signal, can be generated inside the wavelength multiplexing part 90A and supplied through the selecting part 66, accuracy e of the substitutional external reference clock signal, and accuracy i of the substitutional internal reference clock signal.

In the wavelength multiplexing part 100, the controlling part 103d discriminates whether either one of the first binary information and the second binary information is true or not (FIG. 24(1)), and when the discrimination result is true, it selects either the external reference clock signal or the internal reference clock signal, which is the reason of the result, through the selecting part 66 (FIG. 24(2)).

Further, the controlling part 103d supplies thus-selected reference clock signal to the bias circuit of the LED 67 through the switch 101d (FIG. 24(3)), and sends out a "clock-distribution inhibiting request", which means that both of the substitutional external reference clock signal and the substitutional internal reference clock signal are inhibited from being distributed, to the wavelength multiplexing part 90A through the communication link 102 (FIG. 24(4)).

When the "clock-distribution inhibiting request" is recognized in the wavelength multiplexing part 90A, the controlling part 103u sets the switch 101u to open (FIG. 25(1)).

Therefore, neither the substitutional external reference clock signal nor the substitutional internal reference clock signal is transmitted to an optical multiplex transmission line 113.

Moreover, either the external reference clock signal or the internal reference clock signal is supplied in parallel to OEO converting parts 60-1 to 60-N which are subordinate to the wavelength multiplexing part 100, through a receiving amplifier 132d and an optical filter 131d.

Furthermore, in the wavelength multiplexing part 100, when both of the first binary information and the second binary information are false, the controlling part 103d sends out a "clock distribution request", which means that either the substitutional external reference clock signal or the substitutional internal reference clock signal should be distributed, to the wavelength multiplexing part 90A through the communication link 102 (FIG. 24(5)).

In the wavelength multiplexing part 90A, the controlling part 103u discriminates whether either the third binary information or the fourth binary information is true or not, regardless of whether the "clock-distribution inhibiting request" and the "clock distribution request" are received or not, and when the discrimination result is true, it selects either the substitutional external reference clock signal or the substitutional internal reference clock signal, which is the reason of the result, through the selecting part 66 (FIG. 25(2)).

The controlling part 103u sets the switch 101u to open unless the aforementioned "clock distribution request" is identified (FIG. 25(3)). When the "clock distribution request" is recognized, however, the controlling part 103u sets the switch 101u to close continuously until the "clock-distribution inhibiting request" is recognized (FIG. 25(4)).

Namely, the clock signal (the substitutional external reference clock signal or the substitutional internal reference clock signal) which is distributed from the wavelength multiplexing part 90A through the optical wavelength transmission line 113 is supplied in parallel to OEO converting parts 60-1 to 60-N which are subordinate to the wavelength multiplexing part 100, through the receiving amplifier 132d and the optical filter 131d.

Thus, according to this embodiment, even when the wavelength multiplexing part 100 cannot distribute the reference clock signal to the subordinate OEO converting parts 60-1 to 60-N, the reference clock signal is substituted by the substitutional external reference clock signal or the substitutional internal reference clock signal which is supplied from the other wavelength multiplexing part 90A through the optical multiplex line 113.

Therefore, according to this embodiment, the reliability, the transmission quality and the service quality are maintained at high levels, as compared with the first to fifth embodiments.

Hereinafter, the operation of the seventh embodiment of the present invention will be explained with reference to FIG. 23 to FIG. 25.

This embodiment is characterized in the following processing procedures executed by the controlling parts 103u, 103d, each of which are provided in the wavelength multiplexing parts 90A, 100, respectively.

In the wavelength multiplexing part 100, the controlling part 103d sends out a "clock accuracy query" to the wavelength multiplexing part 90A through the communication link 102 with predetermined frequency, as long as either the first binary information or the second binary information is true (FIG. 24(a)).

When both of the first binary information and the second binary information are true, the controlling part 103d selects either the external reference clock signal or the internal reference clock signal, with a higher degree of accuracy, through the selecting part 66 (FIG. 24(b)), and specifies an accuracy a (either accuracy E or accuracy I as described above) of thus-selected clock signal, regardless of the values of these binary information (FIG. 24(c)).

Moreover, in the wavelength multiplexing part 90A, when both of the third binary information and the fourth binary information are true, the controlling part 103u selects either the substitutional external reference clock signal or the substitutional internal reference clock signal, with a higher degree of accuracy, through the selecting part 66 (FIG. 25(*a*)), and specifies an accuracy b (either accuracy e or accuracy i as described above) of thus-selected clock signal, regardless of these values of the binary information (FIG. 25(*b*)).

As long as either the third binary information or the fourth binary information is true, the controlling part 103*u* sends out a "clock accuracy notice" including the accuracy b, to the wavelength multiplexing part 100 through the communication link 102, every time it recognizes the aforementioned "clock accuracy query" (FIG. 25(*c*)).

In the wavelength multiplexing part 100, the controlling part 103*d* compares the accuracy b which is included in the "clock accuracy notice" with the accuracy a (FIG. 24(*d*)), and only when the former exceeds the latter, it sends out the "clock distribution request" to the wavelength multiplexing part 90A through the communication link 102 (FIG. 24(*e*)), and sets the switch 101*d* to open (FIG. 24(*f*)).

Incidentally, the processing procedure of the controlling part 103*u* provided in the wavelength multiplexing part 90A, which is performed according to the "clock distribution request", is the same as that of the above-described sixth embodiment, and hence its explanation is omitted.

Thus, according to this embodiment, the accuracy of the reference clock signal which is supplied to the OEO converting parts 60-1 to 60-N, which are subordinate to the wavelength multiplexing part 100, is maintained at the higher level than that of the sixth embodiment.

Therefore, the transmission quality and the service quality can be maintained at the higher levels.

It should be noted that the detailed structures and contents of the "clock-distribution inhibiting request", the "clock distribution request", the "clock accuracy query" and the "clock accuracy notice", which are delivered between the wavelength multiplexing parts 90A and 100 through the communication link 102, are not described in this embodiment.

Figure 26:
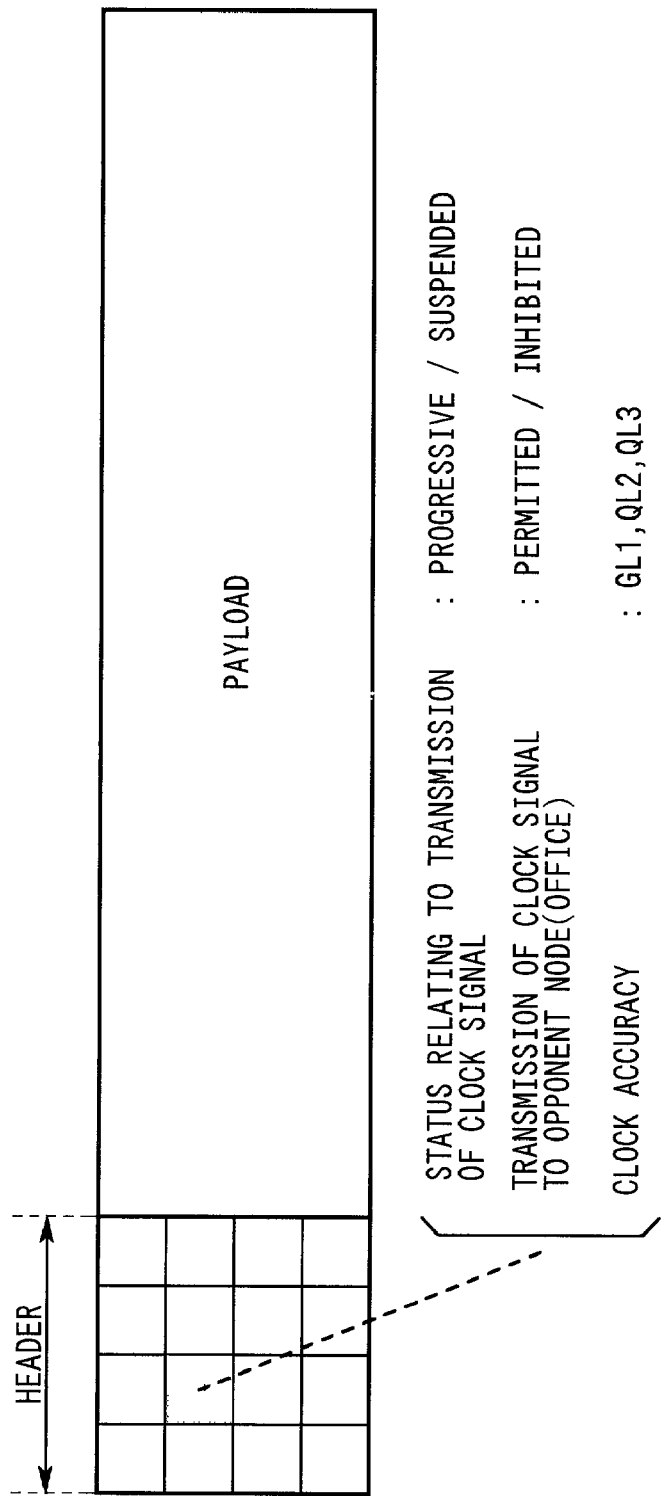
FIG. 26 is a diagram showing the structure of a delivered message in the sixth and the seventh embodiments of the present invention.

However, any structure and content may be suitable as long as the above-described information is delivered at predetermined speed and frequency, and the information may be may be disposed, for example, in the header of a predetermined packet or a frame as shown in FIG. 26.

In the above embodiments, the OEO converting part generates optical signals with different wavelengths which are to be multiplexed by the wavelength multiplexing part, by temporarily converting inputted optical signals to the electrical signals and thereafter applying the electrical-to-optical conversion to the converted signals.

However, the present invention is not limited to the above structure, and it is applicable similarly to an optical transmission system in which signals inputted as electrical signals are converted to optical signals with different wavelengths and then multiplexed in the wavelength region.

Moreover, in the above-described embodiments, the present invention is applied to the distribution of the clock signal to the plurality of the OEO converting parts.

However, the present invention is not limited to the distribution of the clock signal like the above, and it is applicable similarly to the delivering of a synchronization signal (for example, the synchronization signal corresponding to SONET and SDH) between the plurality of the OEO converting parts.

FIG. 27 is a diagram showing an eighth embodiment of the present invention.

This embodiment is characterized in that the supervisory and control parts 200-1 to 200-*n* are not provided thereto, and OEO converting parts 210-1 to 210-N, a wavelength multiplexing part 211 and an MC part 212 are provided thereto instead of the OEO converting parts 110-1 to 110-N, the wavelength multiplexing part 112 and the MC part 201.

The structure of the OEO converting part 210-1 is different from that of the OEO converting part 110-1 shown in FIG. 34 as follows:

an optical filter 34-1 one of whose outputs is arranged on a preceding stage of the OE converting part 124-*d* shown in FIG. 34 (which corresponds to a specific first stage of a later-described "principal-signal converting part" shown in FIG. 27), an OE converting part 35-1, a supervisory and control assisting part 213-1 and an EO converting part 33-1 which are cascaded to the other output of the optical filter 34-1, and an optical coupler 32-1 having two inputs, each of which is connected to an output of the EO converting part 33-1 and to an output of the wavelength converting part 126*u*-1 shown in FIG. 34 (which corresponds to a specific final stage of the later-described "principal-signal converting part" shown in FIG. 27).

It should be noted that a set, as shown in FIG. 34, which includes the OE converting part 124*d*-1 and the wavelength converting part 126*u*-1 and is composed of respective parts arranged between the OE converting part 124*d*-1 and the wavelength converting part 126*u*-1 and an optical communication line 111-1 is irrelevant to this embodiment and ninth and tenth embodiments which will be described later. Hence, it will be represented as a "principal-signal converting part 214-1" as shown in FIG. 27 in the following explanation.

Further, the structure of the OEO converting parts 210-2 to 210-N is the same as that of the OEO converting part 210-2, and hence, illustrations and detailed explanations thereof are omitted in the following explanation, for simplifying the explanation.

The structure of wavelength multiplexing part 211 is different from that of the wavelength multiplexing part 112 shown in FIG. 34 because the following elements are added thereto:

an EO converting part 215*d* whose input is connected to a downstream communication port of the MC part 212, an optical coupler 216*d* which is cascaded to the EO converting part 215*d*, optical couplers 217*d*-1 to 217*d*-N each of which has two inputs connected to the first to Nth outputs of the optical coupler 216*d* and an optical filter 131*d*, respectively, and which are arranged on a subsequent stage of the optical filter 131*d*, an optical coupler 217*u*, one of whose inputs is connected to an output of an optical coupler 131*u* and one of whose outputs is connected to an input of a transmitting amplifier 132*u*, an optical filter 218, an optical switch 219 and an OE converting part 220 which are cascaded between the other output of the optical coupler 217*u* and an upstream communication port of the MC part 212, and a controlling part 221 whose input is connected to an input of the EO converting part 215*d* and the downstream communication port of the MC part 212, and whose output is connected to a controlling terminal of the optical switch 219.

FIG. 28 is an operation time chart of the eighth embodiment of the present invention.

Hereinafter, the operation of the eighth embodiment of the present invention will be explained with reference to FIG. 27 and FIG. 28.

The MC part 212 successively generates control information which indicates processing related to the maintenance and the operation of the OEO converting parts 210-1 to 210-N and to be performed by the supervisory and control assisting parts 213-1 to 213-N (information to be referred to during the processing may be included), and which is composed of a bit string in a specified form (frame and the like) (the control information hereinafter referred to as a "command").

The EO converting part 215d modulates an optical signal whose wavelength λ0 is unique and different from those of downstream optical signals multiplexed to the aforementioned downstream optical multiplex signal (it is supposed that the optical signal is subjected to the "intensity modulation" for simplifying the explanation) by the command string (FIG. 28(1)), thereby generating a "specific downstream optical signal" (FIG. 28(2)).

The optical couplers 217d-1 to 217d-N respectively multiplex the specific downstream optical signal to "a corresponding downstream optical signal from a plurality N of optical signals which are demultiplexed from the downstream optical multiplex signal by the optical filter 131d" and distribute it to the OEO converting parts 210-1 to 210-N.

Note that, in the following explanation, the elements which are common in the OEO converting parts 210-1 to 210-N are designated by using the subscript "c", meaning that it can correspond to any of the subscripts "1" to "N".

In the OEO converting part 210-c, the optical filter 34-c splits thus-distributed downstream optical signal and the specific downstream optical signal in the wavelength region, and distributes these to the principal-signal converting part 214-c and the OE converting part 35-c, respectively.

The OE converting part 35-c reconstructs the above command string by OE converting the specific downstream optical signal.

The supervisory and control assisting part 213-c analyzes the command string based on the specific form, and extracts the command whose destination, which is identified based on the form (it is supposed that the destination is disposed at a predetermined field of the respective commands for simplifying the explanation), corresponds to the supervisory and control assisting part 213-c.

Further, the supervisory and control assisting part 213-c analyzes thus-extracted command to start predetermined processing which should be performed correspondingly to the command.

In the processing, the supervisory and control assisting part 213-c generates a string of response (hereinafter referred to as "status") to be delivered to the MC part 212 as necessary, and outputs an electrical signal showing the status string (FIG. 28(3)) as a bit string in a predetermined form, after a specified time from the time when the aforementioned command is extracted.

Incidentally, it is supposed that a bit rate of the bit string like the above is a predetermined value.

The EO converting part 33-c modulates an optical signal whose wavelength λc is unique and different from those of upstream optical signals to be multiplexed to the aforementioned upstream optical multiplex signal (it is supposed that the optical signal is subjected to the "intensity modulation" for simplifying the explanation) by the electrical signal, thereby generating a "specific upstream optical signal" (FIG. 28(4)).

The optical coupler 32-c multiplexes the specific upstream optical signal to an upstream optical signal which is supplied from the principal-signal converting part 214-c and distribute it to the wavelength multiplexing part 211.

In the wavelength multiplexing part 211, the optical coupler 131u multiplexes the plurality N of upstream optical signals and the plurality N of specific upstream optical signals which are supplied in parallel from the OEO converting parts 210-1 to 210-N, and sends these out to an optical transmission line 113 through the optical coupler 217u and the transmitting amplifier 132u.

Further, the optical filter 218 demultiplexes the plurality N of specific upstream optical signal split by the optical coupler 217u in the wavelength region.

Only during a period where the status sent out from the supervisory and control assisting part (OEO converting part) corresponding to the destination of the command is to be received in synchronization with the aforementioned command string, the controlling part 221 cyclically generates a selection signal indicating the specific upstream optical signal modulated according to the status (FIG. 28(5)).

The optical switch 219 successively selects a single specific upstream optical signal corresponding to the selection signal like the above, from the aforementioned plurality N of specific optical signals.

The OE converting part 220 OE converts thus-selected specific upstream optical signal to generate the status string (FIG. 28(6)).

The MC part 212 recognizes the respective statuses included in the status string while corresponding these to the destinations of the commands (FIG. 28(7)), and executes the predetermined processing according to the statuses (FIG. 28(8)).

It should be noted that, as to the processing procedure by the MC part 212 and the supervisory and control assisting parts 213-1 to 213-N, any processing may be suitable as long as the processing relates to the maintenance and/or the operation of the OEO converting parts 210-1 to 210-N, and it is not the characteristics of the present invention. Therefore, detailed explanations thereof are omitted.

Thus, according to this embodiment, the command and the status are delivered with reliability between the MC part 212 and the OEO converting parts 210-1 to 210-N, through the existing optical transmission lines underlaid between the OEO converting parts 210-N to 210-N and the wavelength multiplexing part 211, based on wavelength division multiplexing.

Therefore, even when the number N of the OEO converting parts 210-1 to 210-N is large, differs to a great extent according to the condition for the office establishment of the nodes, or increases/decreases substantially by the expansion and the like, wiring can be simplified and the EMI which is radiated from the lines for delivering the command and the status can be reduced.

Incidentally, in this embodiment, the single specific upstream optical signal corresponding to the aforementioned selection signal is selected by the optical switch 219, out of the plurality N of specific upstream optical signals which are demultiplexed by the optical filter 218 in the wavelength region.

Figure 29:
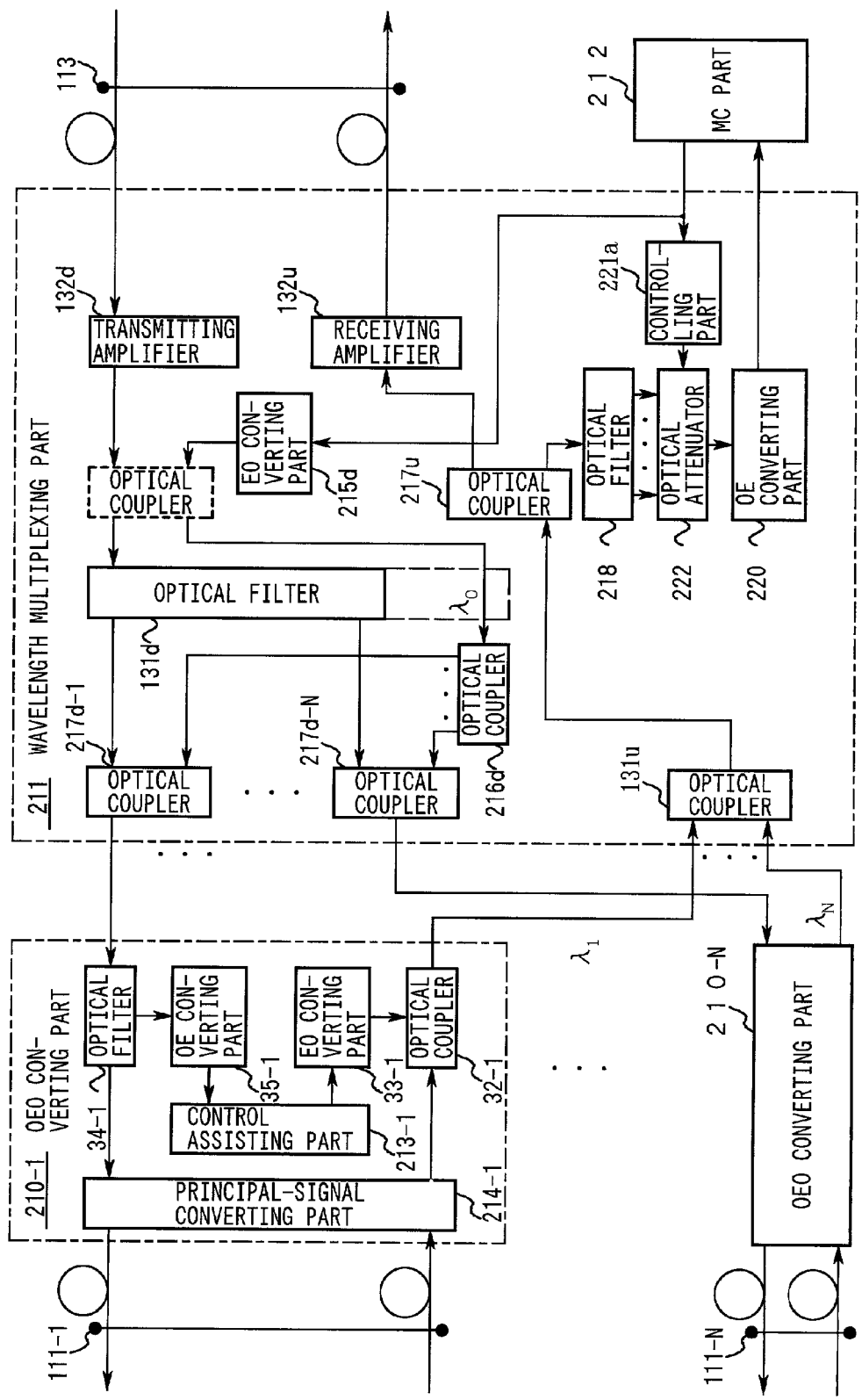
FIG. 29 is a diagram showing another structure of the eighth embodiment of the present invention.

However, the present invention is not limited to the above structure. For example, an "optical attenuator 222 which attenuates all of the specific optical signals, except for the specific upstream optical signal designated by the selection signal, to a predetermined level" may be provided thereto as shown in FIG. 29, instead of the optical switch 219.

Moreover, in this embodiment, when the transmitting amplifier 132u, a receiving amplifier 132d and the other element are structured as separate apparatus, out of the elements of the wavelength multiplexing part 211, for example, the connection may be simplified based on the wavelength division multiplexing, by adding an optical coupler as necessary between the EO converting part 215d and the optical coupler 216d, as shown by a broken line in FIG. 27.

Furthermore, in this embodiment, the commands to be successively transferred to the OEO converting parts 210-1 to 210-N are transmitted by the MC part 212 based on a time-reserve method.

However, the present invention is not limited to the above structure, and, for example, all or a part of the commands and the statuses may be delivered by the baseband domain (either the optical region or the electrical region), based on any of the multiple access system such as TDMA, FDMA, CDMA, CSMA and the random access control system such as the contention method, polling method, time-reserve method and the like.

Figure 30:
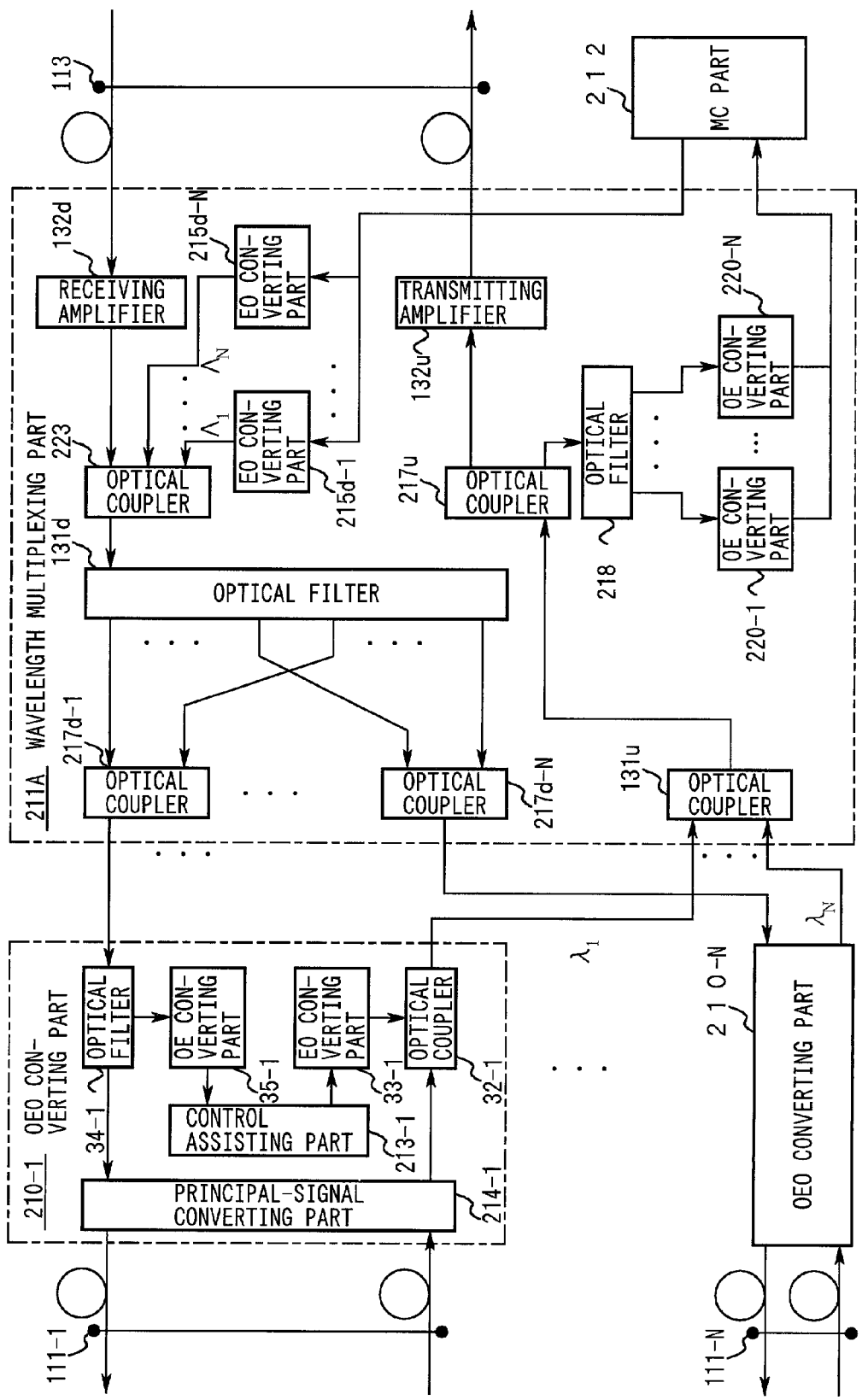
FIG. 30 is a diagram showing a ninth embodiment of the present invention.

FIG. 30 is a diagram showing a ninth embodiment of the present invention.

This embodiment is characterized in that a wavelength multiplexing part 211A is provided thereto instead of the wavelength multiplexing part 211 shown in FIG. 27.

The structure of the wavelength multiplexing part 211A is different from that of the wavelength multiplexing part 211 in that the optical switch 219, the OE converting part 220 and the controlling part 221 are not provided thereto, an optical filter 131d has 2N outputs, each of which is connected to the corresponding other inputs of optical couplers 217d-1 to 217d-N, and the following elements are added thereto:

EO converting parts 215d-1 to 215d-N, instead of the EO converting part 215d, each of which corresponds to OEO converting parts 210-1 to 210-N, an optical coupler 223 which is arranged at an inter-stage of a receiving amplifier 132d and the optical filter 131d, and has (N+1) inputs each of which is connected to an output of the receiving amplifier 132d and outputs of the EO converting parts 215-1 to 215-N, and OE converting parts 220-1 to 220-N which are respectively arranged between outputs of an optical filter 218 and corresponding communication ports (input ports) of an MC part 212.

Hereinafter, the operation of the ninth embodiment according to the present invention will be explained with reference to FIG. 30.

This embodiment is characterized in the following processing performed by the MC part 212 and the process of delivering commands and statuses between the MC part 212 and the OEO converting parts 210-1 to 210-N based on the processing procedure.

The MC part 212 delivers the command to the EO converting part 215d-1 to 215d-N. corresponding to the OEO converting part 210-c which should be the destination of the predetermined command, out of the EO converting parts 215d-1 to 215d-N.

The EO converting part 215d–c modulates an optical signal whose wavelength λc is unique and different from those of optical signals multiplexed to the aforementioned downstream optical multiplex signal (it is supposed for simplicity that the optical signal is subjected to the "intensity modulation") according to the command, thereby generating a "specific downstream optical signal".

The optical coupler 223 multiplexes thus-generated plurality N of specific downstream optical signals and a downstream optical multiplex signal which is supplied through the receiving amplifier 132d.

Further, the optical filter 131d demultiplexes the plurality N of specific downstream optical signals and the plurality N of downstream optical multiplex signals in the wavelength region.

The optical coupler 217d–c multiplexes a single specific downstream optical signal and a single downstream optical signal which correspond to the OEO converting part 210-c in advance, out of the specific downstream optical signals and the downstream optical signals, and distributes it to the OEO converting part 210-c.

Meanwhile, in the OEO converting part 210-c, an OE converting part 35-c obtains the command by OE converting the specific downstream optical signal demultiplexed by an optical filter 34-c. A supervisory and control assisting part 213-c applies a predetermined processing to the command, and in case some status is generated during the processing, it immediately supplies the command to an EO converting part 33-c irrespective of when the command is obtained.

Incidentally, the operations of the EO converting part 33-c and the optical coupler 32-c are the same as those in the eighth embodiment as described above, and hence explanations thereof are omitted.

In the wavelength multiplexing part 211A, the optical filter 218 demultiplexes the respective specific upstream optical signals in the wavelength region, which are modulated according to the statuses generated by the OEO converting parts 210-1 to 210-N and are supplied asynchronously through the optical couplers 131u, 217u.

In the OE converting parts 220-1 to 220-N, thus-demultiplexed specific upstream optical signals are respectively subjected to the OE conversion, whereby the statuses generated by the OEO converting parts 210-1 to 210-N are reconstructed.

The MC part 212 achieves efficient maintenance and operation by starting predetermined processing according to the reconstructed statuses as necessary.

Namely, a mesh-state communication link is physically formed between the MC part 212 and the OEO converting parts 210-1 to 210-N based on the wavelength division multiplexing, through existing optical transmission lines underlaid between the wavelength multiplexing part 211A and the OEO converting parts 210-1 to 210-N.

Therefore, according to this embodiment, limitations on time base relating to the delivering of the command and the status between the MC part 212 and the OEO converting parts 210-1 to 210-N is avoided so that the efficiency of the delivering is improved on average, and it is applicable more flexibly to the various number N of the OEO converting parts 210-1 to 210-N and its expansion, within the range of the throughput of the MC part 212, as compared with the aforementioned eighth embodiment.

Further, in this embodiment, the optical coupler 223 as well as the optical filter 131d are provided in the wavelength multiplexing part 211A.

However, the present invention is not limited to the above structure, and, for example, when any of the office premises, frame and shelf is common, to which the optical filter 131d, the optical couplers 217d-1 to 217d-N and the EO converting parts 215d-1 to 215d-N are housed, the wavelength multiplexing part 211A may be structured as follows:

The optical filter 131d shown in FIG. 27 is equipped as the optical filter 131d.

Outputs of the EO converting parts 215d-1 to 215d-N are directly connected to the other inputs of the optical couplers 217d-1 to 217d-N.

Moreover, in this embodiment, both of the specific upstream optical signal and the specific downstream optical signal, whose wavelengths are unique and different from each other, are respectively allocated to the OEO converting parts 210-1 to 210-N.

However, the present invention is not limited to the above structure, and, for example, the wavelengths of the specific upstream optical signal and/or the specific downstream optical signal may be allocated in common to a set of the OEO converting parts having the common property which meets the condition for the office establishment, and the predetermined command and the status may be delivered under the multiple access system or the random access control system as will be described later.

Figure 31:
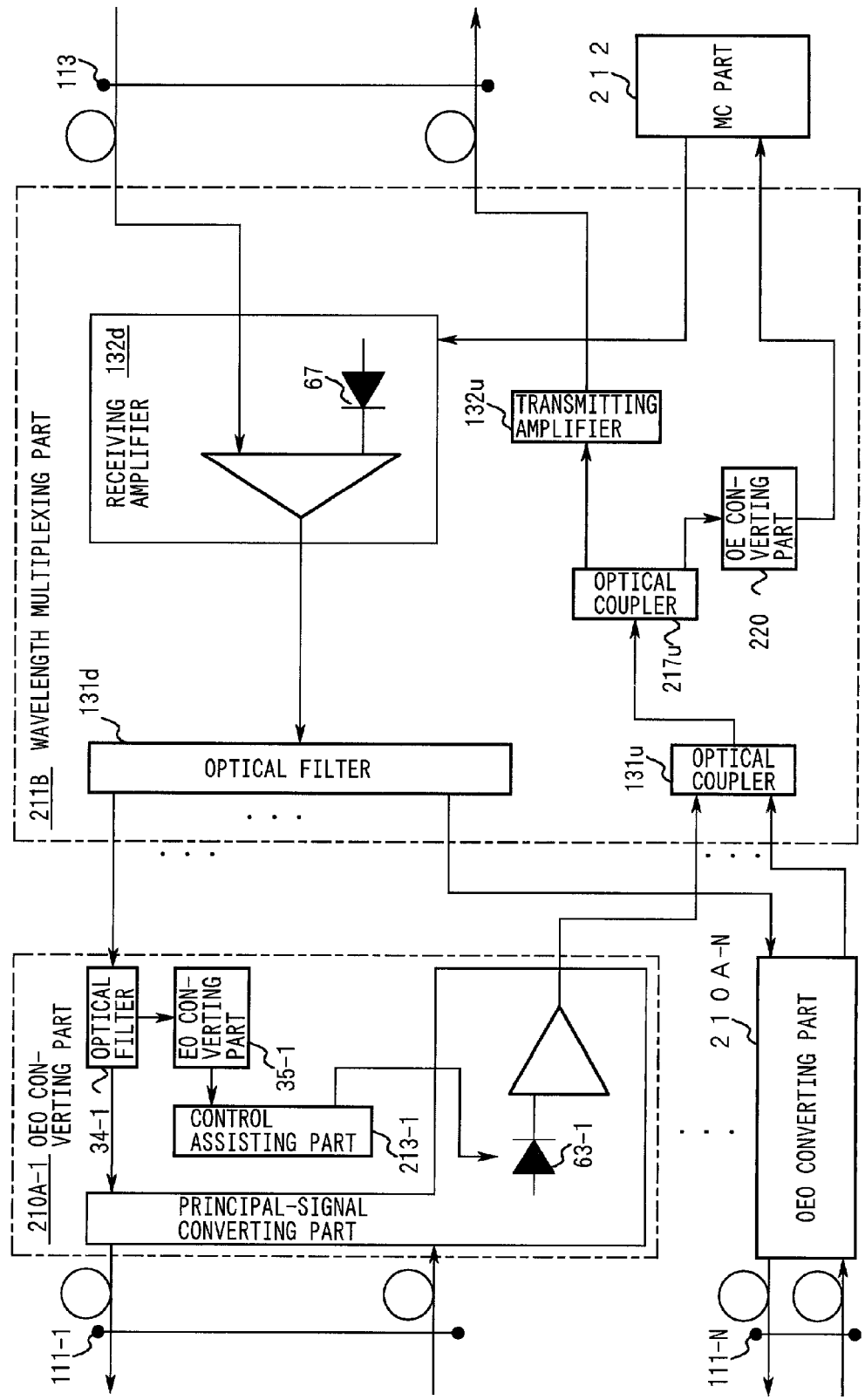
FIG. 31 is a diagram showing a tenth embodiment of the present invention.

FIG. 31 is a diagram showing a tenth embodiment of the present invention.

This embodiment is characterized in the structure of OEO converting parts 210A-1 to 210A-N which are provided thereto instead of the OEO converting parts 210-1 to 210-N, and the structure of a wavelength multiplexing part 211B which is provided thereto instead of the wavelength multiplexing part 211.

The structure of the OEO converting part 210A-1 is different from that of the OEO converting part 210-1 as follows:

The optical coupler 32-1 and the EO converting part 33-1 are not provided thereto.

An output of a supervisory and control assisting part 213 is connected to a bias circuit (not shown) of an LED 63-1 which is provided in a principal-signal converting part 214-1 and outputs pumping light for amplifying an upstream optical signal.

Incidentally, the structure of the OEO converting parts 210A-2 to 210A-N is the same as that of the OEO converting part 210A-1, and hence its explanation and illustration are omitted.

The structure of the wavelength multiplexing part 211B is different from that of the wavelength multiplexing part 211 as follows:

The EO converting part 215d, the optical couplers 216d, 217d-1 to 217d-N, the optical filter 218, the optical switch 219 and the controlling part 211 are not provided thereto.
A downstream communication link of an MC part 212 is connected to a bias circuit (not shown) of an LED 67 which is provided in a receiving amplifier 132d and outputs pumping light for amplifying a downstream multiplex optical signal.
A number N of outputs of an optical filter 131d are connected to corresponding inputs of the OEO converting parts 210A-1 to 210A-N through optical transmission lines.
The other input of the optical coupler 217u is connected to an input of an OE converting part 220.

Hereinafter, the operation of the tenth embodiment of the present invention will be explained with reference to FIG. 31.

First, the predetermined multiple access system (for example, the FDMA, TDMA, CDMA, CSMA and the like in the baseband domain) or the random access control system (for example, any of the contention method, polling method, time-reserve method), which is used for delivering the command and the status, is applied in advance to the MC part 212 and the OEO converting parts 210A-1 to 210A-N.

The MC part 212 generates a command whose form meets the multiple access system or the random access control system like the above, and supplies a bit string showing the command to the wavelength multiplexing part 211B.

In the wavelength multiplexing part 211B, the receiving amplifier 132d varies an operating point of the LED 67 according to an instantaneous value of the bit string, thereby modulating the intensity of the pumping light.

Namely, the bit string showing the command is superimposed on the downstream optical multiplex signal which is outputted by the receiving amplifier 132d, as the intensity of the downstream optical multiplex signal.

The optical filter 131d demultiplexes the downstream optical multiplex signal in the wavelength region to generate the downstream optical signals on which the aforementioned bit string is superimposed in common as the intensity, and distributes the downstream optical signals to the OEO converting parts 210A-1 to 210A-N in parallel.

Therefore, the aforementioned commands are downloaded in parallel to the supervisory and control assisting parts 213-1 to 213-N which are provided in the OEO converting parts 210A-1 to 210A-N.

Incidentally, processing which is performed by the supervisory and control assisting part 213-c according to the command is basically the same as that of the eighth and the ninth embodiments, except for the processing concerning the multiple access system or the random access control system is added thereto, and hence its detailed explanation is omitted.

Moreover, the supervisory and control assisting part 213-c supplies an electrical signal, which shows the bit string showing the status generated during the processing as an instantaneous value, to a bias circuit of an LED 63-c which is provided in a wavelength converting part 126u–c.

Namely, the intensity of the pumping light used for amplifying the upstream optical signal in the principal-signal converting part 214-c is modulated according to the aforementioned bit string, and the bit string is superimposed on the upstream optical signal which is outputted from the wavelength converting part 126u–c.

In the wavelength multiplexing part 211B, the upstream optical signal like the above which is supplied through optical couplers 131u, 217u id OE converted by the OE converting part 200, whereby the aforementioned status is reconstructed, and the status is supplied to the MC part 212.

Incidentally, the different bit strings can be prevented from being superimposed simultaneously on the upstream optical signals outputted in parallel from the plurality of the OEO converting parts among the OEO converting parts 210A-1 to 210A-N (hereinafter simply referred to as a "collision"), and recovery such as retransmission to be performed after the collision is achieved, based on the multiple access system or the random access control system performed by the MC part 212 in cooperation with the supervisory and control assisting parts 213-1 to 213-N.

However, the processing of the communication control based on the multiple access system or the random access control system can be realized by applying various publicly-known technologies, and it is not characteristics of the present invention. Hence, its explanation is omitted.

Thus, according to this embodiment, the structure of the hardware is simplified as compared with the eighth and the ninth embodiments and further, the command and the status are delivered between the MC part 212 and the OEO converting parts 210A-1 to 210A-N with reliability, even when the number N of the OEO converting parts 210A-1 to 210A-N is large or substantially increases/decreases.

In this embodiment, the command and the status are delivered according to the modulation of the intensity of the pumping light.

Figure 32:
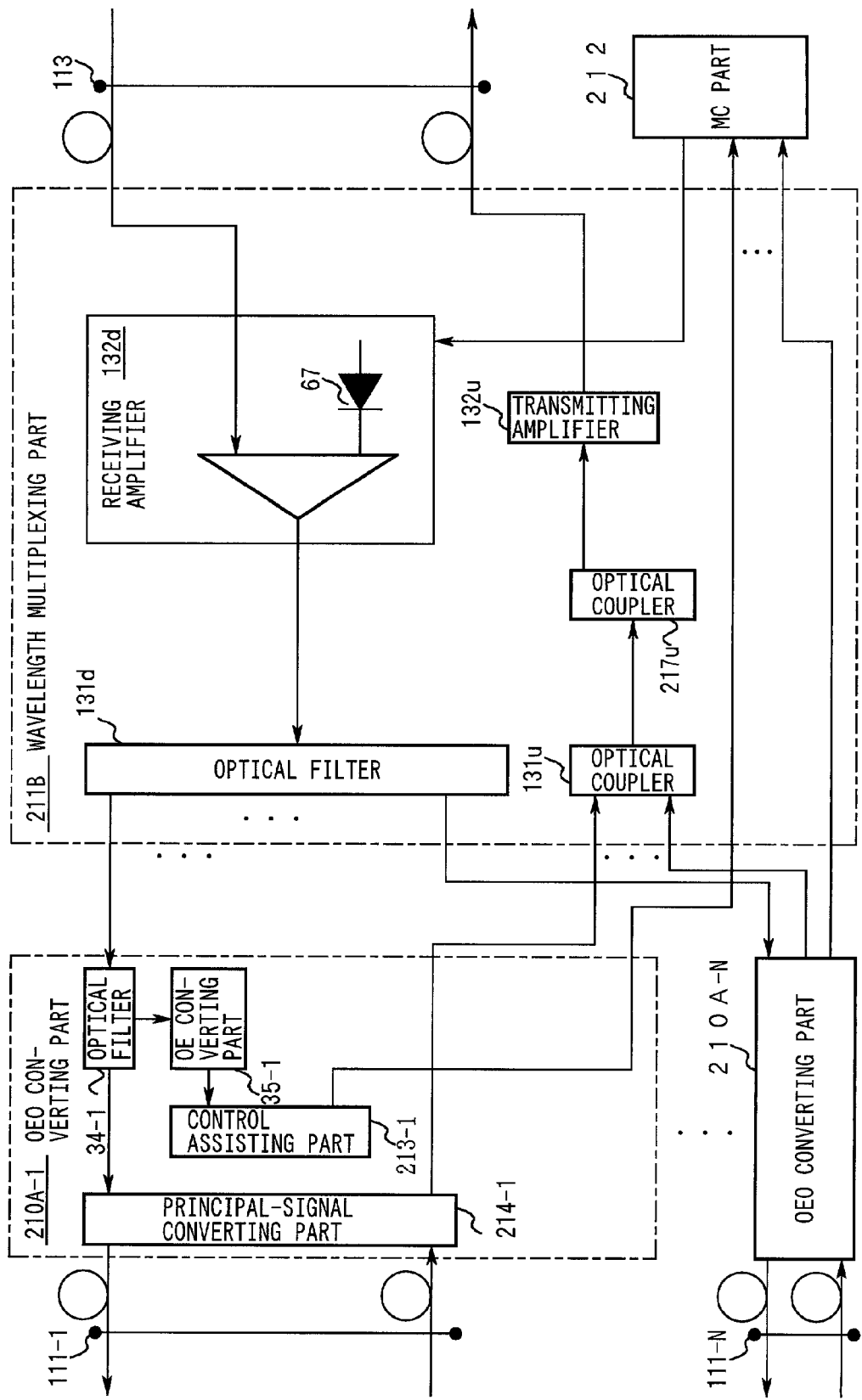
FIG. 32 is a diagram showing another structure of the tenth embodiment of the present invention.

However, the present invention is not limited to the above structure, and, for example, the status may be delivered through metallic lines similarly to the conventional example as shown in FIG. 32, or it may be delivered similarly to the eighth and the ninth embodiments.

Further, the above constitution can be applied to the delivering of the command as well.

Moreover, in the eighth to the tenth embodiments, the present invention is applied to the delivering of both of the command and the status.

However, the present invention is not limited to the above structure, and by applying the present invention to either one or only a part of the command and the status, the number of the lines which form the communication link used for delivering the command and the status may be reduced and the total length thereof may be shortened.

Furthermore, in the eighth to the tenth embodiments, the intensity of the upstream optical multiplex signal is modulated according to the command, and the intensity of the downstream optical signal is modulated according to the status.

However, the present invention is not limited to the above structure, and any modulation system such as a phase modulation method may be applied for delivering the command and the status, as long as it is adaptable to the aforementioned multiple access system or the random access control system.

Figure 33:
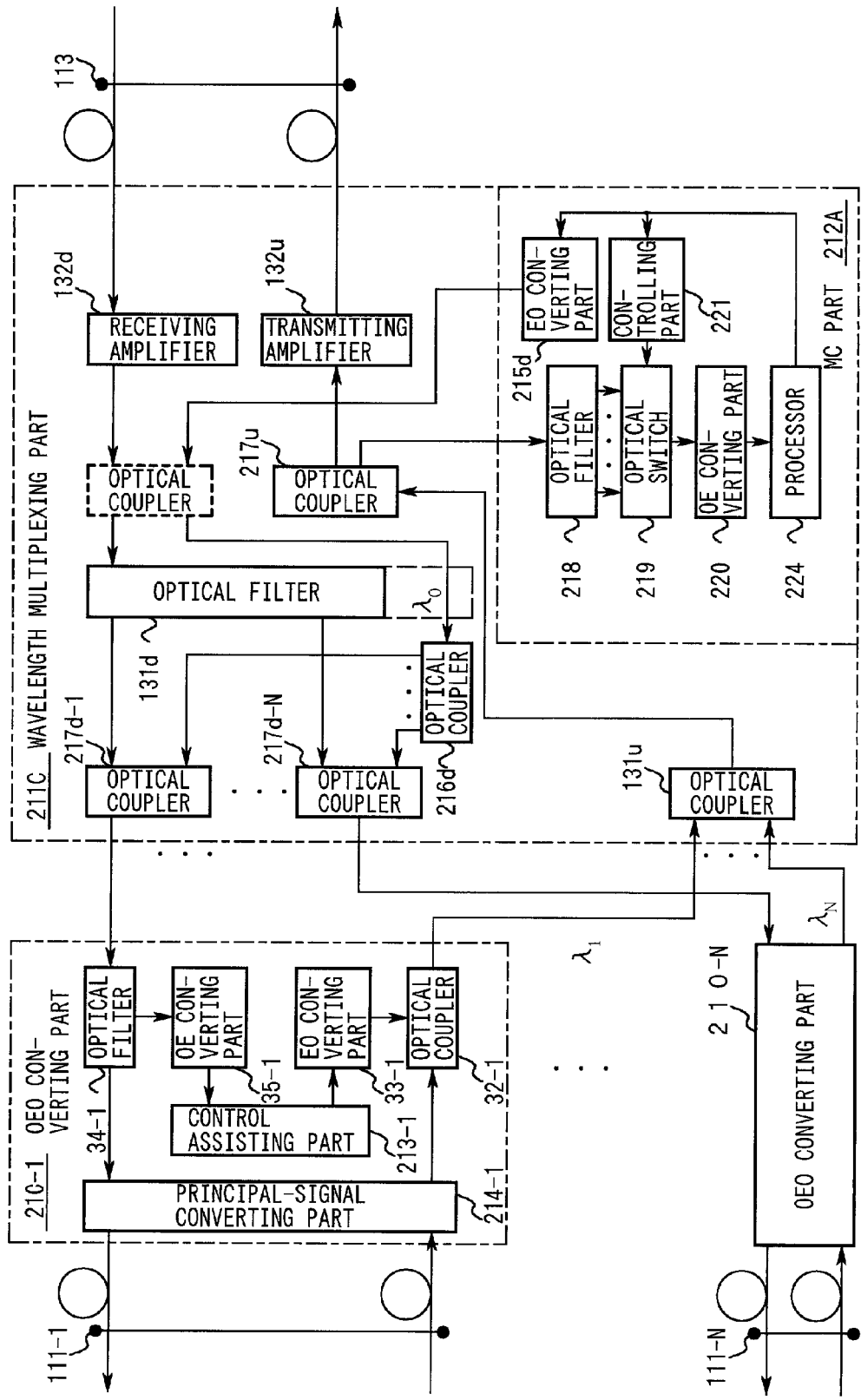
FIG. 33 is a diagram showing an eleventh embodiment of the present invention.

FIG. 33 is a diagram showing an eleventh embodiment of the present invention.

This embodiment is characterized in the structure of a wavelength multiplexing part 211C which is provided thereto instead of the wavelength multiplexing part 211, and the structure of an MC part 212A which is provided thereto instead of the MC part 212.

The structure of the wavelength multiplexing part 211C is different from that of the wavelength multiplexing part 211 as follows:

The EO converting part 215d, the optical filter 218, the optical switch 219, the OE converting part 220 and the controlling part 221 are not provided thereto.

An input of an optical coupler 216d and an output of an optical coupler 217u are optically connected to corresponding ports of the MC part 212A.

The structure of the MC part 212A is different from that of the MC part 212 as follows:

A processor 224 which corresponds to the MC part 212 shown in FIG. 27 is provided thereto.

The EO converting part 215d, the optical filter 218, the optical switch 219, the OE converting part 220 and the controlling part 221 are built thereinto.

Incidentally, the connection among the EO converting part 215d, the optical couplers 216d, 217u, the optical filter 218, the optical switch 219, the OE converting part 220 and the controlling part 221 is the same as that shown in FIG. 27, and hence its explanation is omitted.

Hereinafter, the operation of the eleventh embodiment of the present invention will be explained with reference to FIG. 33.

First, the functions and the coordinated operations of the EO converting part 215d, the optical couplers 216d, 217u, the optical filter 218, the optical switch 219, the OE converting part 220 and the controlling part 221 are the same as those in the eighth embodiment, and hence explanations thereof are omitted.

The MC part 212A and the wavelength multiplexing part 211C are connected via optical communication lines (or optical cables) whose one ends are connected to an input of the optical coupler 216d and the other output of the optical coupler 217u, respectively, and metallic lines are not formed inside the wavelength multiplexing part 211C.

Further, an input of the EO converting part 215d, an input of the controlling part 221 and an output of the OE converting part 220 are connected to the corresponding ports of the processor 224 through metallic lines formed inside the MC part 212A.

The above metallic lines are formed inside the MC part 212A as the shortest transmission line having a high impedance, and coupling between the metallic lines and the outside is maintained coarse electrostatically and electromagnetically with a predetermined shielding.

Therefore, according to this embodiment, the level of EMI which is radiated from the metallic line to the outside is reduced, and the reduction of a noise margin and the reliability, which is caused by the disturbance such as an electromagnetic wave from the outside to the metallic line, is eased to a great extent, as compared with the eighth to the tenth embodiments in which the metallic lines are formed inside the wavelength multiplexing parts 211, 211A, 211B whose physical sizes are large in general.

Incidentally, in this embodiment, the present invention is applied to the embodiment shown in FIG. 27.

However, the present invention is not limited to the above structure, and, for example, may be applied to any of the embodiments shown in FIG. 29 to FIG. 31 and FIG. 32.

The invention is not limited to the above embodiments and various modifications may be made without departing from the spirit and the scope of the invention. Any improvement may be made in part or all of the components.

What is claimed is:

1. A wavelength multiplexing apparatus, comprising:
    a multiplexing section multiplexing and/or demultiplexing optical signals to/from a wavelength-multiplex signal transferred through an optical multiplex transmission line, the optical signals having different wavelengths from each other and being individually transmitted or received by a plurality of signal conversion apparatuses;
    a reference signal receiving section receiving a reference optical signal modulated according to a reference signal which is outputted from a specific one of said plurality of signal conversion apparatuses, and is a reference to synchronization in all or a part of said plurality of signal conversion apparatuses; and
    a reference signal distributing section distributing the received reference optical signal in parallel to all or a part of said plurality of signal conversion apparatuses through optical transmission lines respectively formed between each of the plurality of signal conversion apparatuses and the reference signal distributing section.

2. The wavelength multiplexing apparatus according to claim 1, wherein
    said specific one of said plurality of signal conversion apparatuses wavelength-multiplexes said reference optical signal to an optical signal to be transmitted from the specific one of said plurality of signal conversion apparatuses, and
    said reference signal receiving section receives said reference optical signal by demultiplexing or extracting said reference optical signal from said optical signal in a wavelength region.

3. The wavelength multiplexing apparatus according to claim 1, wherein
    said reference signal receiving section receives reference optical signals individually supplied from a plurality of specific signal conversion apparatuses among said plurality of signal conversion apparatuses, and said reference signal distributing section distributes one of the reference optical signals received by said reference signal receiving section.

4. The wavelength multiplexing apparatus according to claim 1, wherein said reference signal receiving section receives reference optical signals which are individually supplied from a plurality of specific signal conversion apparatuses and have a correspondence in advance with all or a part of said specific signal conversion apparatuses and said optical multiplex transmission line, and said reference signal distributing section distributes the individually received reference optical signals to said signal conversion apparatuses corresponding to the reference optical signals or said optical multiplex transmission line.

5. A wavelength multiplexing apparatus comprising:

a multiplexing section multiplexing and/or demultiplexing optical signals to/from a wavelength-multiplex signal transferred through an optical multiplex transmission line, the optical signals having different wavelengths from each other and being individually transmitted or received by a plurality of signal conversion apparatuses;

a reference signal receiving section receiving a reference optical signal modulated according to a reference signal which is outputted from a specific one of said plurality of signal conversion apparatuses, and is a reference to synchronization in all or a part of said plurality of signal conversion apparatuses; and a reference signal distributing section distributing the received reference optical signal in parallel to all or a part of said plurality of signal conversion apparatuses through optical transmission lines respectively formed between each of the plurality of signal conversion apparatuses and the reference signal distributing section, and wherein said multiplexing section includes an optical amplifier optically amplifying a wavelength-multiplex signal transferred through said optical multiplex transmission line and all or a part of optical signals demultiplexed from the wavelength-multiplex signal, and said reference signal distributing section distributes said received reference optical signal by modulating pumping light to be used for said optically amplifying, by the reference optical signal.

6. A wavelength multiplexing method, comprising:

multiplexing and/or demultiplexing optical signals to/from a wavelength-multiplex signal transferred through an optical multiplex transmission line, the optical signals having different wavelengths from each other and being individually transmitted or received by a plurality of signal conversion apparatuses;

receiving a reference optical signal modulated according to a reference signal which is outputted from a specific one of said plurality of signal conversion apparatuses, and is a reference to synchronization in all or a part of said plurality of signal conversion apparatuses; and distributing the received reference optical signal in parallel to all or a part of said plurality of signal conversion apparatuses through optical transmission lines respectively formed between each of the plurality of signal conversion apparatuses and the reference signal distributing section.

* * * * *